United States Patent [19]
Takenaka et al.

[11] Patent Number: 5,097,672
[45] Date of Patent: Mar. 24, 1992

[54] SPOT AIR-CONDITIONER

[75] Inventors: Naofumi Takenaka; Ryutaro Ohashi; Masashi Sagara; Ken Takigawa, all of Osaka, Japan

[73] Assignee: Daikin Industries Ltd., Japan

[21] Appl. No.: 555,125

[22] Filed: Jul. 18, 1990

[51] Int. Cl.⁵ .............................................. F25D 17/04
[52] U.S. Cl. ..................................... 62/186; 236/49.3; 165/16; 454/286
[58] Field of Search ................ 62/186, 177; 236/49.1, 236/49.3, 47, 1 B, 51; 165/16, 11.1; 98/121.2, 40.25, 40.18, 40.24

[56] References Cited

U.S. PATENT DOCUMENTS 4,671,458  6/1987  Fukuda et al. ................... 165/16 X
4,815,657  3/1989  Tsukuda .......................... 165/11.1 X

FOREIGN PATENT DOCUMENTS 14754   4/1977  Japan .
22553   7/1978  Japan .
141735  6/1979  Japan .
47040   3/1983  Japan .
145431  9/1983  Japan .
150717  10/1983 Japan .

*Primary Examiner*—Albert J. Makay
*Assistant Examiner*—John Sollecito
*Attorney, Agent, or Firm*—Thompson, Hine and Flory

[57] ABSTRACT

A blow-off duct is rotatably mounted on an air-conditioner. A human body detection device is provided at the blow-off duct in order to detect the presence of a person to be air-conditioned and then to identify the moving direction thereof. Comfortable localized air-conditioning can be realized since a wind direction control device controls a duct drive device of the blow-off duct in response to a human body detected signal and movement signal outputted by the human body detection device, and thus rotating the blow-off duct in accordance with the movement of the person to be air-conditioned.

28 Claims, 27 Drawing Sheets

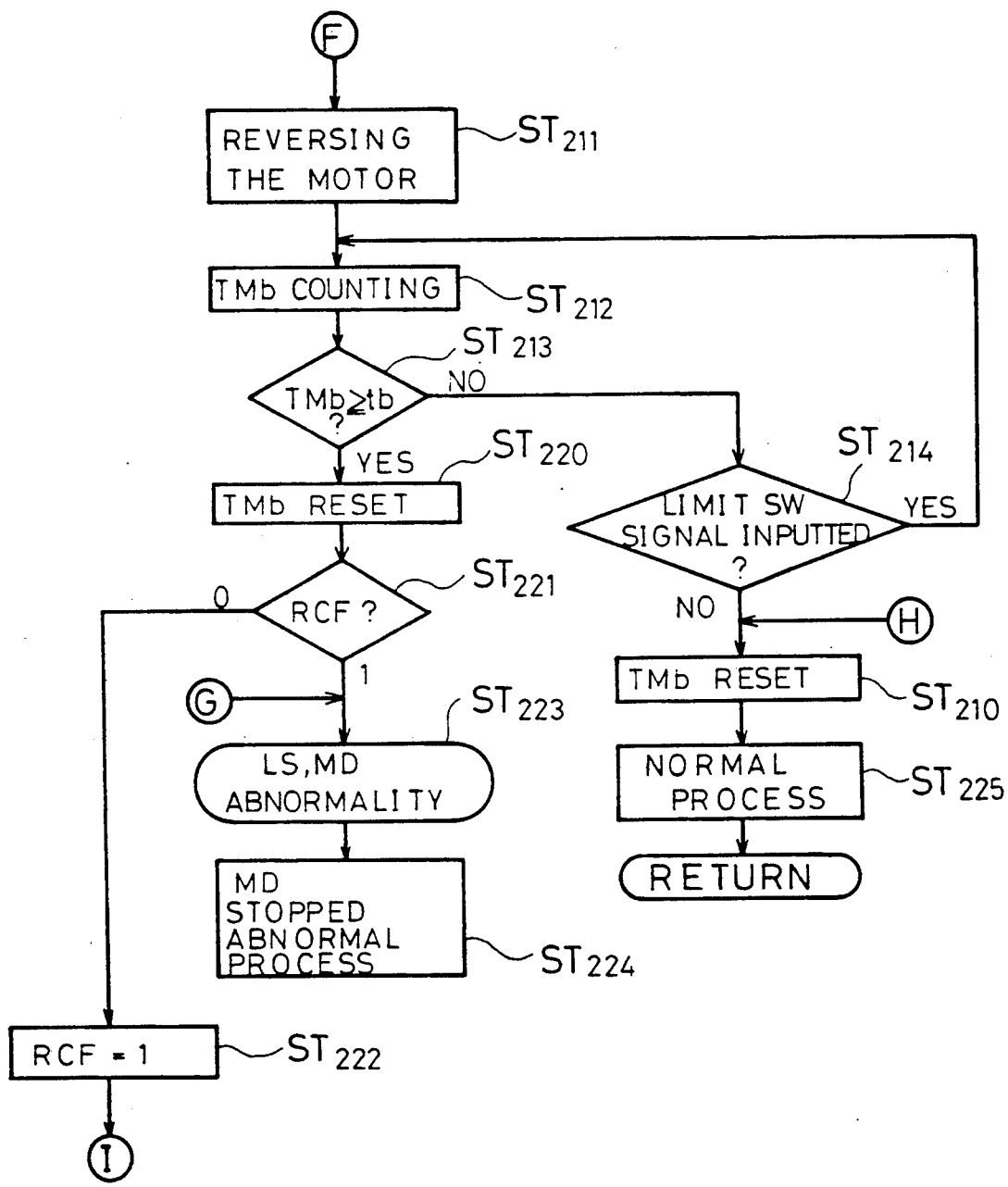

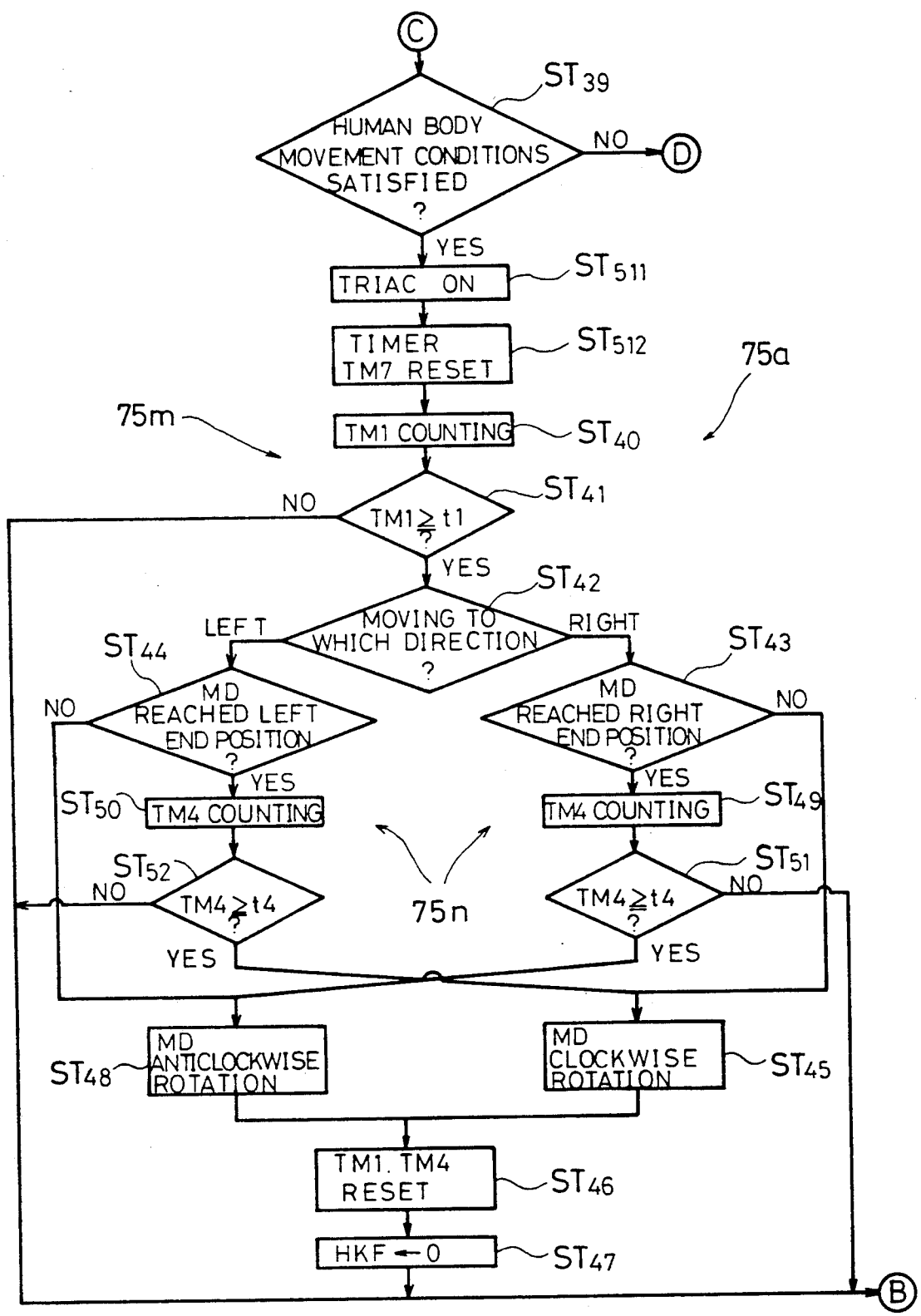

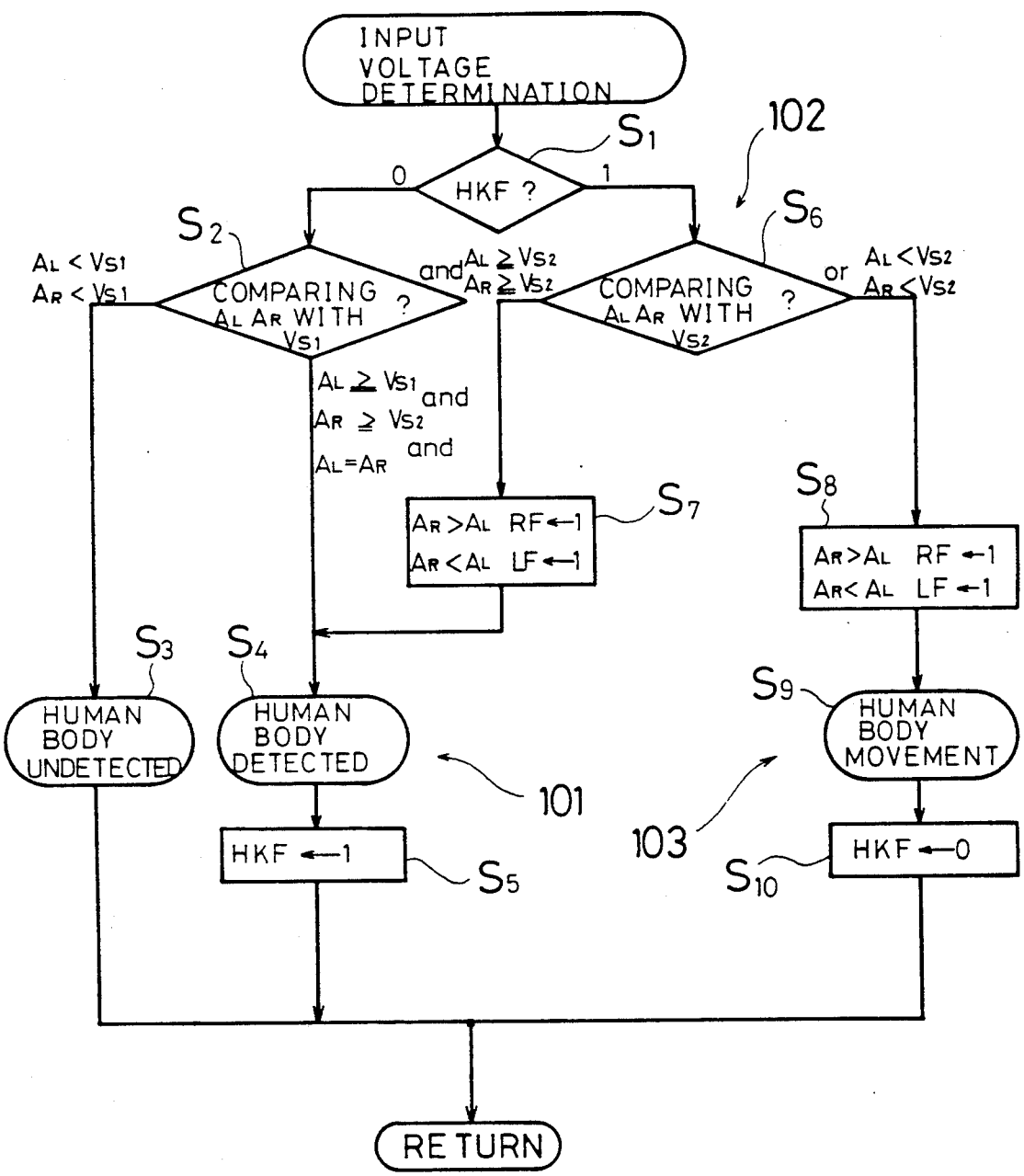

SPOT AIR-CONDITIONER

TECHNICAL FIELD

This invention relates to a spot air-conditioner for use in localized air cooling, and more particularly to a spot air-conditioner wherein the wind direction thereof is controlled by drive-controlling a blow-off duct.

BACKGROUND ART

Generally, spot air-conditioners for localized air cooling have been used to improve working environment of various manufacturing facilities. As disclosed in Japanese Utility Model Application Laying Open Gazette No. 61-101333, a typical spot air-conditioner is so constructed that a refrigerant circuit including a compressor, a condenser, an evaporator and an expansion mechanism, as well as a fan for condensation and a fan for evaporation are accommodated in a housing mounted on a wagon. With the above construction, the conventional spot air-conditioner blows off cooled-air which is heat-exchanged by the evaporator toward human operators. The cooled air is blown off from a blow-off duct connected with the upper portion of the housing.

The blow-off duct is connected with a swing cylinder. This swing cylinder is supported on the housing by means of a pin secured in the direction of diameter thereof. And a motor is connected with the swing cylinder by a link mechanism. The blow-off duct is swung by the activation of the motor to ensure an extensive air cooling.

In the above spot air-conditioner, the motor is driven or halted by means of a swing switch, thereby selecting a stationary mode or swing mode of the blow-off duct.

However, the problem is that this type of spot air-conditioner does not consider probable movement of operators, i.e. target persons for air conditioning. Therefore, if an operator leaves his position, the air-conditioning in the stationary mode results in the cooled air blown off to the unnecessary direction. Accordingly, the air conditioning becomes wasteful and desirable comfortableness cannot be achieved. In addition, the air-conditioning in the swing mode results in only the intermittent exposure of an operator to cooled air since the direction of cooled air varies regardless of the movement of the operator. Therefore, again sufficient comfortableness cannot be obtained. Considering that the optimum air conditioning is achieved in spot air-conditioners when the air-conditioner blows off cooled air directly toward operators, the intermittent exposure to cooled air cannot improve comfortableness in working environment.

It is thus an object of the present invention to provide a spot air-conditioner which controls a blow-off duct so as to keep track of the movement of a target person to be air-conditioned by detecting the presence of the human body with human body detection means, thereby improving comfortableness of air conditioning.

DISCLOSURE OF INVENTION

To achieve the aforementioned object, the first invention provides an air-conditioner (12) which sucks in room air and then generates conditioned air. The first invention comprises: a blow-off duct (16) rotatably mounted on the air-conditioner (12) for blowing off the conditioned air; duct drive means (2) for rotating the blow-off duct (16) in relation to the air-conditioner (12) to vary the direction of blown-off air; human body detection means (72) for detecting a person to be air-conditioned in a target area for air conditioning; and wind direction control means (75a), responsive to human body detected signal outputted by the human body detection means (72), for controlling the duct drive means (2) so as to direct the blow-off duct (16) toward the person to be air-conditioned.

In the above first invention, the human body detection means (72) is a single human body detection sensor which detects a person to be air-conditioned by scanning the target area for air-conditioning.

Further, in the first invention, the human body detection means (72) is a human body detection device which detects the presence of a person to be air-conditioned in the plane detection region against the background having a fixed amount of infrared rays. The human body detection means (72) comprises: a pair of radiation means ($H_1$), ($H_2$) for alternately radiating infrared rays, each having a fixed radiation directional angles ($\pm\theta_H$), ($\pm\theta_H$) in the detection region and disposed at a certain opening angle so that radiation directional angles ($\pm\theta_H$), ($\pm\theta_H$) do not overlap each other; single radiation receiving means (J) interposed between the radiation means ($H_1$), ($H_2$) in the detection region for receiving reflection of the infrared rays radiated from the radiation means ($H_1$), ($H_2$), said radiation receiving means (J) having a fixed radiation receiving directional angle ($\pm\theta_J$) which partially overlaps with the radiation directional angles ($\pm\theta_H$), ($\pm\theta_H$) of each radiation means ($H_1$), ($H_2$); human body detection and determination means (75h), responsive to the output from the radiation receiving means (J), for outputting a human body detection signal when the amounts of reflection of infrared rays radiated from each radiation means ($H_1$), ($H_2$) both exceed a set value.

The second invention provides, first, an air-conditioner (12) which sucks in room air and then generates conditioned air. Also provided are: air conditioning control means (8) for controlling an air conditioning operation of the air-conditioner (12); a blow-off duct (16) rotatably mounted on the air-conditioner (12) for blowing off the conditioned air; duct drive means (2) for rotating the blow-off duct (16) in relation to the air-conditioner (12) to vary the direction of blown-off air. Further provided in the second invention is human body detection means (72) for outputting a human body detected signal or a human body undetected signal respectively when detecting or not detecting a person to be air-conditioned in the target area for air conditioning. The human body detection means (72) also outputs a movement signal when detecting any movement of the person to be air-conditioned. Yet another element included in the second invention is wind direction control means (75a), responsive to the human body detected signal or movement signal outputted by the human body detection means (72), for controlling the duct drive means (2) so as to direct the blow-off duct (16) toward the person to be air-conditioned in accordance with the movement thereof.

In the above second invention, the human body detection means (72) comprises a human body detection device which detects the presence of human bodies to be air conditioned in the plane detection region perpendicular to the background. The human body detection means (72) comprises: a pair of radiation means ($H_1$), ($H_2$) for alternately radiating infrared rays, each having a fixed radiation directional angles ($\pm\theta_H$), ($\pm\theta_H$) in the detection region and disposed at a certain opening angle so that radiation directional angles ($\pm\theta_H$), ($\pm\theta_H$) do not overlap each other; single radiation receiving means (J) interposed between the radiation means (H$_1$), (H$_2$) in the detection region for receiving reflection of the infrared rays radiated from the radiation means (H$_1$), (H$_2$), said radiation receiving means (J) having a fixed radiation receiving directional angle ($\pm\theta_J$) which partially overlaps with the radiation directional angles ($\pm\theta_H$), ($\pm\theta_H$) of each radiation means (H$_1$), (H$_2$); human body detection and determination means (75$h$), responsive to the output from the radiation receiving means (J), for outputting a human body detected signal when the amounts of reflection of infrared rays radiated from each radiation means (H$_1$), (H$_2$) both exceed a set value, and for outputting a human body undetected signal when the amounts of reflection of infrared rays radiated from each radiation means (H$_1$), (H$_2$) are both not more than a set value or either one is not more than a set value; and human body movement determination means (75$i$) for outputting a movement signal upon determining that the person to be air-conditioned moves to the directional angle ($\pm\theta_H$) area of the other radiation means (H$_2$) or (H$_1$) when, after receiving the human body detected signal from the human body detection and determination means (75$h$), the amount of reflection of infrared rays radiated from either of the radiation means (H$_1$) or (H$_2$) becomes lower than a set value.

In the first and second inventions, the human body detection means (72) is provided at the head portion of the blow-off duct (16).

In the second invention, the wind direction control means (75$a$) controls the duct drive means (2) to move the blow off duct (16) toward the person to be air-conditioned within the air-conditioning area having a predetermined angle which is set with a mounting point of the blow-off duct (16) as the central axis.

The second invention provides drive delay means (75$m$), responsive to the movement signal from the human body detection means (72), for outputting the movement signal to the wind direction control means (75$a$) after a fixed time (t$_1$) corresponding to the time needed for the slight movement of the person to be air-conditioned passes.

The second invention further provides position detection mean (7) for detecting a rotation limit position of the blow off duct (16) corresponding to the end portions of the air-conditioning area, and duct stop means (75$n$) responsive to a position signal from the position detection means (7) and a movement signal from the human body detection means (72) for controlling the duct drive means (2) to stop the blow-off duct (16) at the rotation limit position when the person to be air-conditioned moves out of the air-conditioning area.

The second invention yet further provides: short standby means (75$j$), responsive to the human body undetected signal outputted by the human body detection means (72) after the output of the human body detected signal therefrom, for controlling the air-conditioning control means (8) to stand by for a fixed time (t$_2$) in the state of the air-conditioning operation before the human body undetected signal is outputted; and long standby means (75$l$) for controlling the air-conditioning means (8) and the duct drive means (2), when a fixed period of time (t$_2$) set by the short standby means (75$j$) passes without any detection signal from the human body detection means (72), to stop air-conditioning and duct movement operation and stand by for a fixed time (t$_3$) in such a state that the air-conditioning means (8) and the duct drive means (2) automatically return to operation in response to the human body detected signal from the human body detection means (72). Additionally, when a predetermined standby period (t$_3$) passes without any detection signal from the human body detection means (72), the long standby means (75$l$) carries out the system-down of the air-conditioning control means (8) in such a state that the air-conditioning operation cannot be resumed automatically. Or the long standby means (75$l$) controls the duct drive means (2) to stop and stand by the blow-off duct (16) at the center of the air-conditioning area.

The second invention provides human body search means (75$k$) for searching any person to be air-conditioned by scanning the air-conditioning area with the human body detection means (72) in response to the human body undetected signal from the human body detection means (72).

The human body search means (75$k$) controls the duct drive means (2) so that the blow-off duct (16) automatically swings within the air-conditioning area, thereby scanning the air conditioning area with the human body detection means (72) which is attached at the head portion of the blow-off duct (16). The human body search means (75$k$) searches persons to be air-conditioned in the state of air-conditioning before the output of the human body undetected signal from the human body detection means (72).

The second invention includes: mode switching means (76) for switching the control mode of the blow-off duct (16) by manually selecting a suitable mode from a stationary mode, an automatic swing mode, and a human body tracking mode; position detection means (7) for detecting rotation limit positions of the blow-off duct (16) on both ends thereof and for outputting a position signal when the blow-off duct (16) is in the rotation limit positions; stationary control means (75$b$) for controlling the duct drive means (2) to hold the blow-off duct (16) in the stationary state when the blow-off duct (16) is set in the stationary mode by the mode switching means (76); automatic swing means (75$c$) responsive to the position signal from the position detection means (7) for controlling the duct drive means (2) to reverse the blow-off duct (16), and thereby initiating the reciprocating pivotal movement of the blow-off duct (16), when the blow-off duct (16) is set in the automatic swing mode by the mode switching means (76). Further, the wind direction control means (75$a$) controls the duct drive means (2) in response to a human body tracking mode signal from the mode switching means (76).

The second invention yet further provides air-conditioning stop means (75$d$) for controlling the air-conditioning control means (8), when a predetermined air-conditioning time (t$_5$) passes without any human body detected signal from the human body detection means (72) during the output of the stationary mode signal or automatic swing mode signal of the mode switching means (76), to stop the air-conditioning operation in such a state that the air-conditioning operation can be resumed in response to the human body detected signal from the human body detection means (72). Also provided is system stop means (75$e$) for controlling the air-conditioning means (8), when a predetermined air-conditioning stop time (t$_6$) passes without any human body detected signal from the human body detection means (72) after the air-conditioning stop means (75d) outputs a stop signal, to carry out the system-down in such a state that the air-conditioning operation cannot be resumed automatically. In addition, switching means for automatic stopping (84) for ON/OFF-controlling the air-conditioning stop means (75d) is included in the second invention.

In the second invention, while mode switching means (76) for manually selecting a suitable mode of the blow-off duct (16) between the stationary mode and the human body tracking mode, and stationary control means (75b) for controlling the duct drive means (2) to hold the blow-off duct (16) in the stationary state when the blow-off duct (16) is set in the stationary mode by the mode switching means (76) are provided, the wind direction control means (75a) controls the duct drive means (2) in response to the human body tracking mode signal from the mode switching means (76). Further, in the second invention, while mode switching means (76) for manually selecting a suitable mode of the blow-off duct (16) between the automatic swing mode and the human body tracking mode, position detection means (7) for detecting the rotation limit positions of the blow-off duct (16) on both ends thereof and outputting the position signal when the blow-off duct (16) is in each rotation limit position, and automatic swing means (75c) responsive to the position signal from the position detection means (7) for controlling the duct drive means (2), when the blow-off duct (16) is set in the automatic swing mode by the mode switching means (76), to reverse the blow-off duct (16), and thereby initiating the reciprocating pivotal movement of the blow-off duct (16) are provided, the wind direction control means (75a) controls the duct drive means (2) in response to the human body tracking mode signal from the mode switching means (76).

The above-mentioned spot air-conditioner includes air-conditioning stop means (75d) for controlling the air-conditioning control means (8), when a predetermined air-conditioning time (t5) passes without any human body detected signal from the human body detection means (72) during the output of the stationary mode signal or automatic swing mode signal of the mode switching means (76), to stop the air-conditioning operation in such a state that the air-conditioning operation can be resumed in response to the human body detected signal from the human body detection means (72).

Further included in the second invention are: angular position member (170) wherein a plurality of projected portions (172) and recessed portions (173), both having a fixed width, are alternately formed in the outer periphery of the blow-off duct (16) corresponding to the rotation angular positions of the blow-off duct (16); position detection means (174) for detecting the projected portions (172) and the recessed portions (173) of the angular position member (170) without making contact therewith; central position determining means (182b), responsive to the output signal from the position detection means (174), for determining the central position of the angular position member (170); rotation control means (182c) responsive to the output signal from the position detection means (174) and the central position determining means (182b) for determining the rotational angle of the blow-off duct (16) and for controlling the duct drive means (2) so that the blow-off duct (16) pivotally moves within the fixed rotation range.

The above-mentioned spot air-conditioner further includes initial drive means (182e) for controlling the duct drive means (2) to rotate the blow-off duct (16) in one direction at the initial stage of the rotation control of the blow-off duct (16), end side end position control means (182f), responsive to the output signal from the position detection means (174), for determining the side end positions of the angular position member (170) with the rotation of the blow-off duct (16) by the initial drive means (182e), thereby controlling the duct drive means (2) to reverse the blow-off duct (16).

Among the recessed portions (173) of the angular position member (170), side end recessed portions (173c) located on both side ends are formed to have relatively large width, and other intermediate recessed portions (173b) and the central recessed portion (173a) are formed to have smaller width than the side end recessed portions (173c). Among the projected portions (172), central projected portions (172a) located on both sides of the central recessed portion (173a) are formed to have a relatively large width, and other side projected portions (172b) are formed to have smaller width than the central projected portions (172a). The central position determining means (182b) is provided with counting means (TMd) having a predetermined counting period which is set shorter than the detection output period of the central projected portion (172a) by the position detection means (174) and longer than the detection output period of the side projected portion (172b), and determining means (182d) for determining the central position when the position detection means (174) outputs the recessed portion detection signal after continuously outputting the projected portion detection signal exceeding the set period counted by the counting means (TMd). The side end position control means (182f) is provided with counting means (TMe) having a predetermined counting period which is set longer than the detection output period of the intermediate recessed portion (173b) by the position detection means (174), and determining means (182g) for determining the side end positions when the position detection means (174) continuously outputs the recessed portion detection signal exceeding the set period counted by the counting means (TMe).

Further provided are abnormal counting means (TMc) having a predetermined abnormal period which is set longer than the set period counted by each counting means (TMd), (TMe) respectively of the central position determining means (182b) and the side end position control means (182f), and abnormality detection means (182h) for determining the abnormality when the position detection means (174) continuously outputs a single recessed portion detection signal or projected portion detection signal exceeding the abnormal period counted by the abnormal counting means (TMc).

In addition, as the human body detection device in the second invention, a pair of radiation means (H$_1$), (H$_2$) disposed at the fixed opening angle for alternately radiating infrared rays, and radiation receiving means (J) interposed between the radiation means (H$_1$), (H$_2$) for detecting the infrared rays input value in response to the reflection of infrared rays radiated from the radiation means (H$_1$), (H$_2$) are provided. The human body detection device still further comprises: human body detection means (101) responsive to the output from the radiation receiving means (J) for outputting the human body detected signal when the input values of infrared rays radiated from each radiation means (H$_1$), (H$_2$) both exceed a fixed first set value; comparing means (102) for comparing the input values of infrared rays radiated from the pair of the radiation means (H$_1$), (H$_2$) with a second set value after receiving the human body detected signal from the human body detection means (101), in order to determine whether the input values are lower than the second set value which is lower than the first set value by a fixed amount; and human body movement detection means (103) responsive to the output from the comparing means (102) for determining the movement of the person to be air-conditioned to the side of the other radiation means (H$_2$ or H$_1$) and for outputting the human body movement signal when the input value from either one radiation means (H$_1$ or H$_2$) becomes lower than the second set value.

With the above construction, in the first invention, the human body detection means (72) monitors whether any persons to be air-conditioned, for instance, operators in shop floors, are present in the air-conditioning area.

Meanwhile, the air-conditioner (12) sucks room air and generates conditioned air, for example, cooled or warm air, to blow off from the blow-off duct (16).

When the human body detection means (72) detects the presence of an operator, responding to the human body detection signal from the human body detection means (72), the wind direction control means (75a) controls the duct drive means (2), for example, controls the motor (41) of the duct drive means (2), to direct the blow-off duct (16) toward the operator.

In the second invention, when the operator moves to the right or left, the human body detection means (72) detects the movement and outputs the movement signal. In response to this movement signal, the wind direction control means (75a) controls the duct drive means (2) so that the blow-off duct (16) rotates and keeps track of the movement of the operator.

In this human body tracking mode, the drive delay means (75m) delays the start of tracking in such a manner that the blow-off duct (16) begins its tracking with short time lag (t$_1$), for example one minute, after receiving the movement signal from the human body detection means (72). Accordingly, accurate tracking of the operator's movement can be possible.

In the human body detection means (72) of the second invention, the radiation receiving means (J) receives infrared rays which are radiated from the pair of the radiation means (H$_1$), (H$_2$) and reflected by objects. Then, the human body detection and determination means (75h) outputs the human body detected signal when reflected infrared rays radiated from each radiation means (H$_1$), (H$_2$) both exceed a set value, or otherwise outputs the human body undetected signal.

In this case, the radiation means (H$_1$), (H$_2$) have enough opening angle therebetween so that respective directional angle ($\pm\theta_H$) of each radiation means (H$_1$), (H$_2$) do not overlap each other. Accordingly, even if there are mirror reflectors such as glass or iron plate in the background, there will be no such a case that infrared rays from both radiation means (H$_1$), (H$_2$) are simultaneously incident upon the radiation receiving means (J) with the intensity larger than a set value due to reflection. Therefore, a false detection concerning the presence of operators will never occur.

On the other hand, the radiation directional angles ($\pm\theta_H$) of each radiation means (H$_1$), (H$_2$) and the radiation receiving directional angle ($\pm\theta_J$) of the radiation receiving means (J) are set to overlap each other. This means that when a human body is present between both radiation directional angles ($\pm\theta_H$) of the radiation means (H$_1$), (H$_2$), reflections of infrared rays radiated from each radiation means (H$_1$), (H$_2$) are diffused by the clothes surface of the operator, and infrared rays from both radiation means (H$_1$), (H$_2$) are simultaneously reflected on the radiation receiving means (J). Thus, the presence of the operator is reliably detected.

When infrared rays from either one radiation means (H$_1$ or H$_2$) becomes lower than a set value after the presence of an operator is detected in the above-mentioned manner, the human body movement determination means (75i) determines that the operator moves to the area covered by the radiation directional angle ($\pm\theta_H$) of the other radiation means (H$_2$ or H$_1$).

In this case, even if the infrared ray intensity of either one radiation means (H$_1$ or H$_2$) incidentally becomes larger than a set value due to the presence of mirror reflectors other than the operator, this will never be falsely detected as the human movement as long as the human body detection and determination means (75h) does not issue the human body detection signal previously. In this way, the direction of the movement of the operator can be detected with a simple construction comprising a pair of radiation means (H$_1$), (H$_2$) and a single radiation receiving means (J) without requiring additional detection device.

Rotational range of the blow-off duct (16) is restricted by the position detection means (7). When the operator moves out of the air-conditioning area beyond this rotation limit position, the duct stop means (75n) stops the blow-off duct (16) in this rotation limit position, for example in the right end of the air-conditioning area. Later when the operator reenters the air-conditioning area from the right end thereof, the blow-off duct (16) resumes its tracking of the operator's movement.

When the operator leaves the air-conditioning area and the human body detection means (72) outputs the human body undetected signal, the short standby means (75j), in response to this human body undetected signal, controls the air-conditioning control means (8) to stand by in a state of air-conditioning before the output of the human body undetected signal. Upon the operator's return before the standby time (t$_2$) of the short standby means (75j) passes, the blow-off duct (16) resumes its tracking. However, in case when the operator does not return to the air-conditioning area, the long standby means (75l) controls the air-conditioning control means (8) to stop and stand by in a state that the air-conditioning operation can be resumed automatically. Upon the operator's return before the standby time (t$_3$) of the long standby means (75l) passes, air-conditioning operation as well as the tracking of the blow-off duct (16) is resumed with the output of the human body detected signal from the human body detection means (72).

The long standby means (75l) controls the blow-off duct (16) to stop and stand by at the center of the air-conditioning area as well as controls the air-conditioning control means (8), when the standby time (t$_3$) passes, to carry out system-down to a state that air-conditioning operation cannot be resumed automatically.

In case of no detection of the operator by the human body detection means (72), the human body search means (75k), in response to the human body undetected signal, scans the air-conditioning area with the human body detection means (72), for example, automatically swings the blow-off duct (16) to search the operator. In this case, this search is carried out in a state of air-conditioning before the output of the human body undetected signal, for example, in a state of temperature control or ventilation control if temperature control mode or ventilation control mode is selected before the output of the human body undetected signal.

Cooled air is blown off from the blow-off duct (16) which is kept in the fixed position by the stationary control means (75b) when the mode switching means (76) is set in the stationary mode, or which is swung automatically when the mode switching means (76) is set in the automatic swing mode. In case of the human body tracking mode of the mode switching means (76), the wind direction control means (75a) controls the duct drive means (2) to direct the blow-off duct (16) toward the operator.

In case of the stationary mode or the automatic swing mode of the mode switching means (76), especially when the air-conditioning stop means (75d) is set to be activated by the switching means for automatic stopping (84), air-conditioning operation is stopped in an automatically restorable state if the air-conditioning time (t₅) passes without any human body detection by the human body detection means (72). Later, then, in case of no return of the operator, the system stop means (75e) controls the air-conditioning control means (8) to carry out system-down to an automatically unrestorable state if the air-conditioning stop time (t₆) passes.

While the blow-off duct (16) is pivotally moved by the duct drive means (2), the angular position member (170) rotates along with the pivotal movement of the blow-off duct (16). The position detection means (174) detects the projected portion (172) and the recessed portion (173) of the angular position member (170). Based on the output signal from this position detection means (174), the central position determining means (182b) determines the central position, i.e. the axial center of rotation, of the angular position member (170). More specifically, the counting means (TMa) carries out its counting at every projected portion detection signal outputted by the position detection means (174). And when the recessed portion detection signal is outputted after the projected portion detection signal is continuously issued exceeding a set period counted by the counting means (TMa), the determining means (182d) determines the central position. Responding to the determination of the central position and the output signal from the position detection means (174), the rotation control means (182c) controls the rotation of the blow-off duct (16), for example, to swing automatically within the range of 100 degrees, or to swing till it stops at a certain angle.

At the initial phase of the above rotation control, for instance, the initial phase of the automatic swing control, the initial drive means (182e) rotates the blow-off duct (16) to one direction while the side end position control means (182f) detects the side end position of the angular position member (170), i.e. the side end position of the travel of the blow-off duct (16), and then reverses the blow-off duct (16). More specifically, when the position detection means (174) outputs the recessed portion detection signal exceeding a set time counted by the counting means (TMe), the determining means (182g) determines the side end position, and then reverses the blow-off duct (16). Subsequently, the above central position determining means (182b) determines an axial center of rotation.

Counting operation of each counting means (TMd), (TMe) leads to the activation of the abnormal counting means (TMc). When the position detection means (174) continuously outputs the projected or recessed portion detection signal exceeding a fixed time counted by the abnormal counting means (TMc), the abnormality detection means (182h) detects the occurrence of abnormality and lights an abnormality indication lamp.

In the improved human body detection device of the above second invention, when there is a human body present in the front, infrared rays radiated from the pair of the radiation means (H₁), (H₂) reflects in a diffused manner due to the clothes that the person is wearing. As a result, input values of infrared rays into the radiation receiving means (J) both exceed a first set value. Consequently, the human body detection means (101) outputs the human body detection signal, indicating the presence of a human body. At the same time, the comparing means (102) compares an input value of infrared rays with a second set value which is lower than a first set value by a fixed amount. The human body movement determining means (103) determines a movement of a human body and outputs the human body detection signal only when either input value is proved to be lower than the second set value by the comparing means (102). Therefore, even if other human body goes across in front of or behind the human body under tracking, there will be no such a case that either on input value becomes not more than the second set value due to infrared ray reflection caused by the other human body as long as the person under tracking remains stationary. Accordingly, false determination as to the movement of the person under tracking will be prevented.

Since the spot air-conditioner in the first invention is provided with the human body detection means (72) so as to direct the blow-off duct (16) to a target person to be air-conditioned based on the human detection signal therefrom, conditioned air can be reliably blown off to the target person. Thus, comfortableness in air-conditioning is remarkably improved and the maximum effect of localized air-conditioning can be obtained.

The spot air-conditioner requires only one human body detection means to conduct human body detection, thereby reducing the number of necessary components and operating cost.

According to the second invention, the blow-off duct (16) keeps track of the movement of a person to be air-conditioned. As a result, conditioned air can be reliably blown off to the target person even if the target person moves in order to perform various operations. Thus, comfortableness in air-conditioning is greatly improved. Further, an automatic tracking of the blow-off duct (16) makes it unnecessary for the target person to vary the direction of conditioned air, thereby achieving effective operation.

Reliable detection of a target person to be air-conditioned in front of the blow-off duct (16) enables necessary signal processing with a simple configuration. Additionally, the blow-off duct (16) can consistently keep track of a human body in any working space in which the target person is present.

The human body detection means (72) disposes the pair of infrared rays radiation means (H₁), (H₂) on both sides of a single infrared rays radiation receiving means (J) so as to avoid the interference of radiation directional angle areas thereof. On the other hand, the human body detection means (72) disposes the pair of infrared rays radiation means ($H_1$), ($H_2$) so that the radiation directional angle areas thereof and the radiation receiving directional angle area of the radiation receiving means (J) overlap each other. With this arrangement, the detection signal of a human body to be air-conditioned is outputted only when the amounts of infrared rays reflection radiated from the radiation means ($H_1$), ($H_2$) are both not less than a set amount. This means that the presence of a human body to be air-conditioned can be reliably detected regardless of any mirror reflectors present in the rear or an ambient air temperature, thereby improving the accuracy of the human body detection. Movement of the target person to a radiation directional angle area of the other radiation means ($H_1$ or $H_2$) is determined when infrared rays intensity from either one radiation means ($H_1$ or $H_2$) becomes lower than a set value after the output of the human body detected signal. Therefore, movement of the target person to be air-conditioned can be accurately detected by this simply-constructed human body detection means (72) without requiring an additional detection device.

A short period of delay time ($t_1$) is set for the blow-off duct (16) to follow the movement of the target person. Accordingly, in the case when the person short moves to the right or left and then immediately returns to the former position, the blow-off duct (16) stays in the same position and does not begin tracking. In this way, unnecessary motion of the blow-off duct (16) can be prevented, thereby achieving highly accurate control and improving reliability of wind direction control.

Since the blow-off duct (16) halts its motion at the rotation limit position thereof when the target person moves out of the air-conditioning area, the target person can be instantaneously exposed to conditioned air upon returning to the air-conditioning area from the rotation limit position. This mechanism is effective because the target person is most likely to return to the air-conditioning area from the direction where he has left, especially in case of temporary absence. In this way, conditioned air can be instantaneously blown off to the target person, thereby further improving comfortableness in working environment. In addition, even when the target person moves out of the air-conditioning area, the blow-off duct (16) stands by so as to instantaneously resume its operation upon the return of the target person, thereby further improving comfortableness and achieving effective operation. In case when the target person stays away from the air-conditioning area for a long period of time, air-conditioning operation is stopped so as to avoid wasteful use of electricity and to realize energy-saving operation. On the other hand, air-conditioning operation is automatically resumed upon the return of the target person so as to achieve an effective operation. In the case when the target person continuously stays away from the air-conditioning area for a long period of time, system-down is carried out so as not to resume air-conditioning operation inadvertently, thus enabling highly accurate air-conditioning control. In this case, the blow-off duct (16) is halted at the center of the air-conditioning area in order to promptly respond to the return of the target person.

The human body search means (75k) is provided to search a human body to be air-conditioned. This means that conditioned air is automatically blown off to a person to be air-conditioned when he enters into the air-conditioning area. Accordingly, comfortableness can be improved and effective operation can be achieved. The human body detection means (72) scans the air-conditioning area with the automatic swing of the blow-off duct (16) without requiring independent scanning means. As a result, overall construction can be simplified and the blow-off duct (16) can be directed accurately to the target person in accordance with the output signal from the human body detection means (72). This search is conducted in the air conditioning state before the output of human body undetected signal by the human body detection means (72). Accordingly, a person to be air-conditioned can feel cooled air as soon as he enters into the air-conditioning area, thereby further enhancing comfortableness in work place.

Three modes are available for the blow-off duct (16). More specifically, the blow-off duct (16) can be controlled in the stationary mode, the automatic swing mode, or the human body tracking mode in accordance with number of persons to be air-conditioned or work they are engaged in. In this way, the spot air-conditioner in this invention can realize air-conditioning operation which can meet various conditions in work environment. In addition, air-conditioning operation will be stopped in the case when there is no target person to be air-conditioned in the air-conditioning area. This leads to prevention of unnecessary air-conditioning operation and realization of energy saving. When the target person is away from the air-conditioning area long, system-down will be carried out. Therefore, there will be no inadvertent resumption of air-conditioning operation, enabling highly accurate air-conditioning control. Air-conditioning operation can be set in automatic stop mode. Accordingly, air-conditioning in this invention can satisfy requirement in various mode of use.

The position detection means (174) in the second invention detects the projected portions (172) and the recessed portions (173) of the angular position member (170) in non-contacting manner and outputs detection signal. Rotation angle of the blow-off duct (16) is determined by this detection signal. In this way, unlike a limit switch, the detection means in this invention does not have a contacting portion or a mechanical drive portion. This has led to longer service life of the detection means. Further, since installation accuracy is not required in the detection means etc., reliability of angle detection can be improved. In contrast with a detection method of using rotation time of the blow-off duct (16), angle is detected by detecting of the projected portions (172) and the recessed portions (173) in this invention. Consequently, accurate angle detection can be possible without any correction of characteristic of the duct drive means (2), i.e. correction of frequency of motor electric power. As a result, accuracy of rotation control of the blow-off duct (16) can be improved.

Determination of rotation angle of the blow-off duct (16) by the position detection means (174) enables the rotation of the blow-off duct (16) by the use of an axially rotating rotary cylinder. Thus, sealability between the air-conditioner (12) and the blow-off duct (16) can be improved. Furthermore the duct drive means (2) can be provided outside of the passage of the conditioned air, thereby increasing air-conditioning efficiency.

At the initial phase of control, side end positions of the angular position member (170) are detected. This realizes accurate detection of the central position of the angular position member (170) at a later period even when the blow-off duct (16) stops in either direction. In this way, detection accuracy can be improved. The central position and side end positions can be detected since width of the projected portions (172) and the recessed portions (173) is differentiated. This promises accurate detection of angle. The abnormality detection means (182h) detects abnormality of the motor etc. without fail, thus improving reliability of rotation control.

A human body detection device is constituted in such a manner that the pair of infrared rays radiation means ($H_1$), ($H_2$) are disposed at a fixed opening angle and the radiation receiving means (J) is interposed therebetween. The human body detection device outputs the human body detection signal when an input value of infrared rays radiated from each radiation means ($H_1$), ($H_2$) becomes not less than the first set value. The human body detection device also outputs the human body movement signal when, during an input of the human body detected signal therefrom, an input value from either one radiation means ($H_1$) or ($H_2$) becomes not more than the second set value which is lower than the first set value by a fixed amount. With these arrangements, false detection of human body movement will not occur even when other human body goes across before or behind the person under tracking. Thus, reliability of human body tracking mechanism can be improved.

BRIEF DESCRIPTION OF DRAWINGS

FIGS. 1 through 39 show embodiments of the present invention, in which:

FIG. 1 is a front view of a transverse cross section of a spot air-conditioner;

FIG. 2 is a side view of a longitudinal section of the spot air-conditioner;

FIG. 3 is an enlarged vertical section of a duct drive means;

FIG. 4 is a sectional view taken along the line I—I of FIG. 3;

FIG. 5 is a sectional view taken along the line V—V of FIG. 4;

FIG. 6 is a sectional view taken along the line II—II of FIG. 3;

FIG. 7 is a sectional view taken along the line III—III of FIG. 3;

FIG. 8 is a sectional view taken along the line IV—IV of FIG. 3;

FIG. 9 is a sectional view of a human body detection sensor;

FIG. 10 is an explanatory view showing the positional relation between a radiation element and a radiation receiving element;

FIG. 11 is a view illustrating propagation state of infrared rays from the human body detection sensor against a mirror reflector;

FIG. 12 is a similar view to FIG. 11, illustrating propagation state of infrared rays against an inclined mirror reflector;

FIG. 13 is a similar view to FIG. 11, illustrating propagation state of infrared rays against clothes of an operator;

FIG. 14 is a similar view to FIG. 11, illustrating propagation state of infrared rays against clothes when the operator is moving;

FIG. 15 is a block diagram showing the control of the spot air-conditioner;

FIG. 16 is a detailed circuit diagram showing the control of the spot air-conditioner;

FIG. 17 is a control flow diagram showing signal processing of the human body detection sensor;

FIG. 18 is a timing chart of an input of the signal from the human body detection sensor;

FIGS. 19, 20, 21A, 21B, 22, 23, 24, 25A, 25B are control flow chart showing air-conditioning processing of the spot air-conditioner;

FIG. 26 is a perspective view showing a modified example of a rotary cylinder;

FIG. 27 is a view similar to FIG. 26, but showing a partly sectional view thereof;

FIG. 28 is a bottom plan view of an angular position member;

FIG. 29 is a view similar to FIG. 28, but showing a development thereof;

FIG. 30 is a detailed circuit diagram, partly showing a control circuit of the spot air-conditioner;

FIG. 31 is a control flow chart illustrating angle detection;

FIG. 32 is a control flow chart illustrating abnormality detection;

FIG. 33 shows time charts illustrating variation of human body detection state, with an upper time chart showing ON/OFF state of a first radiation element, a middle time chart showing ON/OFF state of a second radiation element, and a lower time chart showing changes of input values of the radiation element;

FIG. 34 is a time chart showing variation of input values of infrared rays when the human body is moving transversely; and FIG. 35 is a flow chart showing the control in determining input values.

BEST MODE FOR CARRYING OUT THE INVENTION

An embodiment of the invention is hereinafter described with reference to the accompanying drawings.

Figure 2:
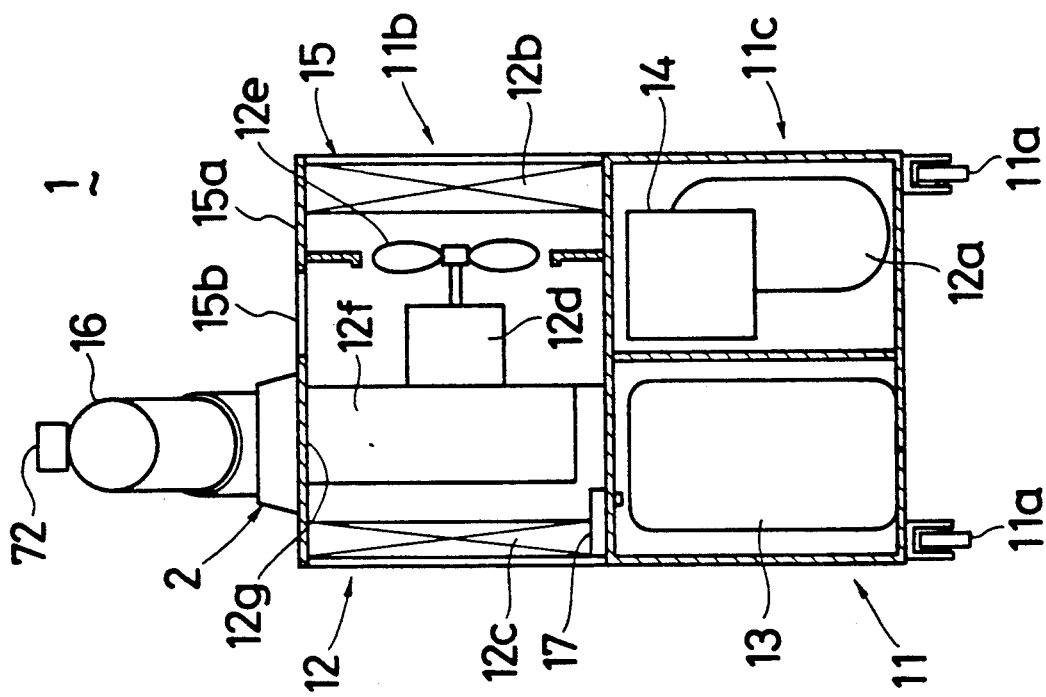
Figure 1:
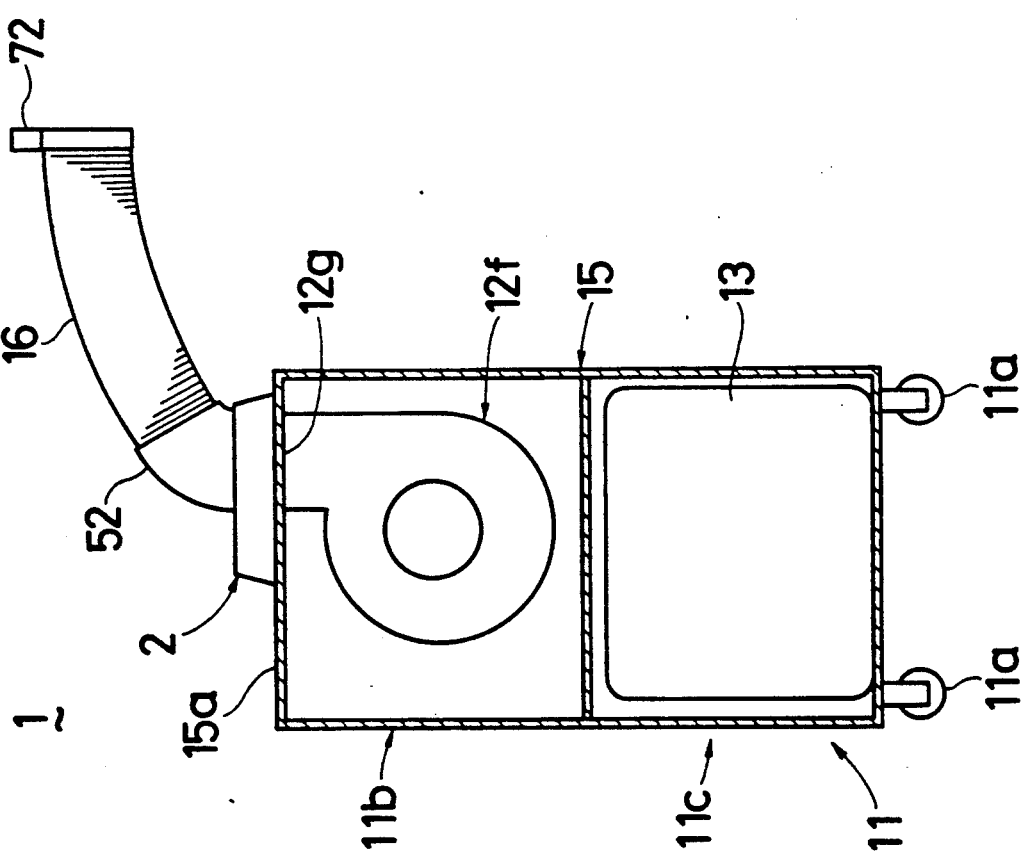

Now referring to FIGS. 1 and 2, there is shown a spot air-conditioner (1) which is installed in various industrial plants to carry out a localized air-conditioning by blowing off cooled air to a target person, such as an operator.

An air-conditioner (12) is mounted on a wagon (11) having a caster (11a) in order to constitute the freely-movable spot air-conditioner (1). The wagon (11) includes an upper part (11b) and a lower part (11c), forming a dual-structure therein. The air-conditioner (12) includes a refrigerant circuit (not shown in the drawings) wherein a compressor (12a), a condenser (12b), an expansion mechanism (not shown in the drawings) and an evaporator (12c) are interconnected by means of a refrigerant piping. The compressor (12a) is accommodated in the lower part (11c) of the wagon (11). Also accommodated in the lower part (11c) of the wagon (11) are a drain tank (13) and an electricity box (14) to be included in a housing (15) of the air-conditioner (12).

In the upper part (11b) of the wagon (11), the condenser (12b) and the evaporator (12c) are disposed on both sides inside the housing (15), and also a single motor (12d) is disposed in the central position while being connected with a condenser fan (12e) and an evaporator fan (12f). Provided on a top plate (15a) of the housing (15) is an exhaust port (15b) on the condenser side, and a blow-off duct (16) which is rotatable by means of a duct drive means (2). The blow-off duct (16) is made of a flexible pipe so as to vary wind direction arbitrarily. The blow-off duct (16) communicates with a discharge port (12g) of the evaporator fan (12f)

through the top plate (15a) of the housing (15). When both fans (12e), (12f) are activated, room air flows into the inside of the housing (15) from both sides thereof. Room air flowed into from one side of the housing (15) is heat-exchanged by the condenser (12b) and becomes warm wind to be discharged upward from the exhaust port (15b). On the other hand, room air flowed into from the other side of the housing (15) is heat-exchanged by the evaporator (12c) and becomes cool wind to be blown off from the blow-off duct (16) toward a person to be air-conditioned.

Reference numeral (17) indicates a drain pan provided in the lower portion of the evaporator (12c). This drain pan (17) communicates with the drain tank (13) to direct drain from the evaporator (12c) to the drain tank (13).

Figure 3:
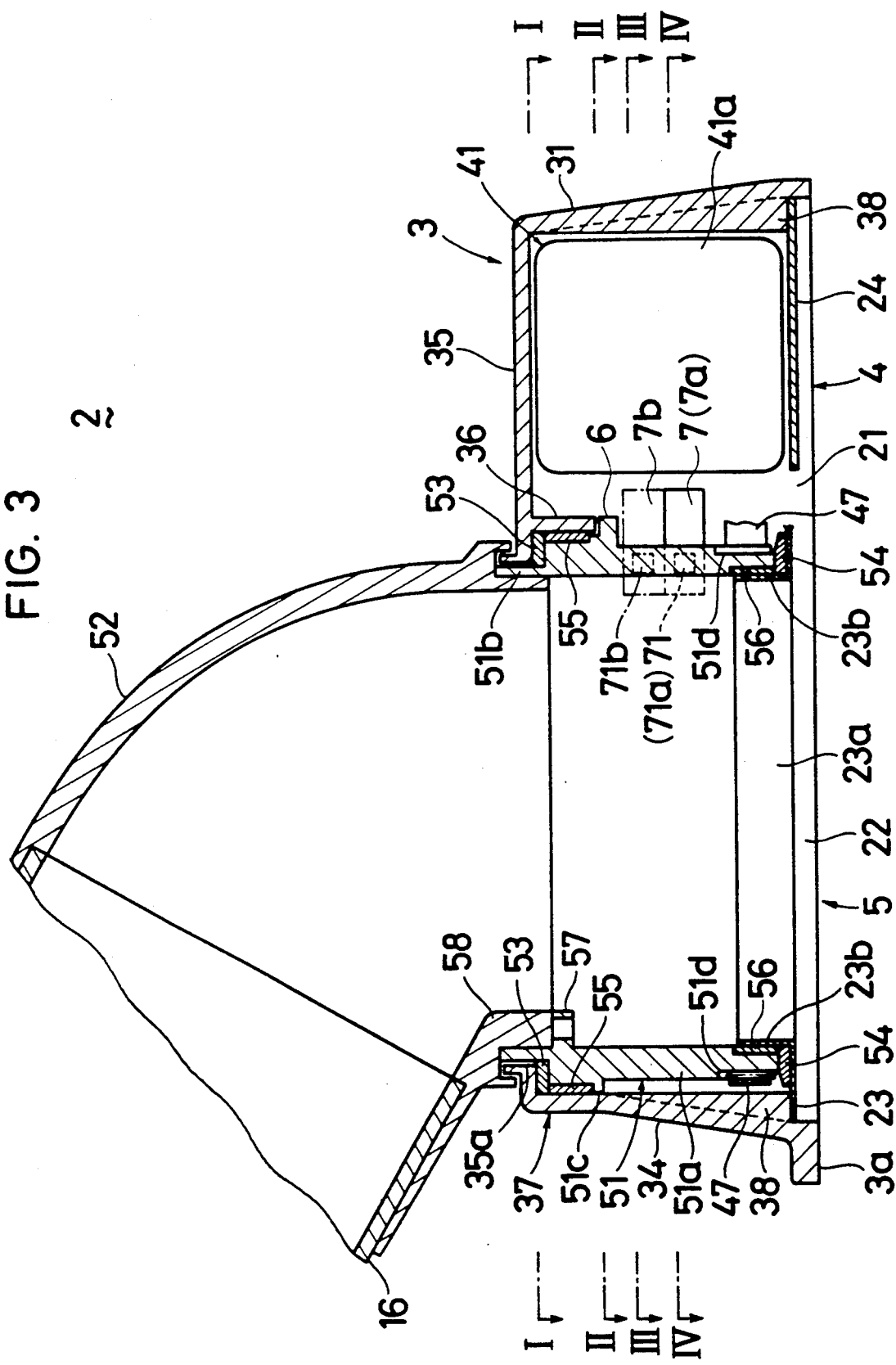
Figure 4:
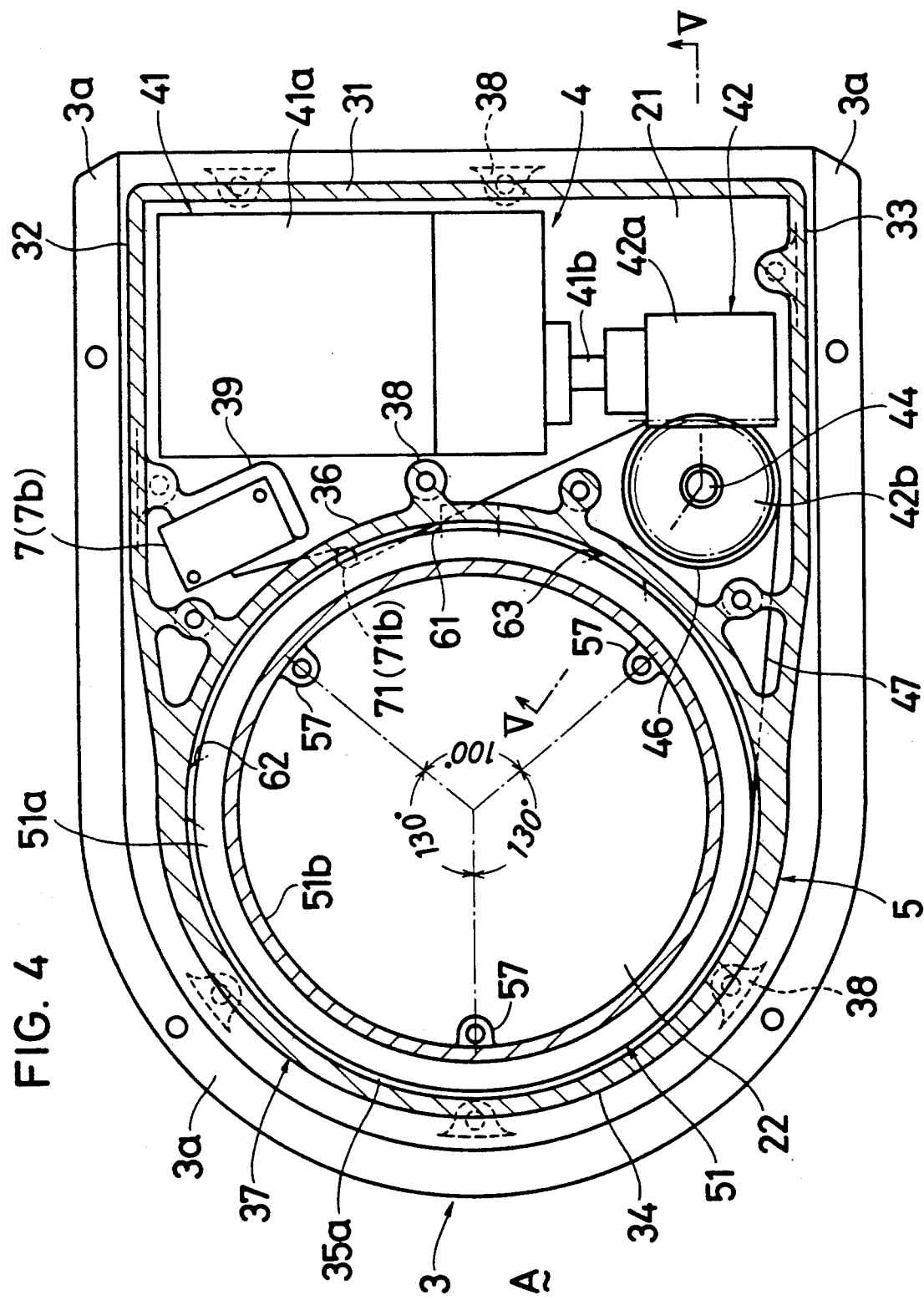

As shown in FIGS. 3 and 4, the duct drive means (2) is so constituted that a drive mechanism (4) and a rotation mechanism (5) are housed in a casing (3) mounted on the top plate (15a) of the housing (15). A flat box type casing (3) having an open lower portion thereof comprises a drive mechanism housing part (21) enclosed by flat side walls (31), (32), (33) in the right of FIG. 4 when viewed with the cool wind blow-off side (side A of FIG. 4) as the front, and a rotation mechanism housing part (22) enclosed by substantially semi-circle shaped side wall (34) in the left of FIG. 4. The casing (3) is fixed on the housing (15) by a flange (3a) on the lower end of the side walls (32), (33), and (34).

An opening (35a) through which the rotation mechanism (5) passes is provided in the front of a top wall (35) of the casing (3) while a guide wall (36) of the rotation mechanism (5) is formed slightly protruding downwardly on the inner surface (a lower surface) of the top wall (35). The guide wall (36) is located adjacent to the opening (35a) to be connected with the front side wall (34). The guide wall (36) and the upper end portion of the front side wall (34) form a ring-shaped guide portion (37) of the rotation mechanism (5). Successively formed on each side wall (31), (32), (33) and (34), and the guide wall (36) are a plurality of fixing columns (38) for securing a lower support plate (23) and a motor fixing plate (24) of the drive mechanism (4) and the rotation mechanism (5). The lower support plate (23) is provided with an opening (23a) which communicates with a discharge port of the evaporator fan (12f). The opening (23a) is formed concentrically with the opening (35a) of the top wall (35). A ring-shaped bent edge (23b) being bent upwardly is formed in the L-shape on the periphery of the opening (23a) of the lower support plate (23).

Figure 5:
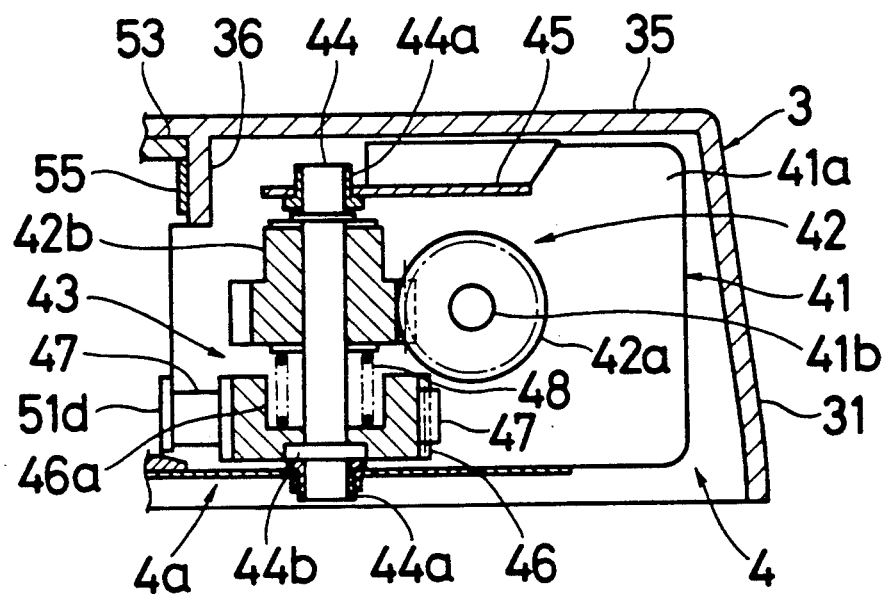

As shown in FIG. 5, the drive mechanism (4) is so constituted that a geared motor (41) is interconnected with a worm gear (42) and a belt transmission mechanism (43). The geared motor (41) is so constituted that a motor (41a) is fixed and supported on the motor fixing plate (24), and a driving shaft (41b) is transversely disposed so as to be parallel to the top wall (35). Thickness of the casing (3) corresponds to thickness (height in the vertical direction of FIG. 3) of the motor (41a).

The worm gear (42) is so constituted that a worm (42a) is fitted to the driving shaft (41b), and a worm wheel (42b) which engages with the worm (42a) is provided in the clearance between the semi-circular guide wall (36) and a flat right side wall (33) to be fitted to a shaft (44). The shaft (44) is vertically supported on an upper support plate (45) and the lower support plate (23), both fixed on the left side wall (33), by means of bearings (44a), (44a). The worm wheel (42b) is secured in the upper portion of the shaft (44). Further provided in the shaft (44) is a timing pulley (46) of the belt transmission mechanism (43) in the engagement with a flange (44b) at the lower end thereof. A tooth portion is formed on the outer periphery of the timing pulley (46) to be engaged with a toothed belt (47). A compression spring (48) is provided between the recessed portion (46a) on the inner periphery of the timing pulley (46) and the worm wheel (42b) so that the spring force of the compression spring (48) can press the timing pulley (46) to make contact with the flange (44b) of the shaft (44), and thus fitting the timing pulley (46) slidably to the shaft (44).

The rotation mechanism (5) is so comprised that the blow-off duct (16) is connected with a rotary cylinder (51) by means of an elbow (52). The rotary cylinder (51) is vertically supported in such a manner that the upper portion thereof is fitted to the ring-shaped guide portion (37), and the lower portion thereof is externally fitted to the bent edge (23b) of the lower support plate (23). The rotary cylinder (51a) is provided respectively with, on the inner periphery of the upper end surface thereof, a successively and upwardly formed ring-shaped extension edge (51b) facing the opening (35a), on the upper outer periphery thereof, a band-shaped projection (51c), and on the lower outer periphery thereof, a tooth portion (51d). A belt (47) of the belt transmission mechanism (43) is engaged with the tooth portion (51d).

An upper thrust sheet (53) and a lower thrust sheet (54) are provided respectively between the upper end surface of the rotary cylinder (51a) and the top wall (35), and between the lower end surface of the rotary cylinder (51a) and the lower support plate (23). Thus, the rotary cylinder (51a) is pushed upward by the spring force of the lower support plate (23) so as to seal the upper and the lower end surfaces. An upper radial sheet (55) and a lower radial sheet (56) are provided respectively between the upper outer periphery of the rotary cylinder (51a) and the ring-shaped guide portion (37), and between the lower inner periphery of the rotary cylinder (51a) and the bent edge (23b).

Three fixing flanges (57), (57), (57) are projectedly formed on the upper inner periphery of the rotary cylinder (51a) in order to fix the elbow (52). The fixing flanges (57), (57), (57) are formed at irregular interval, for example, at 130° or 100°. The elbow (52) extends diagonally from the rotary cylinder (51) to the upper front direction to be fitted, at the lower end thereof, to the ring-shaped extension edge (51b) of the rotary cylinder (51), and also to be fitted, at the upper end thereof, to the blow-off duct (16). The elbow (52) is interconnected with the rotary cylinder (51) by fixing the fixing columns (58), (58), (58) projected on the lower inner periphery and the fixing flanges (57), (57), (57) with a machine screw etc.

Figure 6:
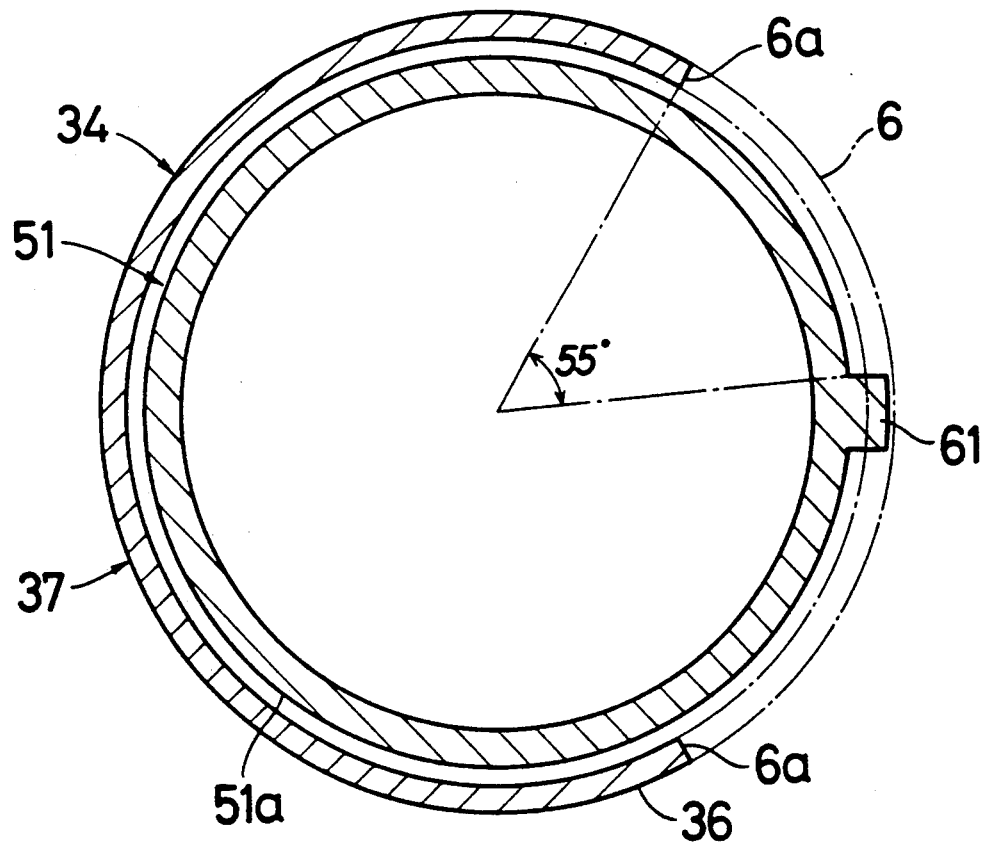

As shown in FIG. 6, the guide wall (36) is provided with a groove (6) in the lower part thereof. A stopper (61) facing this groove (6) projects on the upper outer periphery of the rotary cylinder (51a). Both side end surfaces of the groove (6) serves as stop surfaces (61a), (61a) with which the stopper (61) makes contact. With this arrangement, the groove (6) and the stopper (61) forcedly restrict the rotation of the rotary cylinder (51), i.e. the blow-off duct (16). The rotation range is set, for example, at 110 degrees.

Provided in the front of the motor (41a) is a single limit switch (7) as a single position detection means for restricting the automatic swing range (air-conditioning range) of the blow-off duct (16). The limit switch (7), comprising a micro-switch etc., is provided in the clearance between the semi-circular guide wall (36) and the flat right side wall (32). The limit switch (7) is attached on a support edge (39) which is provided on the right side wall (32). A probe (71) of the limit switch (7) is positioned to make contact with the outer periphery in the lower part of the stopper (61) of the rotary cylinder (51a).

Figure 7:
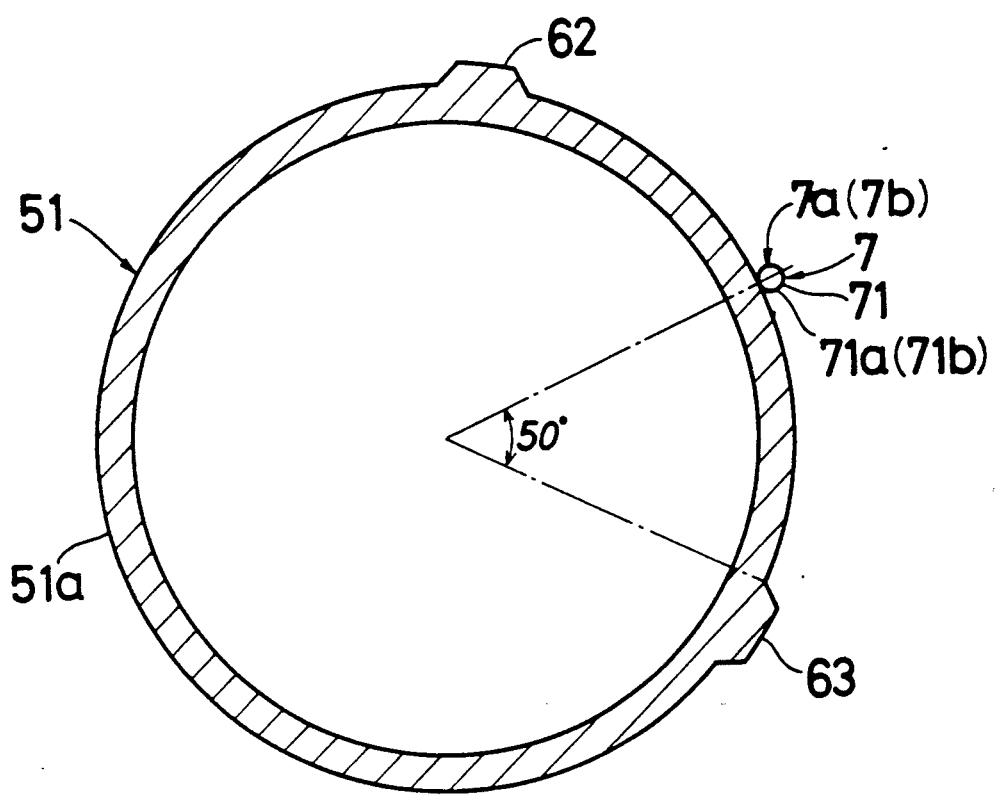

As shown in FIG. 7, formed on the outer periphery of the rotary cylinder (51a) are a first projection (62) and a second projection (63) with which the probe (71) makes contact. The projections (62), (63) are formed in the axial direction (vertical direction) of the rotary cylinder (51a). The first projection (62) and the second projection (63) are formed respectively in the right end limit position, and in the left end limit position of the automatic swing range of the blow-off duct (16). The geared motor (41) is forwarded or reversed by the position signal from the limit switch (7), thereby controlling the blow-off duct (16) to swing automatically. The automatic swing range is set smaller than the rotation range defined by the groove (6) to be, for example, 100 degrees.

Figure 9:
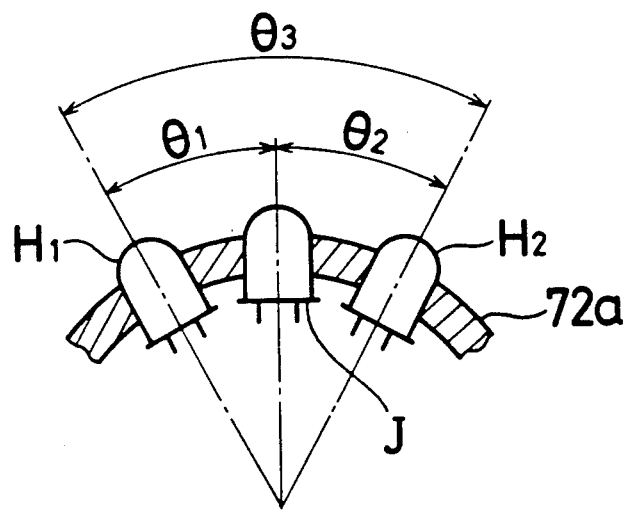
Figure 10:
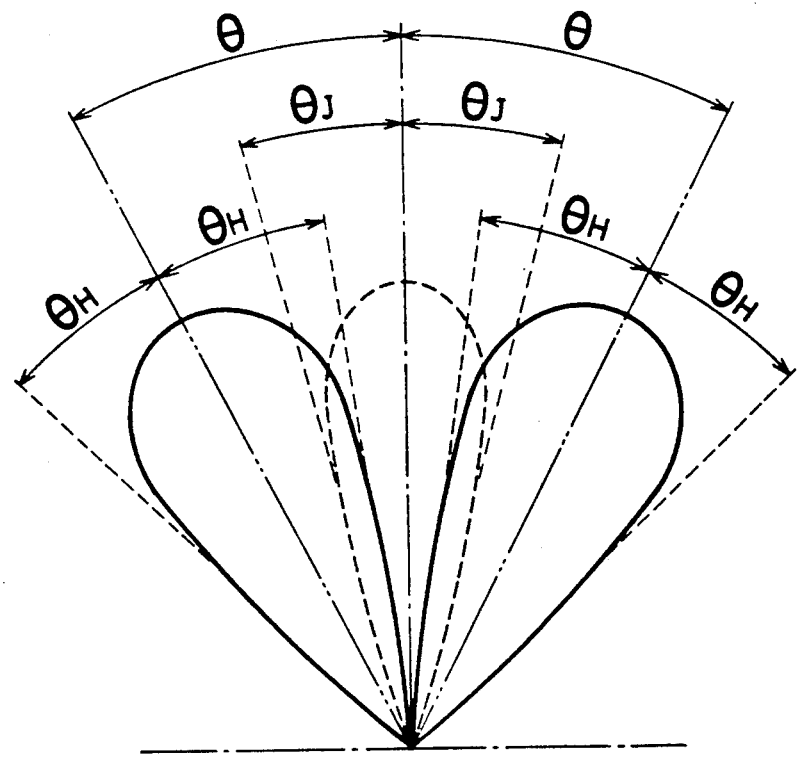

Mounted in the upper head portion of the blow-off duct (16) is a single human body detection sensor (72) as human body detection means for detecting a human body to be air-conditioned in the front thereof. Referring to FIGS. 9 and 10, the human body detection sensor (72) comprises: a pair of radiation elements ($H_1$), ($H_2$) of radiation means fixed on a frame (72a) at a fixed opening angle $\theta_3$; and a radiation receiving element (J) of radiation receiving means fixed on the frame (72a) so as to be centrally interposed between the pair of the radiation elements ($H_1$), ($H_2$), namely to have a fixed set angle $\theta_1$, $\theta_2$ respectively with the elements ($H_1$), ($H_2$). Reflection of infrared rays radiated from the radiation elements ($H_1$), ($H_2$) is detected by the radiation receiving element (J). In this preferred embodiment of the invention, it is set that $\theta_1 = \theta_2 = \theta$, accordingly, $\theta_3 = 2\theta$.

The radiation elements ($H_1$), ($H_2$) have a fixed directional angle $\pm \theta_H$. In other words, the radiation elements ($H_1$), ($H_2$) have the directionality that the direction having infrared rays intensity exceeding a fixed level is restricted within the range of a fixed angle $\pm \theta_H$. The radiation receiving element (J) also has the directionality that the detectable direction range of infrared rays reflection is restricted within a fixed directional angle $\pm \theta_J$. The relation between the set angle $\theta$ and the directional angle $\pm \theta_H$, $\pm \theta_J$ is defined to be:

$$\theta_H < \theta < \theta_H + \theta_J$$

Namely, as shown in FIG. 10, the positional relation between both radiation elements ($H_1$), ($H_2$) and the radiation receiving element (J) is so arranged that the directional angles $\pm \theta_J$ and $\pm \theta_H$ overlap each other, and at least one flat plane surface is present to reflect infrared rays radiated from the radiation element ($H_1$) or ($H_2$) within the range of the directional angle $\pm \theta_J$ of the radiation receiving element (J), as well as that the directional angles $\pm \theta_H$ of both radiation elements ($H_1$), ($H_2$) do not overlap each other, and a flat plane surface for reflecting infrared rays radiated from both radiation elements ($H_1$), ($H_2$) simultaneously into the radiation receiving element (J) is not present.

Figure 12:
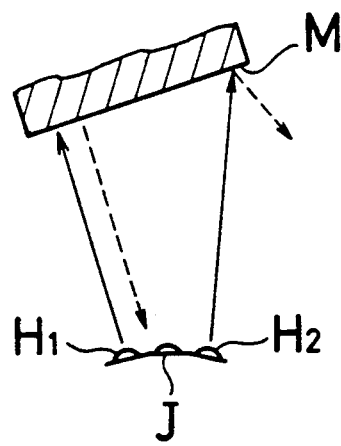

In other words, it is so arranged that infrared rays which are radiated from the pair of the radiation elements ($H_1$), ($H_2$) and reflected on the single flat plane surface forming the surface of a mirror reflector (M) will never be incident on the radiation receiving element (J) simultaneously with intensity exceeding a set value $V_S$. Accordingly, as shown in FIG. 11, infrared rays neither from the radiation elements ($H_1$) nor ($H_2$) will be incident on the radiation receiving element (J), or, as shown in FIG. 12, infrared rays from either one radiation element (for example, $H_1$) will be incident on the radiation receiving element (J).

Figure 13:
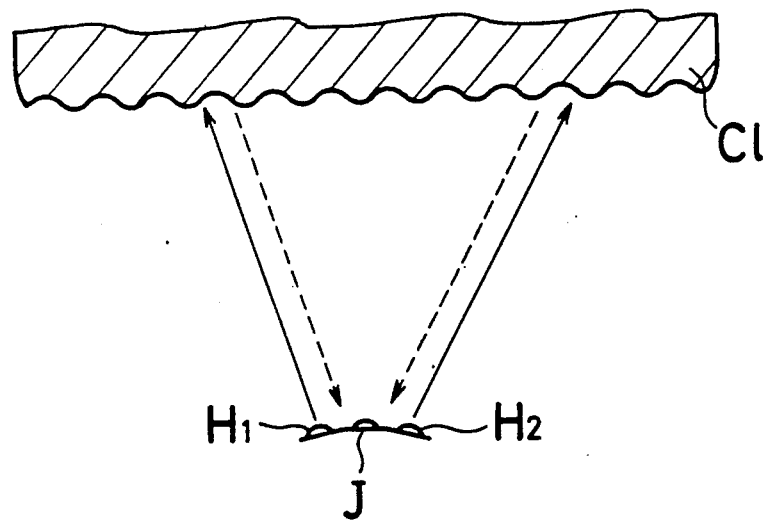
Figure 14:
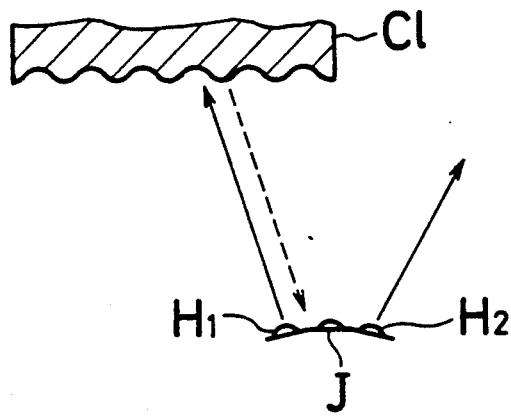

Referring to FIG. 13, when an object which causes diffused reflection, i.e. clothess (Cl) the person to be air-conditioned is wearing, lies over the directional angles $\pm \theta_H$ of both radiation elements ($H_1$), ($H_2$), infrared rays both from the radiation elements ($H_1$), ($H_2$) will be incident on the radiation receiving element (J) simultaneously, both with the intensity exceeding a set value $V_s$ due to diffused reflection caused on the surface of the clothess. On the other hand, when the clothess (Cl) are partially present in the directional angle $\pm \theta_H$ of either one radiation element (for example, $H_1$), but the clothess (Cl) are not present even partially in the directional angle $\pm \theta_H$ of the other radiation element ($H_2$), infrared rays only from the radiation element ($H_1$) will be incident on the radiation receiving element (J) with the intensity exceeding a set value $V_S$. Further, as shown in FIG. 14, the clothess (Cl), namely, the movement of the person to be air-conditioned, can be de identified by the order of receiving infrared rays radiation from the radiation elements ($H_1$), ($H_2$).

Figure 11:
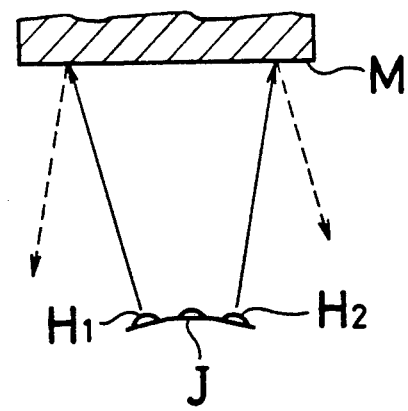

As shown in FIG. 11, the radiation receiving element (J) is disposed in such a manner that the central line thereof makes a right angle with a wall glass etc. in the background. Accordingly, even when a mirror reflector (M) is in the background, it is so designed that neither infrared rays radiated from the radiation element ($H_1$) nor ($H_2$), and then reflected on the mirror reflector (M) will be reflected within the detection range of the radiation receiving element (J).

Figure 15:
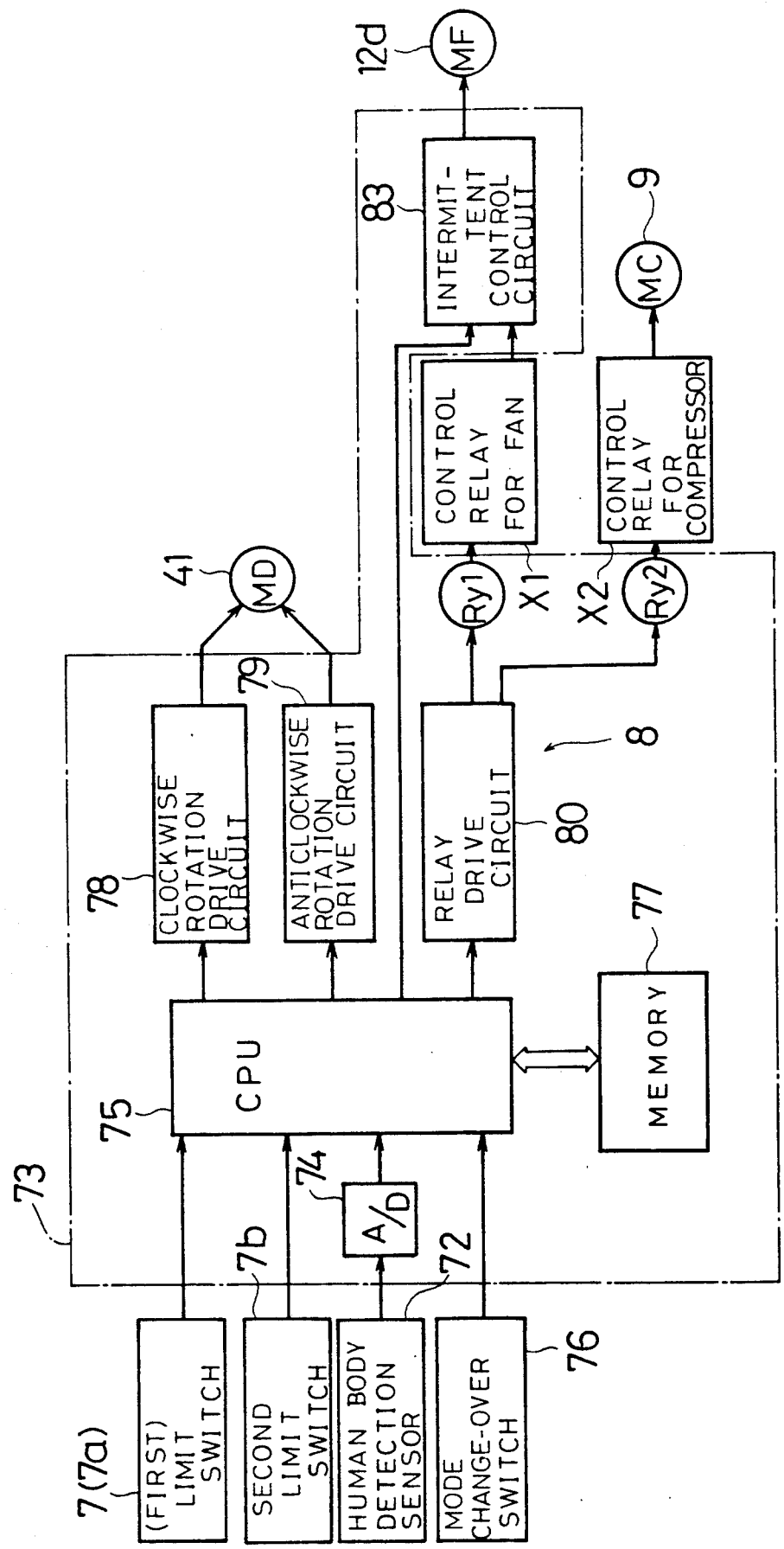

FIG. 15 illustrates a control block diagram of the spot air-conditioner (1). The human body detection signals etc. outputted from the human body detection sensor (72) are converted to digital signals by an A/D converter (74) included in a control unit (73), and then inputted into CPU (75). Further inputted into the CPU (75) are: position signals sent from the limit switch (7); mode signals sent from a mode change-over switch (76) of mode switching means for switching the control mode of the blow-off duct (16) among the stationary mode, the automatic swing mode, and the human body tracking mode; ON/OFF signals sent from an energy-saving switch (84) of switching means for automatic stopping for switching the air-conditioning operation between the continuous operation control or the automatic stopping control during the stationary mode and the automatic swing mode of the blow off duct (16).

The control unit (73) includes a memory (77) which is connected with the CPU (75). The memory (77) comprises ROM which previously files the program data for carrying out a control flow, and RAM which files process data. Included in a memory area of RAM in the memory (77) are a sensor flag (STF), a human body detected flag (HKF), a human body undetected flag (MKF) and a rotation control flag (RCF), while included in the control unit (73) are various timers (TM1)~(TM7), (TMa) and (TMb) (not shown in the drawings).

The control unit (73) also includes a drive circuit for clockwise movement (78) and a drive circuit for aniticlockwise movement (79) of the geared motor (41), and a relay drive circuit (80) of a first relay (RY1) and a second relay (RY2) constituting the air-conditioning control means (8). The drive circuits (78), (79) and the relay drive circuit (80) are connected with the CPU (75). The geared motor (41) is forwardly or reversely controlled by the drive circuit for clockwise movement (78) and the drive circuit for aniticlockwise movement (79) according to the output signal from the CPU (75). The relays (RY1), (RY2) are ON/OFF controlled by the relay drive circuit (80) according to the output signal from the CPU (75).

A control relay for a fan (X1) included in the air-conditioning control means (8) is ON/OFF controlled by the relays (RY1) and (RY2). A fan motor (12d) is drive-controlled by means of an intermittent control circuit (83) of intermittent control means which is included in the control unit (73). A control relay for the compressor (X2) included in the air-conditioning means (8) is ON/OFF controlled, thereby drive-controlling a compressor motor (9). The air-conditioning control means (8) controls fans (12e) and (12f), and the compressor (12a) so as to regulate air-conditioning operation.

Figure 16:
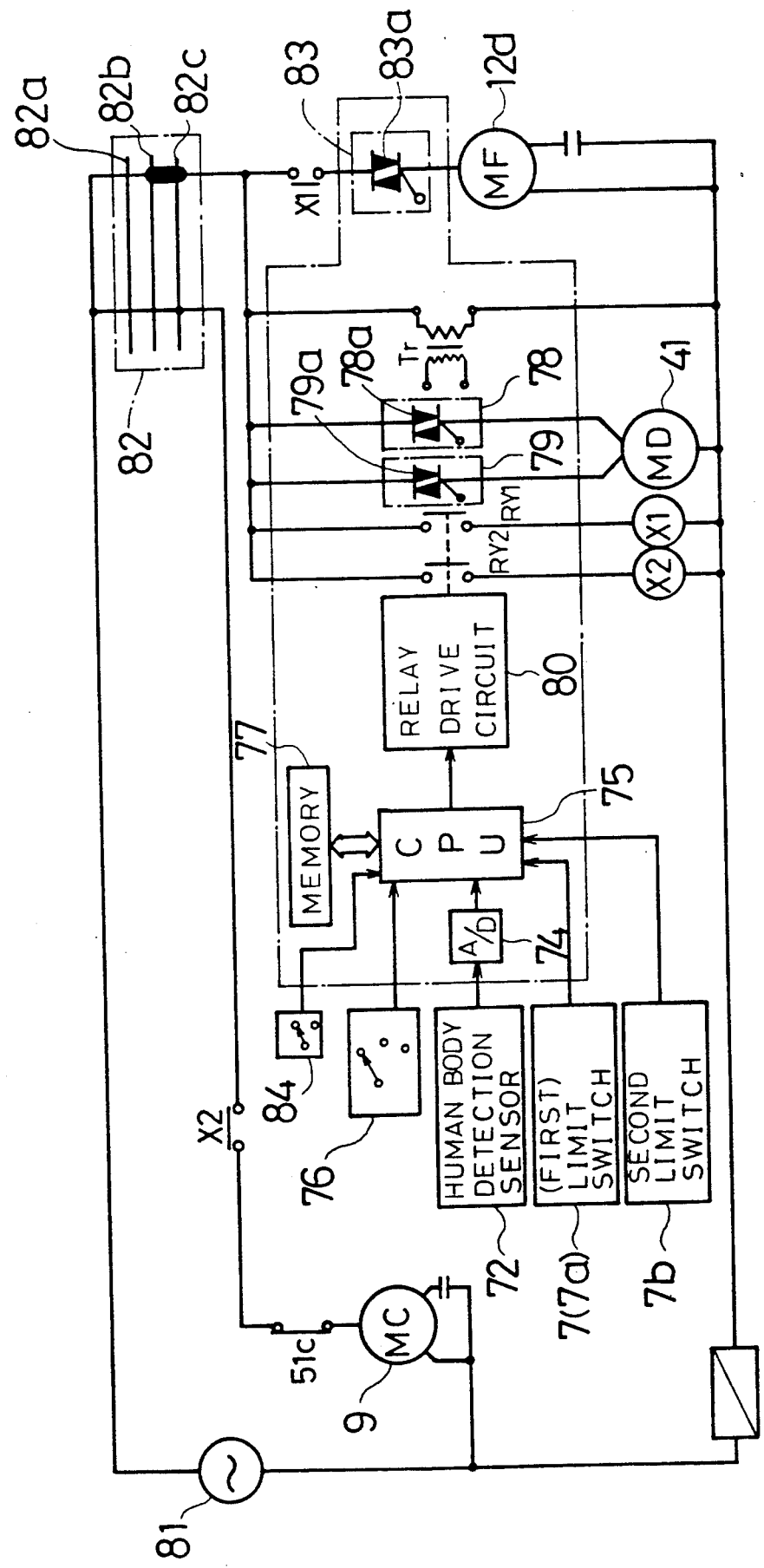

FIG. 16 is a detailed circuit diagram of the control block diagram shown in FIG. 15. Connected in parallel with a power (81) through an operation change-over switch (82) having a stop contact (82a), a ventilation contact (82b) and a temperature regulation contact (82c) are a series circuit connecting a contact of the control relay for the compressor (X2), a relay for preventing excessive electricity flow (51c), and the compressor motor (9) in order, and a series circuit connecting a contact of the control relay for a fan (X1), the intermittent control circuit (83) having a Triac (83a), and the fan motor (12d) in order. The intermittent control circuit (83) ON/OFF controls the Triac (83a) in response to the control signal from the CPU (75) so as to intermittently drive the fan motor (12d) by interrupting electricity supply to the fan motor (12d). A transducer (Tr) is connected in parallel with the series circuit composed of the contact of the control relay for a fan (X1), the intermittent control circuit (83), and the fan motor (12d). Further connected in parallel are: a series circuit connecting the drive circuit for clockwise movement (78) and the drive circuit for anticlockwise movement (79) in parallel, respectively having a Triac (78a) and (79a), and the geared motor (41); a series circuit connecting a contact of the first relay (RY1) and an exciting coil of the control relay for a fan (X1); and a series circuit connecting a contact of the second relay (RY2) and an exiting coil of the control relay for the compressor (X2).

The CPU (75) includes wind direction control means (75a). As shown in the control flow which will be described later, the wind direction control means (75a). upon receiving the human body tracking mode signal from the mode change-over switch (76), directs the blow-off duct (16) toward the person to be air-conditioned in response to the human body detected signal and the movement signal from the human body detection sensor (72), as well as controls the geared motor (41) of the duct drive means (2) to follow the movement of the person to be air-conditioned.

Referring now to FIGS. 19 through 24 showing the control flow diagrams, air-conditioning control operation of the spot air-conditioner (1) will be discussed. In these control flow diagrams, the operation change-over switch (82) is set to the temperature regulation contact (82c). Modes of air-conditioning operation will be described in order from the stationary mode for fixing the blow-off duct (16) at a certain direction, the automatic swing mode for automatically swinging the blow-off duct (16), and the human body tracking mode for pivotally moving the blow-off duct (16) to follow the movement of the person to be air-conditioned.

Figure 19:
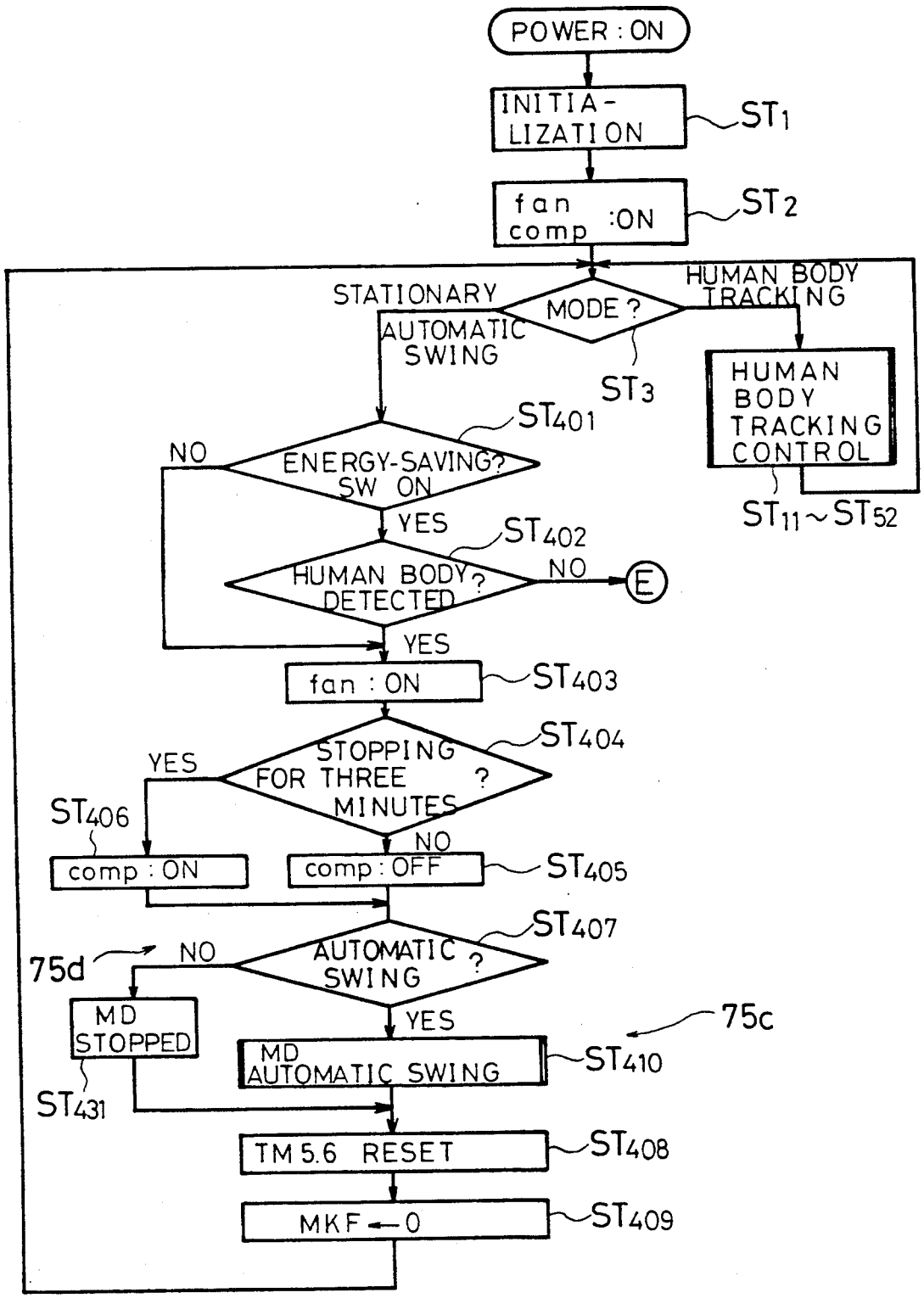
Figure 20:
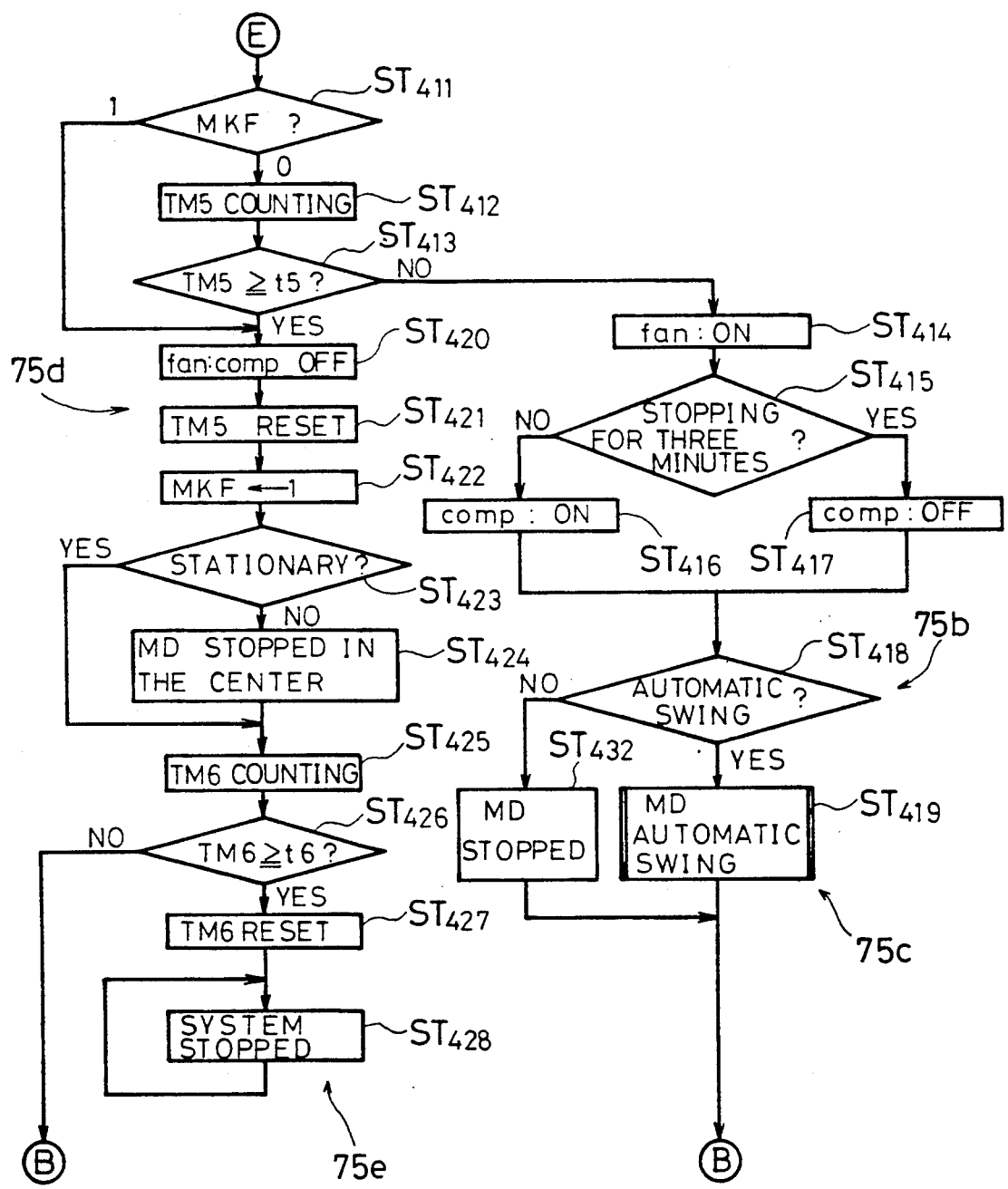
Figure 21A:
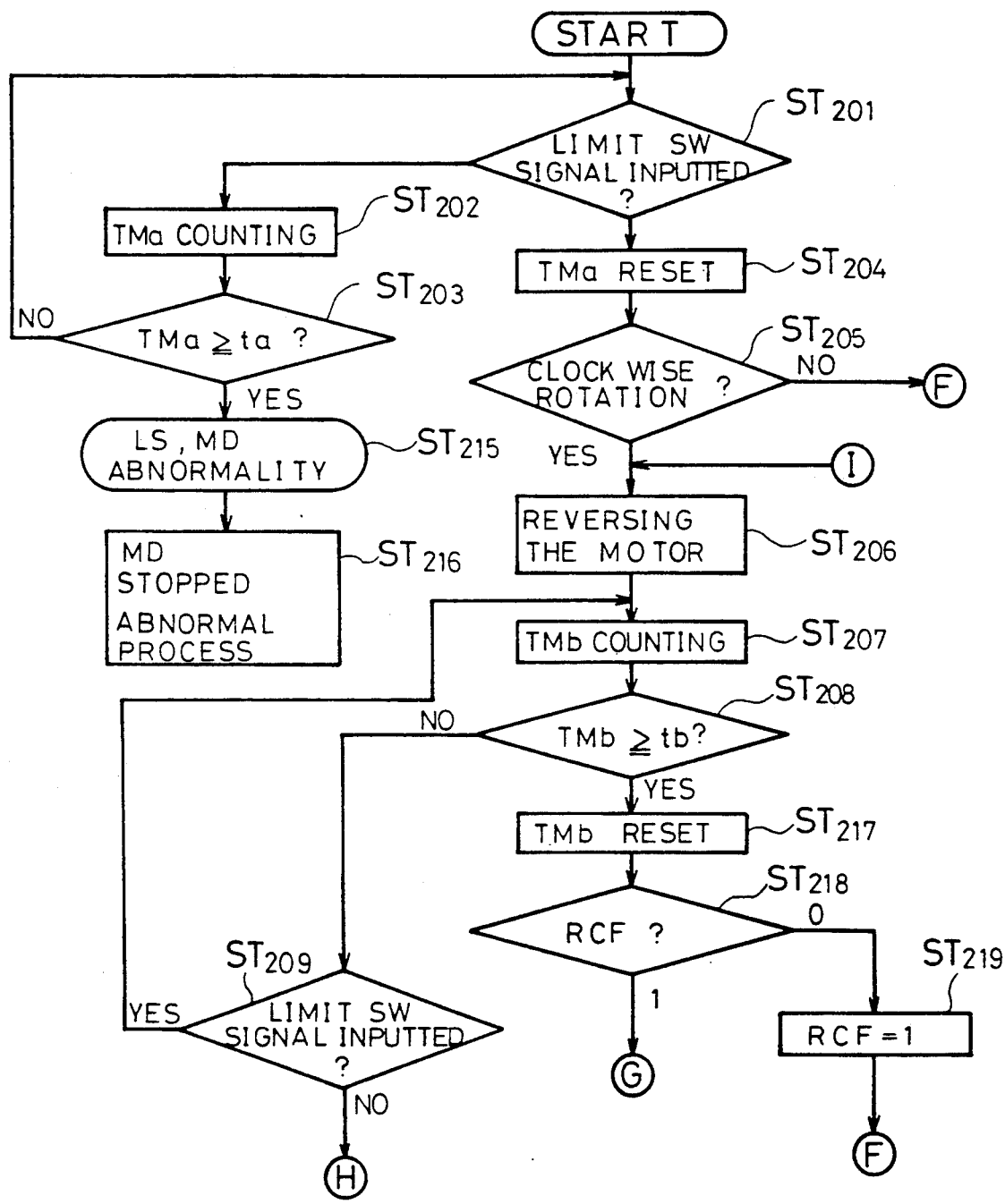

Referring to FIG. 19, the stationary mode will be explained first. After the power is turned on, initialization is carried out in the step ST1. For example, after each flag (STF), (HKF), (MKF) and (RCF) is reset, the fans (12e), (12f), and the compressor (12a) are activated in the step ST2. Namely, in response to the output signal from the CPU (75), the relay drive circuit (80) turns on the first and the second relays (RY1), (RY2). Then, the control relays for a fan (X1) and for the compressor (X2) are turned on, thereby activating the fan motor (12d) and the compression motor (9). Next, the air-conditioning operation moves from the step ST2 to ST3 where the mode is determined. In this case, it is set for the stationary mode by the mode chang-over switch (76). Accordingly, next step will be the step ST 401 where it is determined whether the energy-saving switch (84) is turned on or not. The operation proceeds to the step 402 in the case of "ON", or the step 403 bypassing the step 402 in the case of "OFF". In the step ST 402, it is determined whether the human body detection sensor (72) detects the person to be air-conditioned and then outputs the human body detected signal. When the human body detected signal is being outputted, the operation proceeds to the step ST403.

There, the control relay for a fan (X1) is turned on if the fans (12e), (12f) are halted. Furthermore, the Triac (83a) of the intermittent control circuit (83) is turned on to be driven continuously. Next, in the step 404, it is checked whether three minutes has passed since the compressor (12a) stopped. More specifically, the compressor (12a) is so constructed that once stopped, it cannot be activated for three minutes in order to prevent continuous activation and stopping thereof. Until three minutes passes, the operation moves from the step ST 404 to the step ST 405, and then moves to the step ST407 while the compressor (12a) remains stopped. When three minutes have passed, the operation moves from the step ST404 to the step ST406 where the control relay for the compressor (X2) is turned on to activate the compressor (12a) if the compressor (12a) has been halted. Then, in the step ST407, it is determined whether the automatic swing mode is selected or not. Since the stationary mode has been selected in this case, the geared motor (41) will be stopped in the step ST431 if it has been driven. Then, in the step ST408, a fifth timer (TM5) and a sixth timer (TM6) are reset, and in the step ST409, the human body undetected flag (MKF) will be reset if it has been set up. After that, the operation goes back to the step ST3. In this way, a series of the air-conditioning operation from the step ST3 through the step ST409 will be repeated to consistently blow off cooled air to the fixed direction. In this case, since the blow-off duct (16) is made of a flexible pipe, the blow-off direction thereof can be manually set by the operator by bending the blow-off duct (16) arbitrarily.

Next, the automatic swing mode will be discussed. First, the power is turned on. Then, the spot air-conditioner operates in the same manner as in the case of the stationary mode from the step ST1 through ST407. In this step ST407, since the mode chang-over switch (76) is set in the automatic swing mode, this automatic swing mode is identified here. Then, in the step ST410, the automatic swing control routine which will be described later will be initiated Accordingly, the geared motor (41) is driven to start the reciprocating pivotal movement of the blow-off duct (16).

Next, the operation proceeds from the step ST410 to the step ST408, and then moves back to the step ST3 as in the case of the stationary mode. The above-mentioned operation will be repeated to automatically swing the blow-off duct (16), thereby blowing off cooled air within the range of the air-conditioning area (100 degrees in the present embodiment).

The aforementioned operational sequence applies to the case where the person to be air-conditioned is present in the air-conditioning area. The operational sequence of the stationary mode and the automatic swing mode in the case where the person to be air-conditioned is not present will be now discussed. (refer to FIG. 20)

To begin with, when the human body detection sensor (72) outputs the human body undetected signal in the step ST402, the determination will be "NO". Thus, in the next step ST411, it is determined whether the human body undetected flag (MKF) is set up or not. Since it is set for "0" in the initial phase of the output of the human body undetected signal (step ST409), next step is ST412 where the fifth timer (TM5) is actuated. Then in the step ST413, it is checked whether a predetermined continuous operation time ($t_5$) has passed or not. Until the continuous operation time ($t_5$) passes, the air-conditioning operation moves from the step ST413 to the step ST414. Here, the fans (12e), (12f) are activated if they have been halted. Next, in the step ST415, it is determined whether three minutes have passed since the compressor (12a) stopped as in the case of step ST404. This is again to prevent the continuous activation and stopping of the compressor (12a). When three minutes have passed, the operation moves to the step ST416 where the compressor (12a) is continued to be driven if it has already been activated or driven. When three minutes have not yet passed, the operation moves to the step ST417, and then proceeds to the step ST418 while the compressor (12a) remains stopped. Subsequently, in this step ST418, it is checked whether the mode is set in the automatic swing operation or not. In the case of the stationary mode, the geared motor (41) will be stopped in the step ST432 if it has been driven. Then, the operation returns to the step ST3. However, in the case of the automatic swing mode, the operation returns to the step ST419, and then, while rotating the blow-off duct (16) as in the case of the step ST410, returns to the step ST3.

While repeating the operational sequence from the step ST401, ST411 through ST419, if the continuous operation time ($t_5$) passes without any detection signal from the human body detection sensor (72), or in other words, the person to be air-conditioned is not present in front of the blow-off duct (16) in the case of the stationary mode, the following step will be taken. In the case of the automatic swing mode, the human body detection sensor (72) scans the air-conditioning area with the rotation of the blow-off duct (16). When the presence of the person to be air-conditioned cannot be detected, the air-conditioning operation moves from the step ST413 to the step ST420. In this step ST420, the control relay for a fan (X1) and the control relay for the compressor (X2) will be turned off in order to stop the fans (12e), (12f), and the compressor (12a), thus, halting the air-conditioning operation in the automatically restorable state. Then, the fifth timer (TM5) is reset in the step ST421, and the human body undetected flag (MKF) will be set up in the step ST422.

Subsequently, in the step ST423, it is determined whether the mode is set for the stationary operation or not. In the case of the automatic swing mode, the operation moves to the step ST424. And after stopping the blow-off duct (16) in the center of the air-conditioning area, the operation proceeds to the step ST425. On the other hand, in the case of the stationary mode, the operation moves to the step ST425 bypassing the step ST424. Then, after actuating the sixth timer (TM6), the operation will proceed to the step ST426. It is determined in this step ST426 whether a predetermined air-conditioning stop time ($t_6$) has passed or not. The air-conditioning operation returns to the step ST3 until the air-conditioning stop time ($t_6$) passes. On the other hand, the operation shifts to the step ST427 when the air-conditioning stop time ($t_6$) has passed. Then, after resetting the sixth timer (TM6) in the step ST427, the operation shifts to the step ST428 where the air-conditioning control means (8) carries out the system-down to the automatic restorable state.

The air-conditioning operation in the case of the absence of the person to be air-conditioned in the air-conditioning area is as follows. If the person to be air-conditioned returns to the air-conditioning area before the continuous operation time ($t_5$) passes, normal air-conditioning will be conducted while shifting from the step ST402 to the step ST408. But if the continuous operation time ($t_5$) has passed, the air-conditioning will be stopped. Later then, if the target person returns before the air-conditioning stop time ($t_6$) passes, the operation shifts from the step ST402 to the step ST408 with the human body detected signal generated from the human body detection sensor (72), thus resuming the air-conditioning operation automatically. But if the target person does not return to the air-conditioning area before the air-conditioning stop time ($t_6$) passes, the overall system will be halted. Accordingly, since the air-conditioning operation cannot be resumed automatically, the power must be turned on again to resume the operation.

The steps ST407 and ST418 constitute stationary control means (75b) while the steps ST410 and ST419 constitute automatic swing means (75c). Further, the steps ST411 through ST424 constitute air-conditioning stop means (75d) while the steps ST425 through ST428 constitute system stop means (75e).

While the energy-saving switch (84) is in the OFF state, the operation shifts from the step ST401 to ST403. Thus, the air-conditioning operation will never be stopped automatically. When the operation is in the air-conditioning stop state in the above-mentioned control flow (step ST429 and the following steps), the operation proceeds from the step ST411 to the step ST420. Thus, the fifth timer (TM5) will never be actuated.

Referring to FIG. 21 showing the control flow of the spot air-conditioner, the automatic swing control in the step ST410 and the step ST419 will be described.

In the step ST410 and the step ST419, when the geared motor (41) is forwarded or reversed, the rotation of the geared motor (41) is transmitted to the rotary cylinder (51) by means of the worm gear (42) and the belt transmission mechanism (43) to initiate the rotation thereof. Consequently, the blow-off duct (16) is rotated along with the rotation of the rotary cylinder (51). Then, in the step ST201, it is determined whether the limit switch (7) has output the position signal or not. If the limit switch (7) does not make contact with each projection (62), (63), or, in other words, the blow-off duct (16) is in the process of rotation, the position signal will not be generated. In this case, the operation moves on to the step ST202 where a one-way rotation timer (TMa) is actuated. Then, in the step ST203, it is determined whether the one-way rotation timer (TMa) has counted a predetermined one-way rotation time (ta) or not. This one-way rotation time (ta) is set to be the time required for the blow-off duct (16) to rotate from one rotation limit position to the other rotation limit position, namely the time needed to rotate from the right end to the left end, or from the left end to the right end. Until the one-way rotation time (ta) passes, the operation returns from the step ST203 to the step ST201 to repeat this sequence of operation. Normally, the blow-off duct (16) is set to reach the right end or the left end before the one-way rotation time (ta) passes. Accordingly, the limit switch (7) makes contact with the projections (62), (63), thus Outputting the position signal.

In response to the position signal from the limit switch (7), the operation moves from the step ST201 to the step ST204 where the one-way rotation time (TMa) is reset. Next, in the step ST205, it is checked whether the blow-off duct (16) is clockwise-rotating or not. In other words, the rotation direction of the duct before the limit switch (7) outputs the position signal will be determined here. For example, in the case of the clockwise rotation of FIG. 4, a Triac (78a) of a clockwise rotation drive circuit (78) is in the ON state by means of a drive transistor (not shown in the drawings) in accordance with the output signal from the CPU (75). As a result, with the output from the CPU (75), it is determined that the duct is rotating in the clockwise direction. Then, shifting from the step ST205 to the step ST206, the Triac (78a) of the clockwise rotation drive circuit (78) is turned off to stop the clockwise rotation of the blow-off duct (16). In addition, a Triac (79a) of the anticlockwise rotation drive circuit (79) is turned on by means of the drive transistor (not shown in the drawings) in accordance with the output signal from the CPU (75) to trigger the rotation of the blow-off duct (16) in the anticlockwise direction of FIG. 4.

Then, the operation shifts from the step ST206 to the step ST207 where an output stop timer (TMb) is actuated. Next, in the step ST208, it is determined whether the output stop timer (TMb) has counted a predetermined output stop time (tb) or not. Until the output stop time (tb) passes, the operation shifts to the step ST209 to determine whether the limit switch (7) has stopped the output of the position signal. Returning to the step ST207, the spot air-conditioner repeats air-conditioning operation through the step ST209 until the output is stopped. This output stop time (tb) corresponds to the time needed for a probe (71) of the limit switch (7) to make contact with the first projection (62), thus reversing the blow-off duct (16), and then for the first projection (62) to be out of contact with the probe (71). Usually, it is set that the first projection (62) becomes out of contact with the probe (71) before the output stop time (tb) passes, thus stopping the output of the position signal from the limit switch (7). Accordingly, when the limit switch (7) stops the output before the output stop time (tb) passes, the air-conditioning operation proceeds from the step ST209 to the step ST210. And after resetting the output stop timer (TMb), the operation shifts to the step ST225. Then, after carrying out the normal processing, the operation is brought back to the step ST408, thus repeating the operation of the steps ST401 through the step ST432 with a fixed timing.

Subsequently, upon the start of the anticlockwise rotation of the blow-off duct (16), the air-conditioning operation shifts from the step ST201 to the step ST202 in the control flow shown in FIG. 21. In the step ST202, the one-way rotation timer (TMa) is actuated as described before in order to wait for the next output from the limit switch (7). When the limit switch (7) makes contact with the second projection (63) and outputs the position signal, the direction of the duct rotation before the output of the position signal can be detected with the output from the CPU (75) in the step ST205. Then, unlike the case of the right end position, the Triac (79a) of the anticlockwise rotation drive circuit (79) will be switched off, and the Triac (78a) of the clockwise rotation drive circuit (78) will be switched on, thereby clockwise-rotating the blow-off duct (16) again. Subsequently, as in the operation of the steps ST207 through the step ST209 for initiating the anticlockwise rotation, the operation of the steps ST212, ST213, and ST214 will be conducted. While these steps are carried out, the output stop timer (TMb) is actuated, and if the output of the limit switch (7) is stopped before the output stop time (tb) passes, the air-conditioning operation will be shifted to the step ST210. In this way, while this operational sequence is repeated, the blow-off duct (16) automatically swings along with the reciprocating rotation thereof in the rotation range of 100 degrees, thereby blowing off cooled air into the area within this rotation range.

The steps ST201 through ST214 and ST225 constitute the above-mentioned automatic swing means (75c).

In the automatic swing operation mode, when the one-way rotation timer (TMa) has completed its counting of the one-way rotation time (ta) in the step ST203, the air-conditioning operation moves on to the step ST215 where the abnormal process of the limit switch (7) and the geared motor (41) will be initiated. Then, the abnormal process will be carried out in the step ST216.

It is set that the limit switch (7) outputs the position signal at a certain period during the one-way rotation time (ta). Therefore, by using this regular output of the signal, abnormality can be found when there is no output of the position signal during the one-way rotation time (ta). More specifically, abnormality can be found when the rotation speed of the blow-off duct (16) decreases or the blow-off duct (16) is not rotating due to the trouble in the geared motor (41), or there is no signal output due to the short-circuit in the limit switch (7). Normal swing control cannot be achieved in these cases. Accordingly, the geared motor (41) will be stopped in the step ST216. Or the Triacs (78a), (79a) will be switched off while the abnormal process will be carried out, for example, lighting the abnormality indicating lamp.

In the above automatic swing mode, when the output stop timer (TMb) completes counting of the output stop time (tb) in the step ST208 or ST213, the following steps will be taken. In the case of the initiation of the anticlockwise rotation, the operation shifts from the step ST208 to the step ST217 where the output stop timer (TMb) is reset. Then in the step ST218, it is determined whether the rotation control flag (RCF) is set up or not. Since the rotation control flag (RCF) is "0" when the output stop timer (TMb) starts counting during the normal control and then completes its counting, the operation moves from the step ST218 to the step ST219 where the rotation control flag (RCF) is set up, and then shift to the step ST211. On the other hand, in the case of the initiation of the clockwise rotation, when the output stop timer (TMb) completes its counting, the operation of the steps ST213 through ST220, ST221, and ST222 will be carried out as in the case of the initiation of the anticlockwise rotation. After resetting the output stop timer (TMb), and determining and setting the rotation control flag (RCF), the air-conditioning operation will move on to the step ST206.

The limit switch (7) outputs the detection signal only during the output stop time (tb) until the blow-off duct (16) is reversed. Therefore, by using this regular stopping of the output, abnormality or incorrect control can be determined when the output of the position signal does not stop during the output stop time (tb). As described earlier, for example, when the output stop timer (TMb) completes its counting (the steps ST217 through ST219) in the case of the initial control of the anticlockwise rotation in the step ST206, subsequently, in the step ST211, the clockwise rotation control will be conducted to reverse the rotation of the blow-off duct (16). When the limit switch (7) stops outputting the signal with this clockwise rotation control, the control in the step ST206 will be interpreted as incorrect. As a result, the operation shifts from the step ST214 to the step ST210 to carry out the normal processing. Meanwhile, when the limit switch (7) continues to output the position signal even if the clockwise rotation control is completed in the step ST211, the air-conditioning operation shifts from the step ST213 to the steps ST220 and ST221. Then, since the rotation control flag (RCF) has been set up in the step ST219, the operation in the step ST223 and ST224 will be carried out. Accordingly, as in the operation of the steps ST215 and ST216, abnormal state of the limit switch (7) or the geared motor (41) will be determined and the geared motor (41) is stopped to carry out the abnormal process.

When the output stop timer (TMb) completes counting for the first time during the clockwise rotation control in the step ST211, the air-conditioning operation shifts from the step ST222 to the step ST206 where once the anticlockwise rotation control is carried out. Then, operative measures for normal functioning (step ST225) or abnormal functioning step ST223 are respectively taken when the limit switch (7) stops or continues the signal output.

The above-mentioned automatic swing control applies to the case when the direction of the duct rotation before the limit switch (7) outputs the position signal can be identified. However, the direction of the duct rotation may not be identified during the initial phase of the automatic swing control, for example, at the start of the operation. In detail, at the starting of the operation and so on, the probe (71) of the limit switch (7) makes contact with either one of the projections (62), (63) and outputs the position signal. However, in this case, the position signal only from the one limit switch (7) is outputted. As a result, it is not clear whether the blow-off duct (16) is in the right end position or the left end position, making it impossible to determine the direction for starting the rotation, anticlockwise or clockwise.

Accordingly, such an approach has been taken to identify the direction of the duct rotation with the operations in the steps ST208, ST213, ST217 through ST222 by making use of the regular stopping points of the output of the position signal from the limit switch (7).

First, at the start of the operation, the air-conditioning starts from the step ST1 and moves from the step ST410 to ST201, and then through the step ST205. Subsequently, in the step ST410, the blow-off duct (16) is set to rotate in either clockwise or anticlockwise direction, for example to start anticlockwise rotation. Then moving from the step ST205 to ST206, the geared motor (41) is activated. After that, the operations from the steps ST207 through ST209 will be carried out, thereby determining whether the limit switch (7) stops signal output within the output stop time (tb). If the blow-off duct (16) is located in the right end position and the limit switch (7) is outputting the position signal due to the contact with the first projection (62), the anticlockwise rotation should be initiated. Accordingly, the output of the position signal will be stopped within the output stop time (tb). Consequently, the air-conditioning operation shifts from the step ST209 to the step ST210, thus carrying out the normal swing control of the spot air-conditioner.

If the anticlockwise rotation is initiated in the step ST206, the blow-off duct (16) will be located in the left end position and the limit switch (7) will output the position signal due to the contact with the second projection (63). Therefore, the clockwise rotation should be initiated and the output stop timer (TMb) complete its counting while the position signal is being outputted. As a result, the air-conditioning operation will be shifted to the step ST211 through the steps ST217 to ST219, thereby starting the clockwise rotation. The blow-off duct (16) is in the state to rotate in the clockwise direction. Consequently, the limit switch (7) stops the output within the output stop time (tb), and the air-conditioning operation moves from the step ST214 to ST210, thereby carrying out the normal swing control.

The operation may be started by the clockwise rotation in the step ST205. In this case, the operation shifts from the step ST213 to the steps ST220 through ST222 to act in the same manner as in the description above.

The direction of the duct rotation is determined when the output of the position signal stops while the blow-off duct (16) is rotated in the transverse direction for a short period of time.

Figure 17:
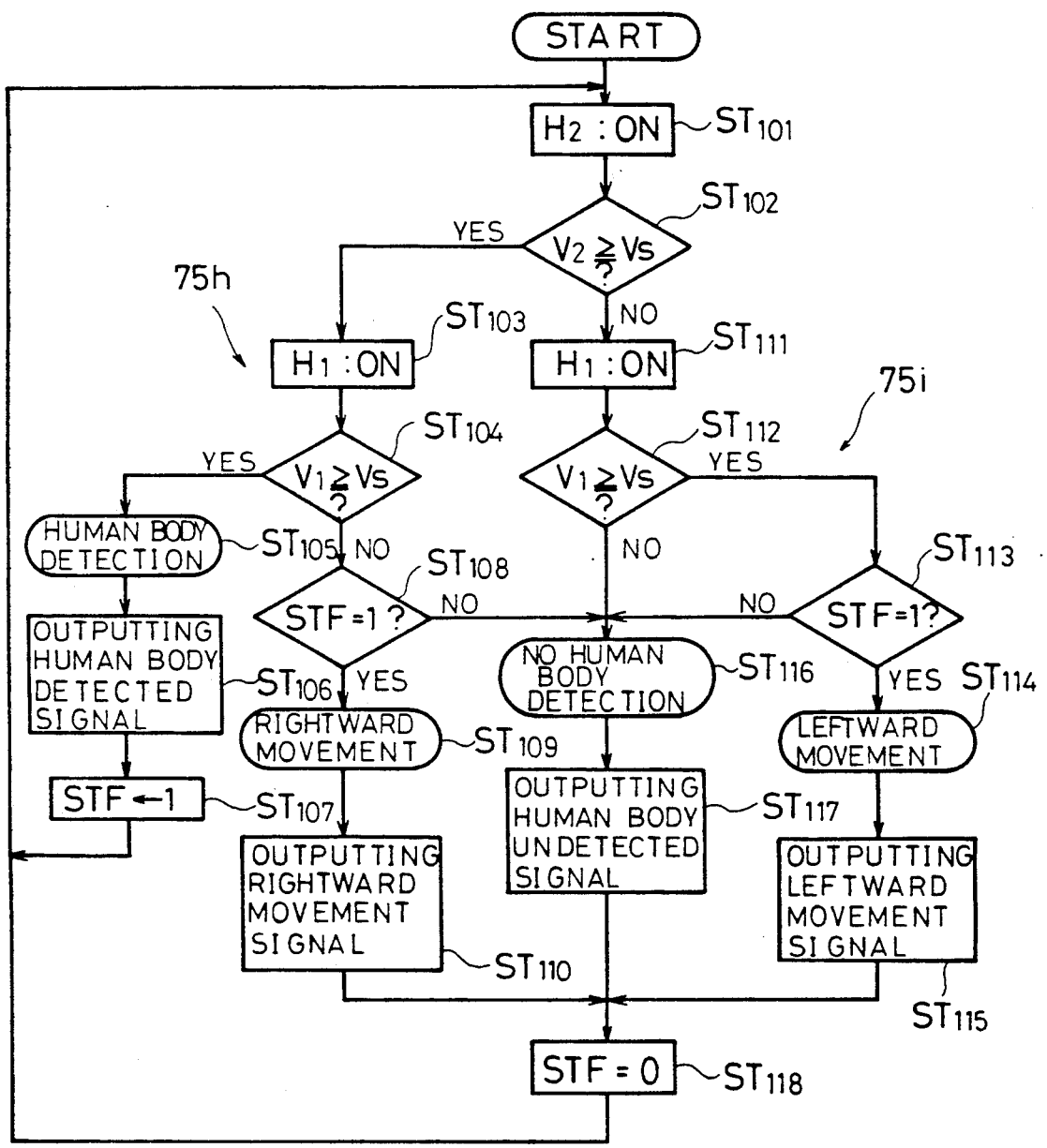
Figure 18:
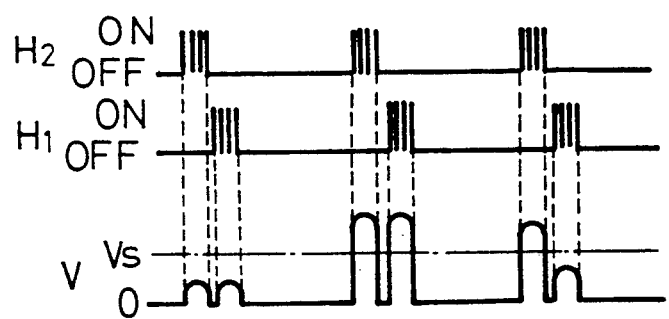

The following description relates to the human body tracking mode. Referring to the control flow chart in FIG. 17 and the control timing shown in FIG. 18, the signal processing action of the human body detection sensor (72) as a basis for the direction control of the blow-off duct (16) will be discussed. FIG. 17 shows the control flow of the CPU (1). In the step ST101, the radiation element ($H_2$) on the right is switched "ON" (refer to FIG. 18 (ii)) to radiate infrared rays. In the step ST102, it is determined whether the output signal $V_2$ of the radiation receiving element (J) is not less than the set value $V_s$ or not. When the output signal $V_2$ is not less than the set value $V_s$, the radiation element ($H_1$) on the left will be switched "ON" (refer to FIG. 18 (i)) to radiate infrared rays in the step ST103. Then, in the step ST104, it is further determined whether the output $V_1$ of the radiation receiving means (J) is not less than the set value $V_s$ or not. If the determination is "YES", it is judged that the person to be air-conditioned is present in front of the radiation receiving element (J). Then, in the step ST105, the human body detection will be initiated, and in the step ST106, the human body detection signal is outputted. Finally, after setting the sensor flag (STF) to "1" to indicate than the signals both from the radiation elements ($H_1$), ($H_2$) are being inputted simultaneously into the radiation receiving element (J) in the step ST107, the air-conditioning operation will be returned to the step ST101.

When the determination in the step ST104 becomes "NO" indicating that the output $V_1$ of the radiation receiving element (J) is not more than the set value $V_s$ after repeating the above-mentioned control flow, it is judged that the person to be air-conditioned is present in the region outside of the directional angle range $\pm\theta_H$ of the radiation element ($H_1$) on the left. Then, in the step ST108, it is determined whether the sensor flag (STF) is set to "1" or not. If it is "1" or "YES", it is determined that the person to be air-conditioned who had been present in front of the radiation receiving element (J) moved to the right. In the step ST109, the rightward movement action indicating that the person to be air-conditioned has moved to the right is started, and in the step ST110, the rightward movement signal will be outputted.

On the other hand, when the determination in the step ST102 becomes "NO" indicating that the output $V_2$ of the radiation receiving element (J) is not more than the set value $V_S$, the radiation element ($H_1$) on the left will be switched "ON" in the step ST110. Then, in the step ST112. it is determined whether the output $V_1$ of the radiation receiving element (J) is not less than the set value $V_s$ or not. If the answer is "YES", it is further determined in the step ST113 whether the sensor flag (STF) is indicating "1" or not. If it indicates "1", it is judged that the person to be air-conditioned who had been present in front of the radiation receiving element (J) leftward his position. As a result, in the step ST114, the leftward movement action indicating that the person to be air-conditioned moved to the left will be initiated, and in the step ST115, the leftward movement signal will be outputted.

In a case other than the one described before, that is when the determinations in the steps ST102 and ST112 are both "NO", and neither the output $V_1$ nor $V_2$ of the radiation receiving element (J) is not less than the set value $V_s$ during the "ON" state of the radiation elements ($H_1$), ($H_2$). Or in the case when the determinations in the steps ST108 and ST113 are both "NO", and infrared rays from either one radiation element ($H_1$ or $H_2$) is incident during this human body undetected state. In these cases, the action of "no human body detection" will be initiated in the step ST116 and the human body undetected signal will be generated in the step ST117.

After carrying out the above-mentioned control flow, the sensor flag (STF) is set to "0" in the step ST118, and then the air-conditioning operation will be returned to the step ST113 to repeat the above-mentioned control flow. These steps ST102, ST104 and ST105 constitute the human body detection and determination means (75h), and the steps ST102, ST104, ST108, ST112 and ST113 constitute the human body movement determination means (75i).

Figure 22:
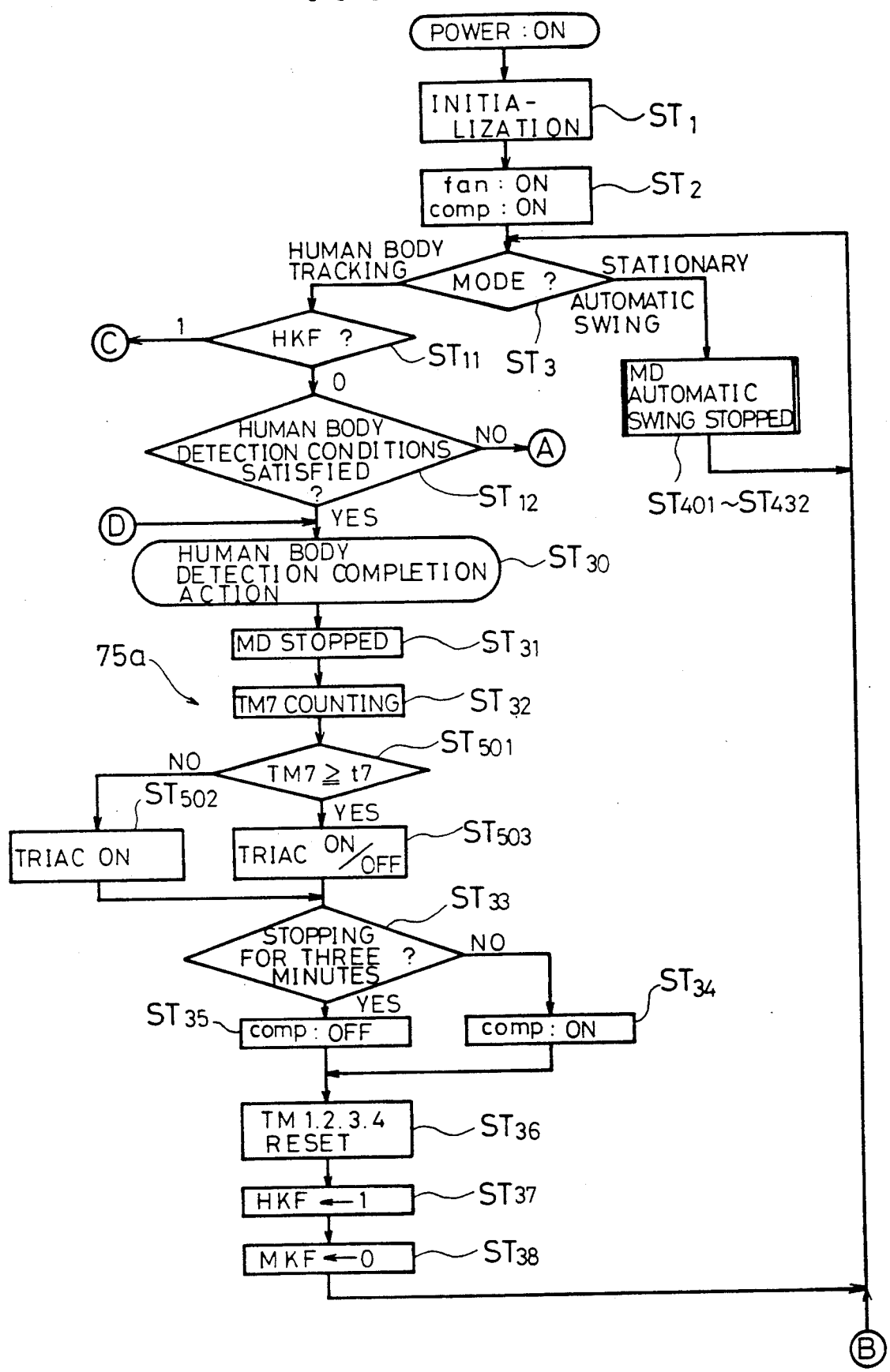
Figure 23:
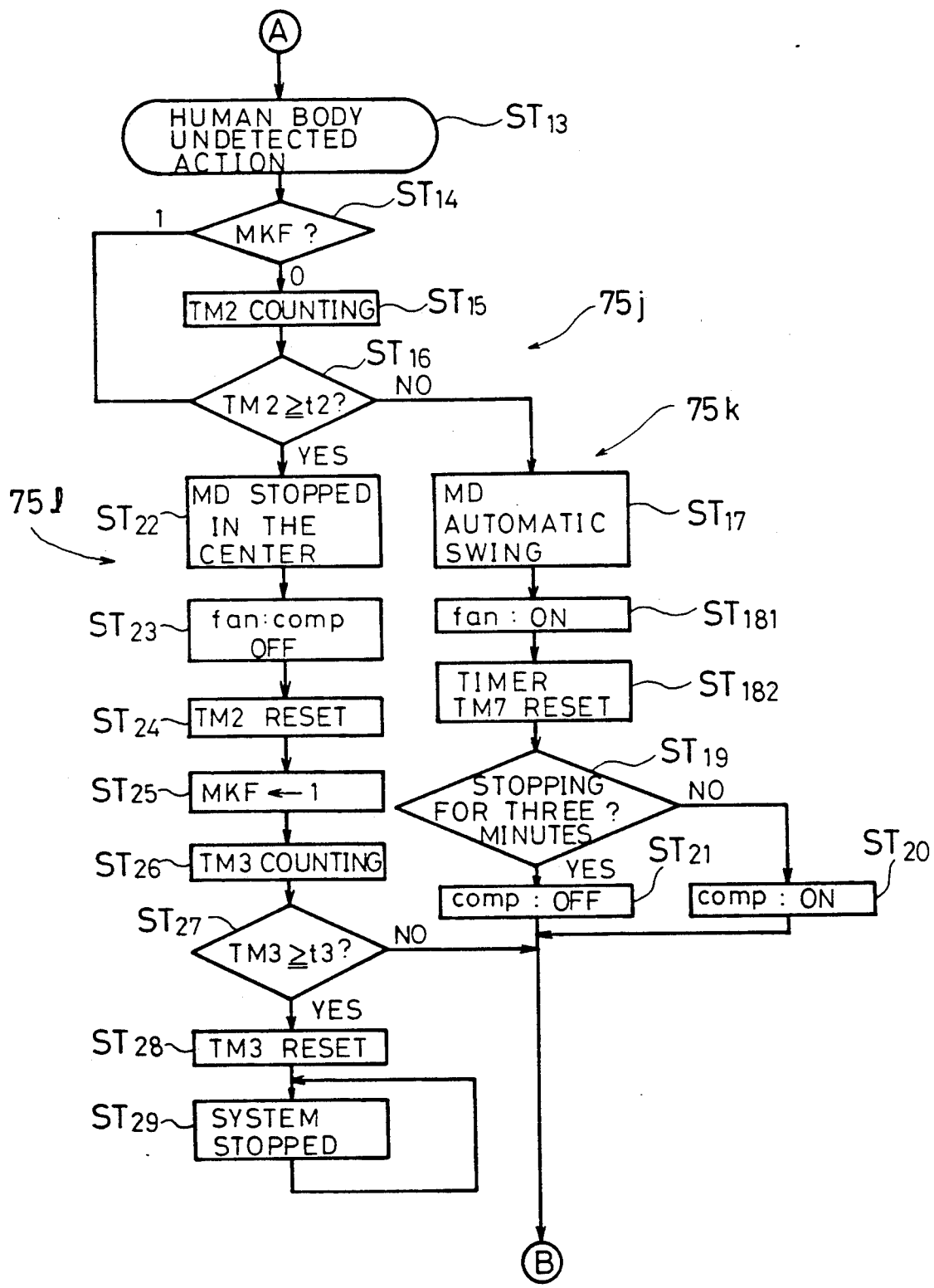

Now referring to FIGS. 22 through 24, the control flow in the human body tracking mode based on the aforementioned signal processing of the human body detection sensor (72) will be described.

To begin with, after the power is switched "ON", the air-conditioning operation is carried out in the same manner as the stationary mode from the steps ST1 through ST3. Since the mode change-over switch (76) is set in the human body tracking mode, the human body tracking mode is determined in this step ST3 to be followed by the control of the step ST11 where it is determined whether the human body detection flag (HKF) is indicating "0" or not. The operation moves to the step ST12 because the human body detection flag (HKF) is reset at the time when the power is turned on. In the step ST12, it is determined whether the human body detection sensor (72) is generating the human body detected signal or not. When the human body undetected signal is outputted in the step ST117, the air-conditioning operation moves to the step ST13. On the other hand, when the human body detected signal is outputted in the step ST105, the air-conditioning operation moves to the step ST30.

If there is no detection of the person to be air-conditioned (refer to FIG. 23), the human body undetected action will be started in the step ST13. Then, in the step ST14, it is determined whether the human body undetected flag (MKF) is indicating "0" or not. Since the human body undetected flag (MKF) is reset at the time when the power is turned on, the air-conditioning operation will shift from the step ST14 to the step ST15 where the second timer (TM2) is actuated. Then, in the step ST16, it is determined whether the second timer (TM2) indicates that the predetermined short standby time ($t_2$) has passed or not. The air-conditioning operation shifts from the step ST16 to the ST17 until this short standby time ($t_2$) passes. Then, the search of the person to be air-conditioned will be carried out while the short standby operation will be conducted in the step ST17. More specifically, in the step ST17, the geared motor (41) is activated and the blow-off duct (16) is swung in response to the output signal from the limit switch (7) as in the same manner with the automatic swing mode. Next, in the step ST181, the control relay for a fan (X1) and the Triac (83a) of the intermittent control circuit (83) will be switched "ON" to be driven continuously when both fans (12e), (12f) have been halted. In the step ST182, a seventh timer (TH7) for starting the intermittent operation, which will be described later, is reset. Then, in the step ST19, it is determined whether three minutes have passed since the compressor (12a) stopped in order to prevent continuous activation and stopping of the compressor (12a) as in the step ST404. When three minutes have passed, the air-conditioning operation shifts to the step ST20 to continuously drive the compressor (12a) if it has already been activated or driven. Before three minutes passes, the air-conditioning operation shifts to the step ST21 and then returns to the step ST3 while the compressor (12a) remains halted. Thus, the operation from the steps ST11 through ST21 will be repeated. In detail, the short standby time ($t_2$) is set, for example, to 5 minutes. When the human body detection sensor (72) does not detect the person to be air-conditioned, the spot air-conditioner waits for 5 minutes until the person to be air-conditioned reenters the air-conditioning area while continuing to blow off cooled air by driving the compressor (12a), and the fans (12e), (12f). In this standby state, the spot air-conditioner rotates the blow-off duct (16) to search for the person to be air-conditioned in the air-conditioning area.

When the person to be air-conditioned have not yet been detected before the short standby time ($t_2$) passes, the operation shifts to the long standby control. First, the operation moves from the step ST16 to the step ST22 where the geared motor (41) is stopped to halt the blow-off duct (16) in the central position in relation to the air-conditioner (12). Then, in the step ST23, the control relay for a fan (X1) and the control relay for the compressor (X2) are switched "OFF" to stop the fans (12e), (12f) and the compressor (12a). Next, in the step ST24, the second timer (TM2) is reset, and in the step ST25, the human body undetected flag (MKF) is set to "1". Then, in the step ST26, the third timer (TM3) is actuated, and in the step ST27, it is determined whether the third timer (TM3) has completed counting the predetermined long standby time ($t_3$) or not. Returning to the step ST3 from this step ST27, the above-mentioned controls will be repeated until the long standby time ($t_3$) passes. In the meantime, the human body undetected flag (MKF) is being set up (step ST25). Accordingly, the air-conditioning operation will be returned from the step ST14 to the step ST22 and the second timer (TM2) will never be actuated.

When the long standby time ($t_3$) has passed without any detection of the person to be air-conditioned by the human body detection sensor (72) during this standby time ($t_3$), the air-conditioning operation will be shifted from the step ST27 to ST28 where the third timer (TM3) is reset. Then, in the step ST29, system-down will be carried out. Therefore, the power must be switched "ON" again for the reactivation of the system and the air-conditioning operation will start from the step ST1 in the control flow chart. Specifically, the long standby time ($t_3$) is set, for example, to be one hour. If the person to be air-conditioned has not yet come back to the air-conditioning area when the short standby time ($t_2$) passed, the compressor (12a) and the fans (12e), (12f) are stopped in order to halt the blow-off of cooled air or ventilation, and also the blow-off duct (16) is stopped in the center to stand by for the reentry of the target person into the air-conditioning area. If the target person has not yet returned when one hour passed, the overall system will be stopped, and the compressor (12a) and so on will never be reactivated automatically even when the target person reenters the monitor area covered by the human body detection sensor (72). The steps ST13 through ST21 constitute the short standby means (75j), the step ST17 constitutes the human body search means (75k), and the steps ST22 through ST29 constitute the long standby means (75l).

Next, when the human body detection sensor (72) outputs the human body detection signal in this human body tracking mode, the air-conditioning operation shifts from the step ST12 to the step ST30 (refer to FIG. 22) where a human body detection completion action will be initiated. First, in the case when there is no movement of the person to be air-conditioned, the air-conditioning operation shifts from the step ST30 to the step ST31 where the geared motor (41) is stopped, if it has been activated, in order to halt the blow-off duct (16). Then, in the step ST32, the seventh timer (TM7) is actuated. In the step ST501, it is determined whether the seventh timer (TM7) completed counting the predetermined continuous operation time ($t_7$) or not. The air-conditioning operation shifts to the step ST502 until this continuous operation time ($t_7$) passes. In the step ST502, the control relay for a fan (X1) is switched "ON", and the Triac (83a) of the intermittent control circuit (83) is also switched "ON" to supply power continuously to the fan motor (12d), thereby continuously driving the fans (12e), (12f). Subsequently, in the step ST33, it is determined, as in the case of the step ST404, whether three minutes have passed since the compressor (12a) stopped. This is to prevent the continuous activation and stopping of the compressor (12a). When it is determined that three minutes have passed, the air-conditioning operation shifts to the step ST34 where the compressor (12a) is activated, or is kept on activating if the compressor (12a) has already been activated and then to be followed by the step ST36. On the other hand, the air-conditioning operation moves to the step ST35 until three minutes passes and then shifts to the step ST36 while the compressor (12a) remains stopped. In the step ST36, each timer (TM1)~(TM4) is reset and in the step ST37, the human body detected flag (HKF) is set to "1". In the step ST38, the human body undetected flag (MKF) is reset and then the air-conditioning operation will return to the step ST3. Then, in the step ST11, it is determined "NO" since the human body detected flag (HKF) is set up (step ST37). In the step ST39 (refer to FIG. 24), it is checked whether the human body movement condition is satisfied or not. Also determined is whether the movement signal is outputted in the steps ST110 and ST115. When there is no movement of the target person, the air-conditioning operation will return to the step ST30. The control flow shown in the steps ST3, ST11, ST321 through ST323, and ST30 through ST39 will be repeated at a certain timing until the continuous operation time ($t_7$) passes.

For example, if the presence of the target person is detected by the human body detection sensor (72) while the search of the target person is carried out in the step ST17, the blow-off duct (16) is stopped to be directed toward the target person, thereby air-cooling locally with blowing off cooled air to the target person in the step ST31.

When the target person enters into the monitor area of the human body detection sensor (72) during the long standby time in the steps ST22 through ST27, the air-conditioning operation shifts from the step ST12 to ST30, as mentioned above, where the compressor (12a) and the fans (12e), (12f) are driven to blow off cooled air to the target person.

When the seventh timer (TM7) completes counting the continuous operation time ($t_7$) while the target person stays in the same position, the air-conditioning operation shifts from the step ST501 to ST503 where the Triac (83a) of the intermittent control circuit (83) is ON/OFF controlled based on the control signal from the CPU (75) to interrupt the power supply to the fan motor (12d). Then back in the step ST33, the above-mentioned control will be repeated. In this way, when there is no movement of the target person for a long time, the fan motor (12d) is switched ON and OFF to cause the intermittent drive of the fans (12e), (12f) between the normal rotation and the rotation by inertia. Thus, the amount of cooled air blown off to the target person can be varied by intermittently repeating the sequence of normal wind and light wind.

The air-conditioning control in the case when there is a movement of the target person while the human body detection completion action is being carried out is now described as follows. (refer to FIG. 24)

When the human body detection sensor (72) outputs the movement signal in the steps ST110 and ST115, it is determined in the step ST39 whether the human body movement condition is satisfied or not. Then, moving from the step ST39 to the step ST511, the Triac (83a) of the intermittent control circuit (83) is switched ON, if it has been ON/OFF controlled, in order to continuously drive the fans (12e), (12f). Then, in the step ST512, the seventh timer (TM7) is reset, and in the step ST40, the first timer (TM1) is actuated. In the step ST41, it is determined whether the first timer (TM1) has completed counting the predetermined delay time ($t_1$). The air-conditioning operation will return to the step ST3 until the delay time ($t_1$) passes. This delay time ($t_1$) is set, for example, to be one second. If the target person leaves and then immediately reenters the monitor area of the human body detection sensor (72), the blow-off duct (16) remains in its position for one second without any movement thereof. The steps ST40 and ST41 constitute drive delay means (75m).

Later when the delay time ($t_1$) has passed, the air-conditioning operation shifts from the step ST41 to the step ST42 where the direction of the movement of the target person, movement to the right or to the left, will be determined. In response to the output signal from the human body detection sensor (72), the air-conditioning operation moves to the step ST43 when the rightward movement signal is outputted in the step ST110, or to the step ST44 when the leftward movement signal is outputted in the step ST115. In the case of the right movement, it is determined in the step ST43 whether the blow-off duct (16) has reached the right end limit position or not. When the blow-off duct (16) has not yet reached the right end limit position, in other words, when the limit switch (7 has not yet outputted the signal without making contact with the first projection (62), the air-conditioning moves from the step ST43 to ST45 since the blow-off duct (16) is rotatable to the right. In the step ST45, the geared motor (41) is activated to rotate the blow-off duct (16) to the right. Then in the step ST46, the first timer (TM1) and the fourth timer (TM4) are reset. In the step ST47, the human body detection flag (HKF) is reset. Then, the air-conditioning operation will return to the step ST3. Since the human body detection flag HKF is reset, the determination in the step ST11 will be "YES". Therefore, after once carrying out the control in the steps ST30 through ST38, the air-conditioner will execute the control of step ST40. When the target person is still moving to the right after the delay time ($t_1$) passes, the blow-off duct (16) will be continuously driven to the right.

Similar control will be conducted also in the case of the leftward movement of the target person. The air-conditioning operation moves from the step ST42 to the step ST44 where it is determined whether the blow-off duct (16) has reached the left end control position. When the limit switch (7) has not yet outputted the signal without making contact with the second projection (63), the air-conditioning operation shifts from the step ST44 to the step ST48 where the geared motor (41) is reversed to move the blow-off duct (16) in the leftward direction. Then, in the step ST46, the same control as in the case of the rightward rotation will be conducted.

When the target person moves to the right or to the left in the air-conditioning area defined by the blow-off duct, the human body detection sensor (72) identifies the direction of the movement thereof. In the steps ST45 and ST48, the geared motor (41) is forwarded or reversed so that the blow-off duct (16) can follow the movement of the target person. Accordingly, cooled air can be directed to the target person even if he/she is moving.

Meanwhile, when the blow-off duct (16) has rotated and reached the right end limit position or the left end limit position in the steps ST43 and ST44, the air-conditioning operation shifts from the step ST43 to ST49 or from the step ST44 to ST50 to actuate the fourth timer (TM4) since the blow-off duct (16) cannot be rotated further to the same direction even if the target person further moves to that direction. Then, the air-conditioning operation shifts from the step ST49 to the step ST51, or from the step ST50 to the step ST52. The air-conditionin operation returns from the step ST51 or ST52 to the step ST3 until the fourth timer (TM4) completes counting the predetermined stopping time ($t_4$). The blow-off duct (16) stops in each end portion limit position until this stopping time ($t_4$) passes. When this stopping time ($t_4$) has passed, the air-conditioning operation shifts from the step ST51 to the step ST48, or from the step ST52 to the step ST45 where the rotational direction of the blow-off duct (16) is reversed. Then, proceeding to the step ST46, the above-mentioned control will be carried out.

In detail, since the target person is likely to reenter the air-conditioning area from the same end thereof where he/she once left the area, the blow-off duct (16) is stopped in each end limit position. And when the target person is detected during this stopping time ($t_4$), the air-conditioning operation will be shifted once from the step ST39 to the step ST30. While continuing the tracking of the target person, the blow-off duct (16) is reversely rotated if the target person does not return, and it is determined whether the human body detected signal is outputted in the step ST12 or not.

Then, after carrying out the short standby action and the search action (steps ST13 through ST21), the long standby action (steps ST22 through ST29) will be initiated. If the target person returns to the air-conditioning area during this long standby action, the human body tracking will be resumed.

The steps ST30 through ST47 constitute wind direction control means (75a) while the steps ST43, ST44 and ST49 through ST52 constitute duct stopping means (75n).

When setting the operation change-over switch (82) to the ventilation contact (82b), only the fans (12e), (12f) will be driven in the above-mentioned control flow.

In this way, the blow-off duct (16) keeps track of the movement of the person to be air-conditioned based on the human body detected signal and the movement signal outputted by the human body detection sensor (72). Accordingly, conditioned air can be reliably blown off toward the person to be air-conditioned. Since the target person can feel conditioned air even if he moves while being engaged in various jobs, comfortableness of the air-conditioning will be greatly improved. In addition, maximum effect of the localized air-conditioning can be obtained. Further, since the blow-off duct (16) automatically keeps track of the movement of the human body, the target person are free from the burden of manually changing the blow-off direction of cooled air, thus increasing effectiveness in operation.

A single human body detection sensor (72) is mounted on the end portion of the blow-off duct (16) in this invention. As a result, the person to be air-conditioned in front of the blow-off duct (16) can be reliably detected. Further advantage of this human body detection sensor (72) is that the signal processing and so on can be accomplished with a simple construction, and the blowoff duct (16) can reliably carry out the human body tracking in accordance with the working environment of the person to be air-conditioned.

The human body detection sensor (72) disposes the pair of infrared rays radiation elements ($H_1$), ($H_2$) on both sides of a single infrared rays radiation receiving element (J) so as to avoid the interference of radiation directional angle areas thereof. On the other hand, the human body detection sensor (72) disposes the pair of infrared rays radiation elements ($H_1$), ($H_2$) in such a manner that the radiation directional angle areas thereof and the radiation receiving directional angle area of the radiation receiving element (J) overlap each other. With this arrangement, the detection signal of a person to be air-conditioned is outputted only when the amounts of infrared rays reflection radiated from the radiation elements ($H_1$), ($H_2$) are both not less than a set amount. This means that the presence of a person to be air-conditioned can be reliably detected regardless of any mirror reflectors present in the rear or an ambient air temperature, thereby improving the accuracy of the human body detection. Movement of the target person to a radiation directional angle area of the other radiation elements ($H_1$ or $H_2$) is determined when infrared rays intensity from either one radiation elements ($H_1$ or $H_2$) becomes lower than a set value after the output of the human body detected signal. Therefore, movement of the target person to be air-conditioned can be accurately detected by this simply-constructed human body detection sensor (72) without requiring an additional detection device.

A short period of delay time ($t_1$) is set for the blow-off duct (16) to follow the movement of the target person. Accordingly, in the case when the person temporarily moves to the right or left and then immediately returns to the former position, the blow-off duct (16) stays in the same position and does not begin tracking. In this way, unnecessary motion of the blow-off duct (16) can be prevented, thereby achieving highly accurate control and improving reliability of wind direction control.

Over-cooling or over-warming inside the air-conditioning area may occur when conditioned air is continuously blown to the person to be air-conditioned all during the fixed time ($t_7$), especially when the person to be air-conditioned stays in the same position. However, in this invention, the amount of blown-off air can be varied intermittently. thus preventing over-cooling or over-warming. In this way, comfortableness can be further increased. Since this intermittent operation is conducted after achieving the optimum air-conditioning environment, the intermittent operation time can be reduced, thus improving the reliability of the fan drive means (12d). Furthermore, since ON/OFF control is carried out, simply-constructed control can be realized while electricity consumption can be reduced.

Since the blow-off duct (16) halts its motion at the rotation limit position thereof when the target person moves out of the air-conditioning area, the target person can instantaneously be exposed to conditioned air upon returning to the air-conditioning area from the rotation limit position. This mechanism is effective because the target person is most likely to return to the air-conditioning area from the direction where he has left, especially in case of temporary absence. In this way, conditioned air can be instaneously blown off to the target person, thereby further improving comfortableness in working environment.

In adition, even when the target person moves out of the air-conditioning area, the blow-off duct (16) stands by so as to instaneaneously resume its operation upon the return of the target person, thereby further improving comfortableness and achieving effective operation. In case when the target person stays away from the air-conditioning area for a long period of time, air-conditioning operation is stopped so as to avoid wastful use of electricity and to realize energy-saving operation. On the other hand, air-conditioning operation is automatically resumed upon the return of the target person so as to achieve an effective operation. In the case when the target person continuously stays away from the air-conditioning area for a long period of time, the system-down is carried out so as not to resume air-conditioning operation inadvertently, thus enabling highly accurate air-conditioning control. In this case, the blow-off duct (16) is halted at the center of the conditioning area in order to promptly respond to the return of the target person.

The human body search means (75k) is provided to search a person to be air-conditioned. This means that conditioned air is automatically blown off to a person to be air-conditioned when he enters into the air-conditioning area. Accordingly, comfortableness can be improved and effective operation can be achieved. The human body detection sensor (72) scans the air-conditioning area with the automatic swing of the blow-off duct (16) without requiring independent scanning means for the human body detection sensor (72). As a result, overall construction can be simplified and the blow-off duct (16) can be directed accurately to the target person in accordance with the output signal from the human body detection sensor (72). This search is conducted in the air conditioning state before the output of human body undetected signal by the human body detection sensor (72). Accordingly, a person to be air-conditioned can feel cooled air as soon as he enters into the air-conditioning area, thereby further enhancing comfortableness in work place.

Three modes are available for the blow-off duct (16). More specifically, the blow-off duct (16) can be controlled in the stationary mode, the automatic swing mode, or the human body tracking mode in accordance with work or number of persons to be air-conditioned. In this way, the spot air-conditioner in this invention can realize air-conditioning operation which can meet various conditions in work environment. In addition, air-conditioning operation will be stopped in the case when there is not target person to be air-conditioned in the air-conditioning area. This leads to prevention of unnecessary air-conditioning operation and realization of energy-saving. When the target person is away from the air-conditioning area for a long-term, the system-down will be carried out. Therefore, there will be no inadvertent resumption of air-conditioning operation, enabling highly accurate air-conditioning control. Air-conditioning operation can be set to the automatic stop mode. Accordingly, the spot air-conditioner in this invention can satisfy requirement in various mode of use.

Abnormality can be detected by the intervals of the position signals generated from the limit switch (7) in this invention. Therefore, abnormality of the duct drive mean (2), i.e. the geared motor (41) and the limit switch (7) can be reliably detected. In addition, abnormal process, for example, stopping the drive of the geared motor (41), can be carried out in an appropriate manner, thereby increasing reliability of the device as a whole, including the duct control. The spot air-conditioner in this invention can carry out the swing control of the blow-off duct (16) accurately, thereby achieving reliable air-conditoning operation and improved comfortableness. There is no need to provide an abnormality detection sensor since the output signal from the limit switch (7) which detects the position of the blow-off duct (16) can be used for the abnormality detection, thereby keeping the number of necessary parts at a minimum level. In this way, abnormality detection can be conducted in the simple construction with a low cost. Further, abnormality can be detected by the output time of the limit switch (7). Accordingly, abnormality can be detected during a short period of time, thereby facilitating the prompt abnormal process in the system. At the same time, since the geared motor (41) of the duct drive means (2) is stopped in case of abnormality, incorrect control of the system as well as seizure of the geared motor (41) can be surely prevented.

During the automatic swing mode in the above-mentioned embodiment (refer to FIGS. 21A, 21B, hereinafter referred to collectively as "FIG. 21"), the geared motor (41) was reversed again (from the step ST218 to ST211 or from the step ST221 to ST206) when the output stopping timer (TMb) completes counting (step ST208, ST213). However, as an alternative control flow, the air-conditioning operation can be directly shifted from the step ST217 to ST223 or from the step ST220 to ST223 to take necessary steps in case of abnormality when the output stopping timer (TMb) once completed counting.

Figure 25A:
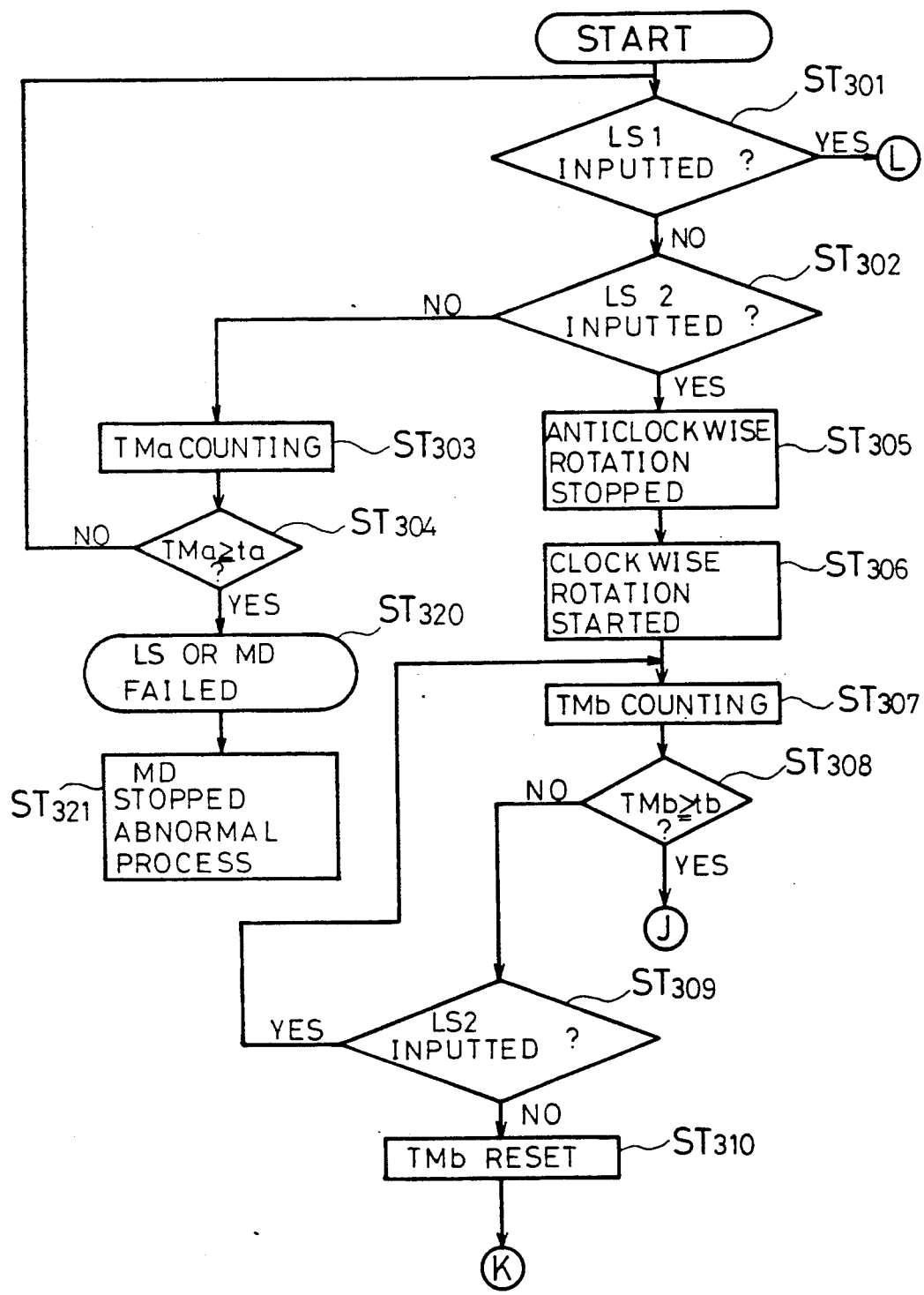
Figure 25B:
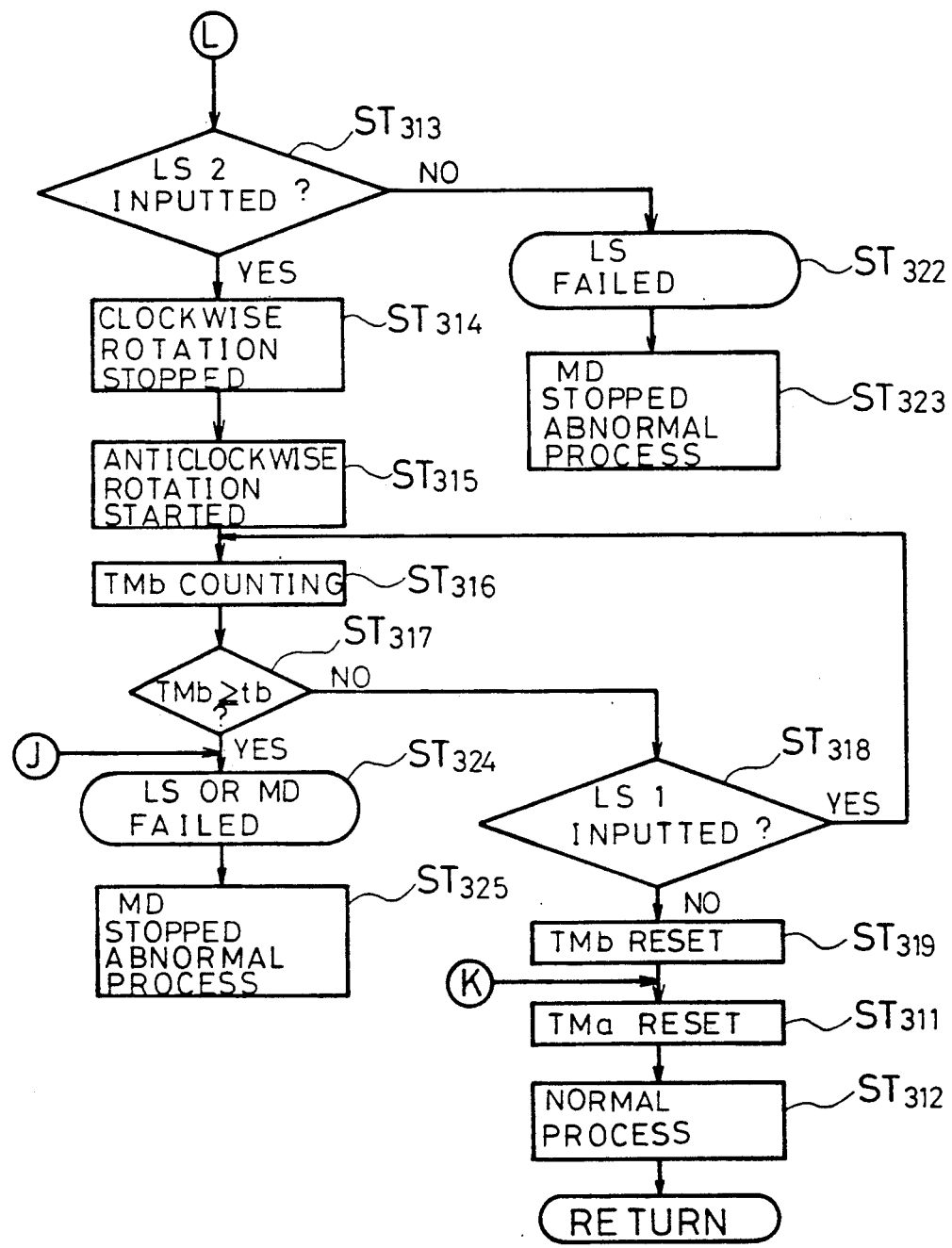
Figure 26:
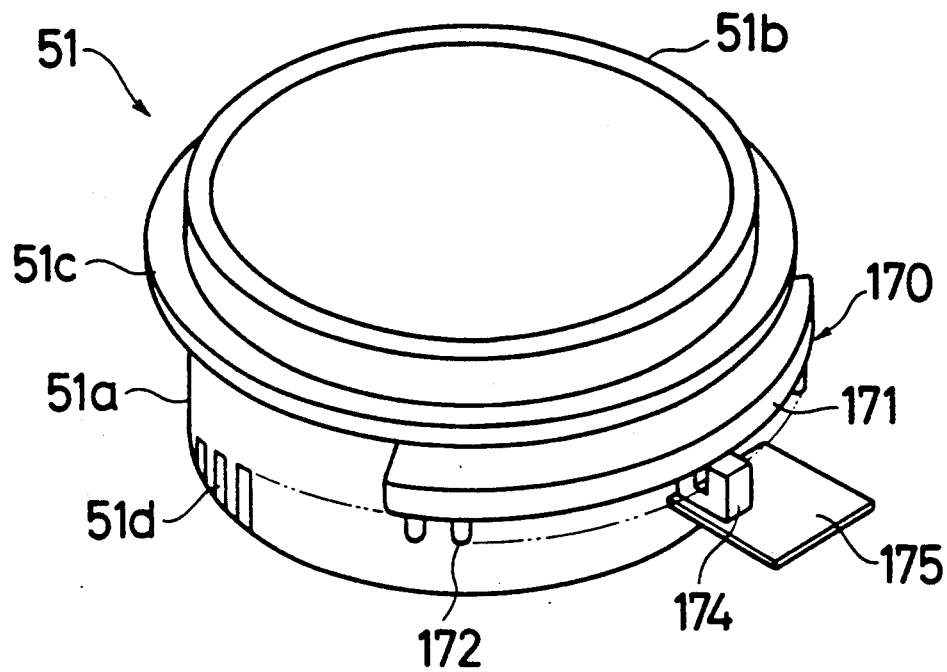
Figure 27:
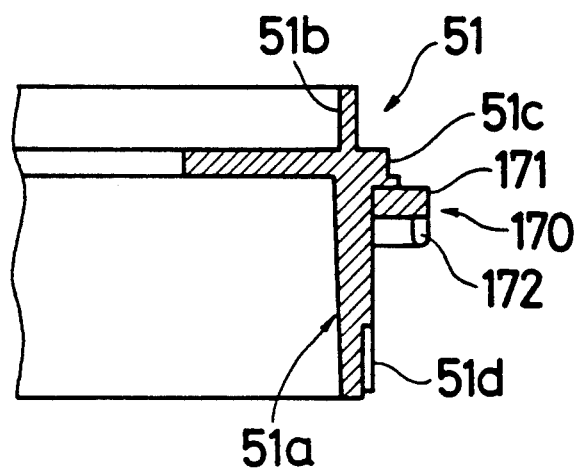

FIGS. 25A, 25B, hereinafter collectively referred to as "FIG. 25" shows the con&rol flow of the automatic swing motion of the blow-off duct (16) in case when two limit switches (7a), (7b) are provided. The structure for fixing a first limit switch (7a) and a second limit switch (7b) is as follows. In FIG.3, the first limit switch (7a) is shown in a continuous line corresponding to the limit switch (7) in the aforementioned embodiment while the second limit switch (7b) is shown in an alternate long and short dash line.

The limit switches (7a), (7b) which are composed microswitch and so on are provided in the clearance formed between a semi-circular guide wall (36) and a flat right side wall (32). These limit switches (7a), (7b) are vertically superposed in the upper and the lower positions on the support edge (39) formed on the left side wall (32). Probes (71a). (71b) of each limit switch (7a), (7b) are disposed to make contact, at upper and lower positions, with the outer periphery in the lower position of the stopper (61) of the rotary cylinder (51a).

Figure 8:
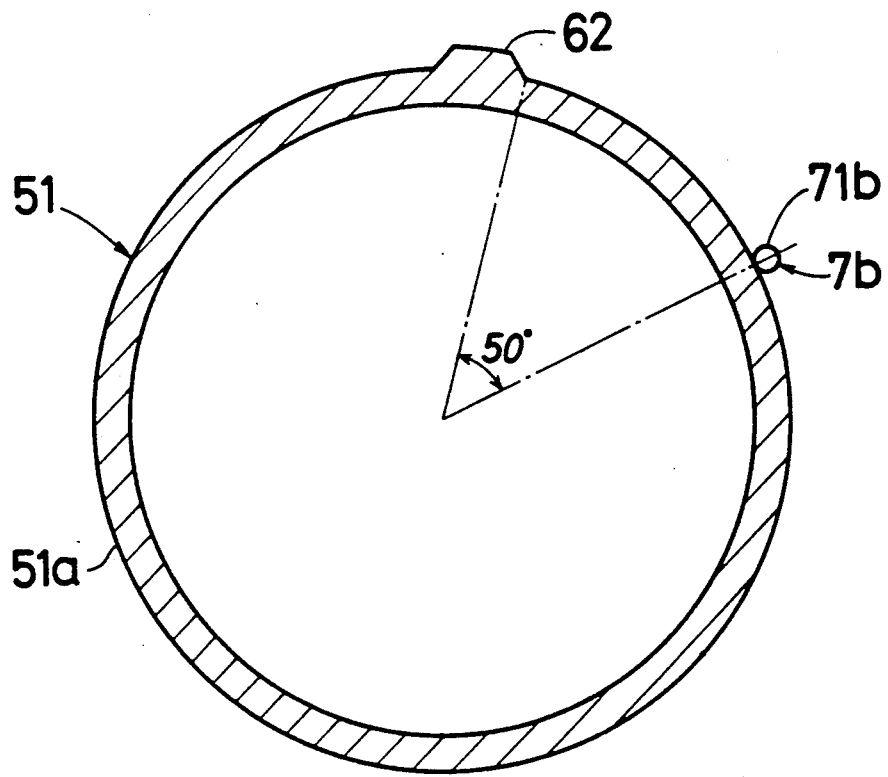

As shown in FIGS. 7 and 8, the first projection (62) and the second projection (63) with which the probes (71a). (71b) make contact are provided on the outer surface at the periphery of the rotary cylinder (51a). As in the case of the first embodiment, the projections (62), (63) are formed in the axial direction (the vertical direction) on the rotary cylinder (51a) with the first projection (62) in the right end limit position, and the second projection (63) in the left end limit position of the automatic swing range of the blow-off duct (16). The first projection (62) extends in the downward position of the second projection (63). With this arrangement, only the probes (71a), (71b) of the limit switches (7a), (7b) make contact with the first projection (62) while only the probe (71b) of the second limit switch (7b) makes contact with the second projection (63). The position signals from the limit switches (7a), (7b) are inputted into the CPU (75) to forward or reverse the geared motor (41).

Referring to the control flow chart of FIG. 25, the automatic swing control (the step ST410 in FIG.19) of the blow-off duct (16) in the case when these two limit switches (7a), (7b) are provided.

First, the air conditioning operation moves from the step ST3 the step ST410 in FIG. 19. After activating the geared motor (41), it is determined in the step ST301 whether the first limit switch (7a) has outputted the position signal or not. Then, the air-conditioning operation shifts to the step ST302 until the position signal is outputted. In this step ST302, it is checked whether the second limit switch (7b) has sent signal or not. Since both limit switch (7a), (7b) do not output the position signal during the rotation of the blow-off duct (16), the air-conditioning operation moves to the step ST303 where the one-way rotation timer (TMa) is actuated. Next, in the step ST303, it is determined whether the one-way rotation timer (TMa) completed counting the predetermined one-way rotation time (ta) or not. The air-conditioning operation returns to the step ST301 until the one-way rotation time (ta) passes. The One-Way rotation time (ta) corresponds to the time needed for the blow-off duct (16) to take a half turn or one-way turn. Therefore, the position signal will be generated within the one-way rotation time (ta) in the normal condition.

First, the control in the case when the blow-off duct (16) rotates in the anticlockwise direction, and reaches the left end position of the air-conditioning area will be discussed. In this left end position, only the second limit switch (7b) makes contact with the second projection (63) and outputs the position signal. Accordingly, the air-conditioning operation moves from the steps ST301, ST302, to the step ST305 where the geared motor (41) is stopped and reversed. Then, the clockwise rotation of the blow-off duct (16) is started, and the output stopping timer (TMb) is actuated to determine whether the second limit switch (7b) stops its signal output before the output stopping time (tb) passes or not. (steps ST306 through ST309) This output stopping time (tb) corresponds to the time needed for the projections (62), (63) to be out of contact with each limit switch (7a), (7b). As a result, when the signal output stops before this output stopping time (tb) passes, the output stopping timer (TMb) and the one-way rotation timer (TMa) are reset to conduct normal operation, and then the air-conditioning operation moves to the step ST408.

In the case when the blow-off duct (16) reaches the right end position before the one-way rotation time (ta) passes, both limit switches (7a), (7b) output the position signals. Therefore, the air-conditioning operation moves from the steps ST301 and ST313 to the step ST314 where the geared motor (41) is stopped and reversed. Then, after the blow-off duct (i) starts the anticlockwise rotation, the output stopping timer TMb is actuated as in the case of the clockwise rotation. When the output from both limit switches (7a), (7b) stop before the output stopping time (tb) passes, the output stopping timer (TMb) and the one-way rotation timer (TMa) are reset to conduct normal operation. (steps ST215 through ST319 and ST311, ST312)

The above-mentioned air-conditoning operations are repeated to swing the blow-off duct (16) in the transverse direction.

When neither limit switch (7a) nor (7b) outputs the position signal before the one-way rotation time (ta) passes during the swing motion of the blow-off duct (16), the air-conditioning operation moves from the step ST304 to the step ST320. There, the abnormal process is started against abnormality of each limit switch (7a), (7b) or the geared motor (41). Then, in the step ST321, the geared motor (41) is stopped in order to take necessary measures against abnormal condition.

When the second limit switch (7b) does not output the position signal although there was the output of position signal from the first limit switch (7a), the air-conditioning operation moves from the step ST313 to the step ST322 where the abnormal process of the limit switches (7a), (7b) is initiated. Then, in the step step 23, the geared motor (41) is stopped in order to take necessary measures against abnormal condition. In this way, in the present embodiment, the left end position of the blow-off duct (16) is identified by the output Only from the second limit switch (7b) while the right end position is identified by the output both from the limit switches (7a) and (7b). Accordingly, there is no such a case when only the first limit switch (7a) outputs signals. Thus, abnormality of both or either one limit switch (7a) or (7b) can be found when there is a signal output only from the first limit switch (7a).

Further, when the blow-off duct (16) reaches the right or the left end position and the limit switches (7a), (7b) do not stop outputting signals before the output stopping time (tb) passes, the air-conditioning operation shifts from the steps ST308 or ST317 to the step ST324. Here, the abnormal process of the limit switches (7a), (7b) is started and in the step ST325, the geared motor (41) is stopped in order to take necessary measure against abnormal condition.

In this way, abnormality of the limit switches (7a), (7b) or the geared motor (41) can be determined by the signal output from each limit switch (7a), (7b), thereby improving reliability of the swing control of the blow-off duct (16).

The steps ST301 through ST319 constitute automatic swing means (75c).

The following is a description about an alternative for the limit switches which can be used in the above embodiment, i.e. a non-contacting type of rotational angle detection means for the blow-off duct (16).

As shown in Figs. 26 through 29, an angular position member (170) is provided on the rear outer periphery of the rotary cylinder (51a). The angular position member (170) is constituted in such a manner that a plurality of projected portions (172) are formed on a circular support member (171) which is projected rearwardly from the rotary cylinder (51a). The projected portions (172) extend downwardly and are disposed corresponding to the rotational angle of the blow-off duct (16). Formed between the projected portions (172) and on both sides thereof are the recessed portions (173). Each projected portion (172) and recessed portion (173), having a fixed width, is disposed on a circumference of a circle which has the center thereof equal to the axial center of the rotary cylinder (51a). These projected portions (172) and the recessed portions (173) are also disposed in such a manner that the central recessed portion (173a) is located on the rotational center (N) of the blow-off duct (16), or located in the position corresponding to the one when the blow-off duct (16) faces the right ahead direction thereof. Intermediate recessed portions (173b) located between the central recessed portion (173a) and each projected portion (172) are formed in the uniformed small width. On the other hand, side end recessed portions (173c) on both ends are formed in the uniformed relatively large width. Central projected portions (172a), (172a) located on both sides of the central recessed portion (173a) among the projected portions (172) are formed in the relatively large width, while other side projected portions (172b) are formed in the uniformed small width. In detail, each projected portion (172) and recessed portion (173) is set within the range of 100 degrees which is somewhat smaller that the limit angle (110 degrees) of a stopper (not shown in the drawings) for forcedly restricting the rotation of the blowoff duct (16). Namely, an angle of each projected portion (172) and recessed portion (173) is set at 50 degrees in the transverse direction with the central recessed portion (173a) as a center. An angle between the intermediate recessed portions (173b), (173b) located on both sides of the central projected portion (172a), (172a) is set at 30 degrees. An angle of each intermediate recessed portion (173b) is set to correspond to 50 degrees, 70 degrees in order therefrom. An angle between the side end recessed portions (173c), (173c) are set at 100 degrees.

A photo-interrupter (174) as position detection means is provided in the casing (3) by means of a printed circuit board (175). The photo-interrupter (174) is constituted in such a manner that a radiation element (174a) and a radiation receiving element (174b), which will be described later, are disposed on the side portions of the projected portions (172) and the recessed portions (173) to detect the projected portions (172) and the recessed portions (173) optically without contacting therewith.

Figure 30:
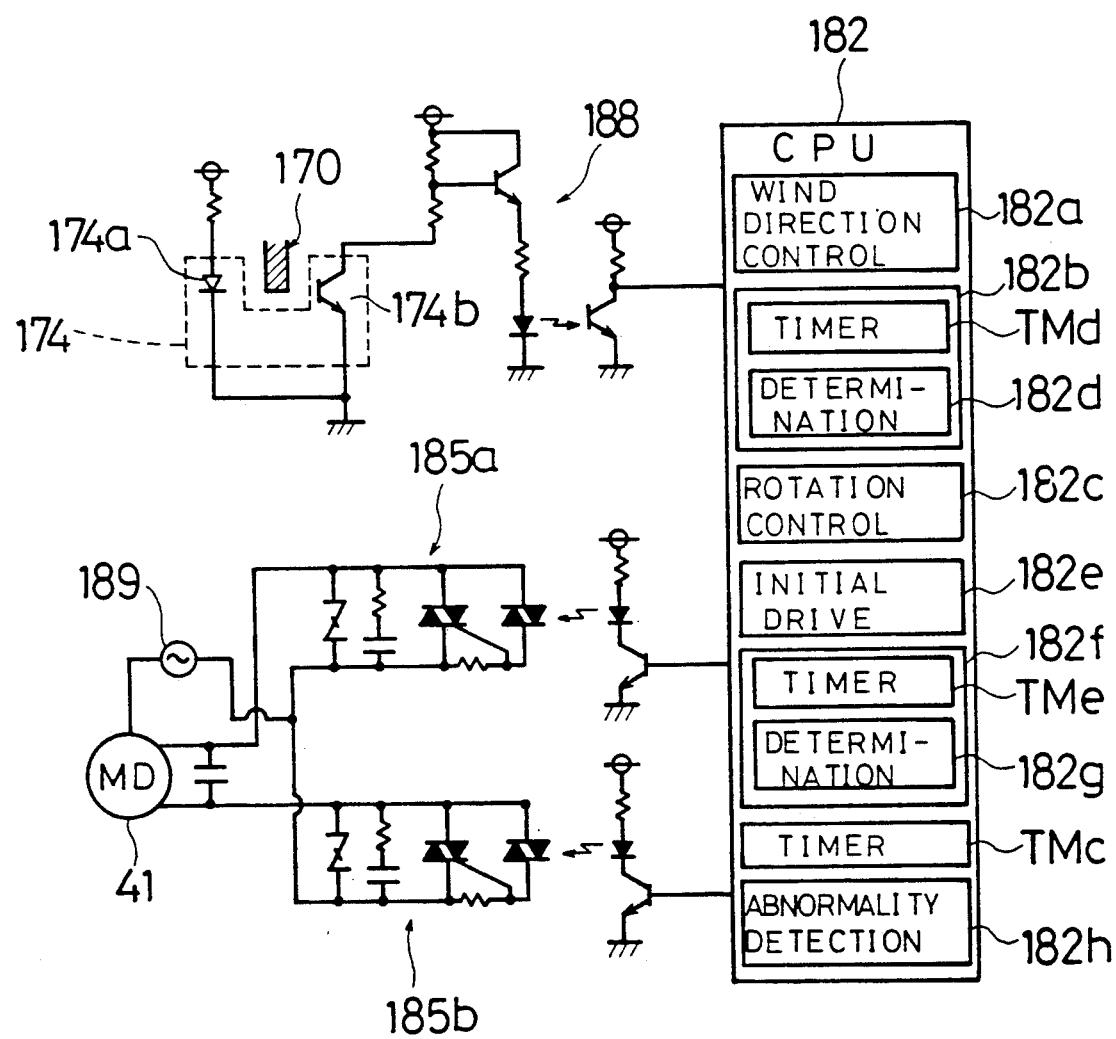

FIG.30 is a detailed circuit diagram showing the signal output system of the photo-interrupter (174) and the drive control system of the duct motor (41). The radiation element (174a) and the radiation receiving element (174b) of the photo-interrupter (174) are arranged in a row at a fixed interval. If the projected portion (172) comes into the position between both elements (174a) and (174b), light incident from the radiation element (174a) is interrupted. The output signal from the photo-interrupter (174) will be sent to the CPU (182) by means of the transmission circuit (188) having a transistor and a photo-bond element. "High" signal of "1" when the light is interrupted by the projected portions (172) and "Low" signal of "0" when the light is transmitted by the recessed portions (173) are inputted respectively to the CPU (182). AC power (189) is connected with the duct mo&or (41), and the drive circuits for the clockwise rotation (185a) and for the anticlockwise rotation (185b) having the photo-bond element and the Triac etc. are provided. The CPU (182) comprises: central position determining means (182b) responsive to the detection signal from the photo-interrupter (174) for determining the central position of the angular position member (170), i.e. the rotational center (N) of the blow-off duct (16); and rotation control means (182c) responsive to the signal output from the central position determining means (182b) and the photo-interrupter (174) for determining a rotational angle of the blow-off duct (16) and for controlling the duct motor (41) so that the blow-off duct (16) automatically swings within the predetermined rotational range, for example, 50 or 100 degrees. The central position determining means (182b) includes the central timer (TMd) as counting means and determining means (182d). The central timer (TMd) is set shorter than the "High" signal time of the central projected portions (172a) and is set longer than the "High" singal time of the side projected portions (172b) outputted by the photo-interrupter (174). When the "High" signal from the photo-interrupter (174) is outputted continuously exceeding a set time of the central timer (TMd) and then followed by the "Low" signal, the determining means (182d) determines the rotational center (N).

The CPU (182) further comprises: initial drive means (182e) for controlling the duct motor :1) so that the blow-off duct (16) rotates in either direction, for example, in the clockwise direction, at the initial stage of the rotational control which requires the output of the angle signal, for example, at the initial stage of the automatic swing control of the blow-off duct (16); side end position control means (182f) responsive to the output signal from the photo-interrupter (174) for determining the side end recessed portion (173c) of the angular position member (170) with the rotation of the blow-off duct (16) driven by the initial drive means (182e), and for controlling the duct motor (41) to reverse (anticlockwise rotation) the rotation of the blow-off duct (16). The side end position control means (182f) includes the side end timer (TMe) as counting means and the determining means (182g). The side end time (TMe) is set longer than the "Low" signal time of the intermediate recessed portion (173b) outputted by the photo-interrupter (174). When the "Low" signal of the photo-interrupter (74) is outputted continuously exceeding the set time of the side end timer (TMe), namely when the "Low" signal of the side end recessed portion (173c) is outputted, the determining means (182f) determines the side end position.

The CPU (182) yet further comprises abnormality timer TMc) of abnormal counting means and abnormality detection means (182h). The abnormality timer (TMc) is set longer than the set time of both the central timer (TMd) and the side end timer (TMe). When the "High" signal or the "Low" signal of the photo-interrupter (174) is outputted continuously exceeding the set time of the abnormality timer (TMc), the abnormality detection means (182h) detects abnormal condition of the duct motor (41) etc. and then lights an abnormality indicator lamp.

Figure 31:
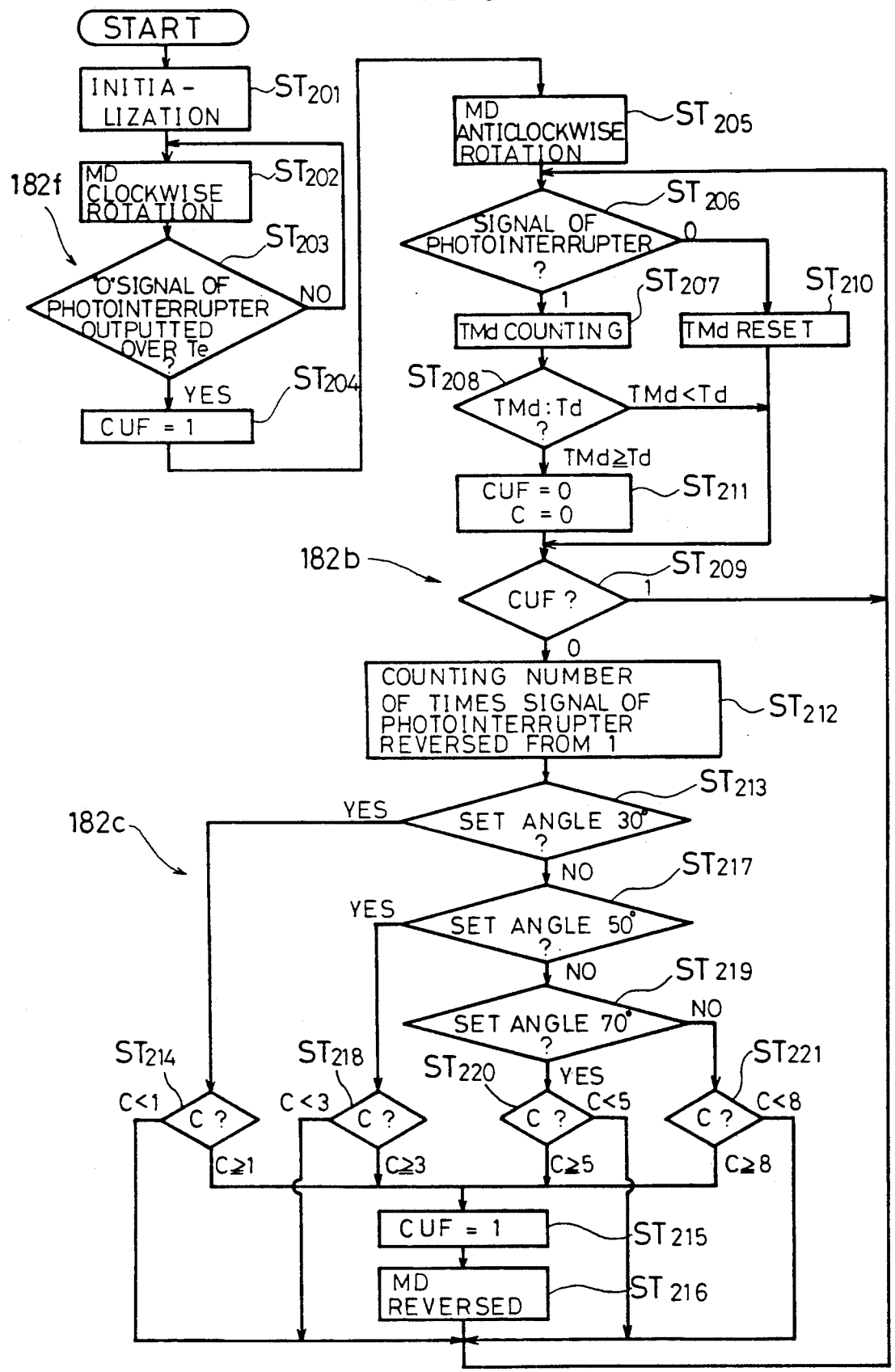
Figure 32:
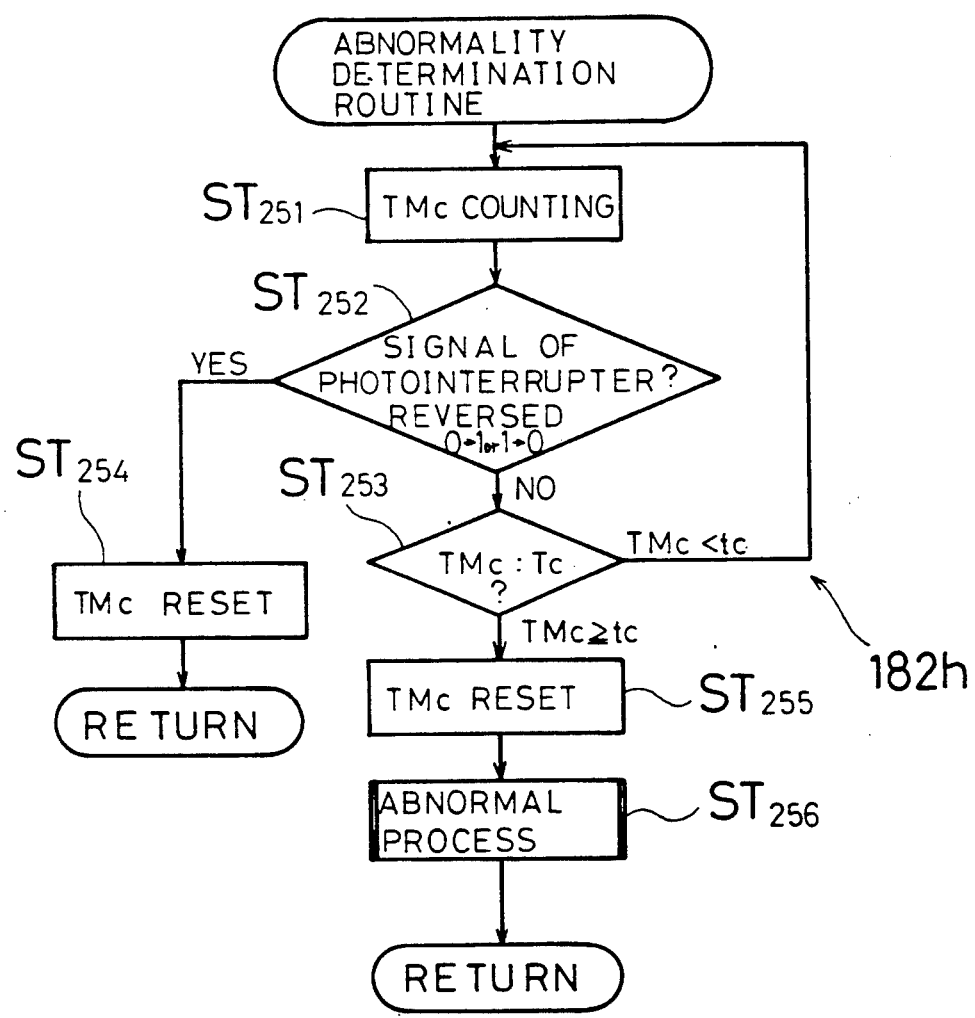

Referring now to Figs. 31 and 32, an angle detection motion and an automatic swing motion of the blow-off duct (16) based on the detected angle, i.e. a control motion when the mode change-over switch (76) is set in the automatic swing mode will be described as follows.

When the automatic swing motion is started, the initialization is carried out in the step ST201. For example, after resetting a count-up flag (CUF) and so on, the air-conditioning operation shifts to the step ST202 where the duct motor (41) is driven by the initial drive means (182e) to initiate the rotation of the blow-off duct (16). In the step ST203, it is determined whether the "Low" signal "0" of the photo-interrupter (174) has been outputted continuously exceeding the set time (Te) of the side end timer (TMe) or not. The air-conditioning operation returns to the step ST202 until the signal output exceeds the set time (Te). At the initial stage of control, the rotational center (N) of the blow-off duct (16) as well as the position thereof has not yet identified. Accordingly, the blow-off duct (16) will be rotated toward either end portion to determine the rotational center (N). The rotation of the duct motor (41) lead to the rotation of the rotary cylinder (51a) by means of the belt transmission mechanism (43), thereby initiating the rotation of the blow-off duct (16). In addition, the angular position member (170) rotates and the photo-interrupter (74) alternately outputs the "High" signal and the "Low" signal in relation to the projected portions (172) and the recessed portion (173). The output time of the intermediate recessed portions (173b) is set relatively short compared with the "Low" signals outputted by other recessed portions (173). As a result, the air-conditioning operation in the steps ST202 and ST203 will be repeated. And then, when the blow-off duct (16) reaches the side end position and the side end recessed portion (173c) reaches the position of the photo-interrupter (174), the "Low" signal is continued to be generated. Accordingly, when the signal output continues during the set time (Te), for example, 200 msec, the determining means (182g) of the side end position control means (182f) determines the side end position. Later, the air-conditioning operation moves from the step ST203 to the step ST204 where the count-up flag (CUF) is reset. Then, in the step ST205, the side end position control means (182f) reverses the duct motor (41) to start the anticlockwise rotation thereof, thus rotating the blow-off duct (16) in the anticlockwise direction, in other words, rotating it toward the center.

Then, the air-conditioning operation shifts from the step ST205 to the step ST206 where it is determined whether the output signal from the photo-interrupter (174) is the "High" signal, "1" or the "Low" signal, "0". When the signal is "High", the air-conditioning operation proceeds to the step ST207 for actuating the central timer (TMd), and then to the step ST208 for determining whether the central timer (TMd) has counted the set time (Td), for example, 200 msec or not. The air-conditioning operation moves to the step ST209 until 200 msec passes. Here, it is determined whether the count-up flag (CUF) has been reset or not. The air-conditioning operation returns to the step ST206 until the flag is reset. When the output signal of the photo-interrupter (174) is determined as "Low" in the step ST206, the air-conditioning operation shifts to the step ST210 where the central timer (TMd) is reset to be followed by the step ST210 for repeating the above-mentioned operations. In detail, when the blow-off duct (16) starts rotation in the side end position toward the center, the photo-interrupter (174) alternately outputs the "High" signal and the "Low" signal respectively in relation to the projected portions (172) and the recessed portions (173). With this "Low" signal, the central timer (TMd) is reset (step ST210), and this central timer (TMd) is actuated during the output of the "High" signal (step ST207). Since the side projected portions (172b) except the central projected portions (172a) are formed in small width, the output time of the "High" signal becomes relatively short. This means that the central timer (TMb) will not complete counting the set time (Td). Thus, the air-conditioning operation in the steps ST206 through ST210 will be repeated.

Then, when the blow-off duct (16) reaches substantially the central position, and the central projected portions (172a) reach the position of the photo-interrupter (174), the "High" signal is continuously outputted. Accordingly, the central timer (TMd) completes counting the set time (Td). Next, the air-conditioning Operation shifts from the step ST208 to the step ST211 where the count-up flag (CUF) and a counter (C) are reset. In the step ST209, it is determine whether the count-up flag (CUF) has been reset or not. Since the count-up flag (CUF) has already been reset, the air-conditioning operation shifts to the step ST212 where the number of times of the reverse of signals from "High" to "Low" (from "1" to "0") in the photo-interrupter (174) is counted. Then, in the step ST213, it is determined whether a swing set angle of the blow-off duct (16) is within the range of 30 degrees. If the angle is determined to have been set at 30 degrees by an angle set switch (183b), the air-conditioning operation shifts to the step ST214. Here, it is checked whether the counter (C) becomes "1" or not. The air-conditioning operation returns to the step ST206 until the counter (C) becomes "1".

When the blow-off duct (16) reaches the central position and the photo-interrupter (174) outputs the "High" signal of the central projected portions (172a), and then the set time (Td) of the central timer (TMd) passes, the air-conditioning operation of the step ST209 and the subsequent steps will be carried out. However, the air-conditoning operation of the steps ST206 through ST214 has been repeated until the output signal of the photo-interrupter (174) changes into the "Low" signal of the central recessed portion (173a). When the signal is reversed from the "High" signal of the central projected portion (172a) to the "Low" signal of the central recessed portion (173a), the determining means (182d) of the central position determining means (182d) determines the rotational center (N) of the blow-off duct (16), thereby identifying the central position of the blow-off duct (16). Then, in the step ST212, the counter (C) is reset by the reverse of the output signal from the photo-interrupter (174) in relation to the central recessed portion (173a). The counter (C) does not count this reverse of signal end starts counting from the next reverse of signals from "High" to "Low".

Subsequently, the blow-off duct (16) rotates in the same direction beyond the rotational center (N), for example, rotates in the anticlockwise direction. First, the output signal from the photo-interrupter (174) is reversed from the "Low" signal of the central recessed portion (173a) to the "High" signal of the central projected portion (172a) on the other side. When the "Low" signal is outputted again at the next intermediate recessed portion (173b), the counter (C) adds "1" in the step ST212. Then, in the step ST214, the counter (C) is determined to be "1", and in the step ST215, the count-up flag (CUF) is set. Next, in the step ST216, the duct motor (41) is reversed, and back in the step ST206, the above-mentioned operation is repeated.

Figure 28:
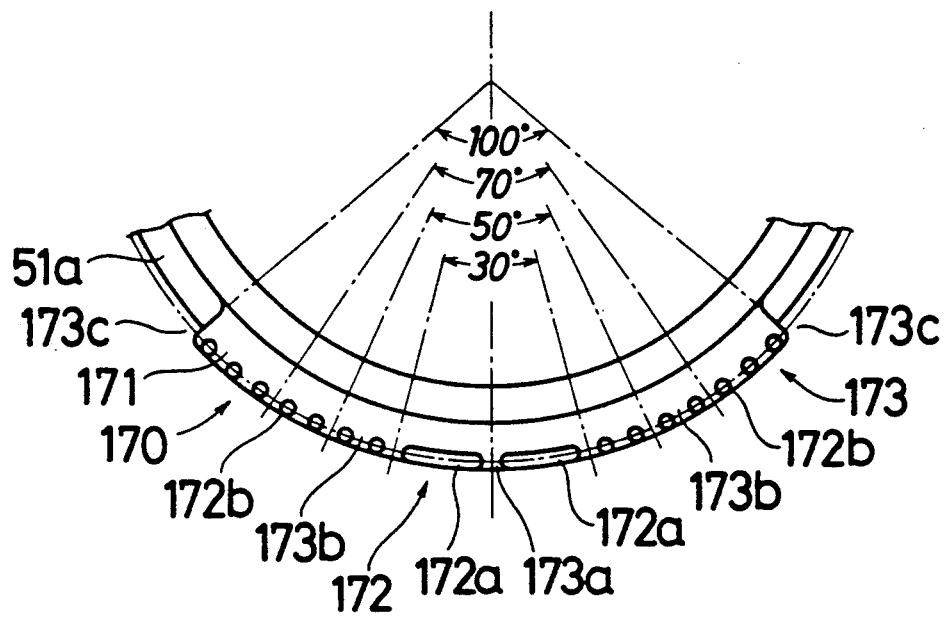
Figure 29:
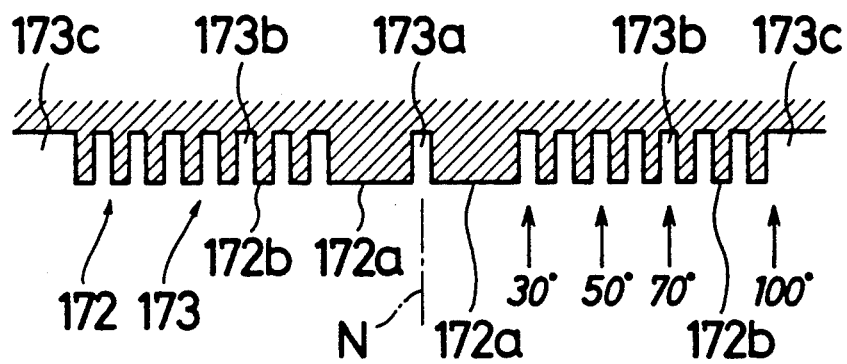

As shown in FIG. 28, the swing angle of the intermediate recessed portion (173b) adjacent to the central projected portion (172a) is set at 30 degrees. Now, in this way, the swing angle is set at 30 degrees (step ST213), the angle of 30 degrees is detected by the first reverse of signals from "High" to "Low". As a result, the rotation control means (182c) reverses the rotation of the blow-off duct (16) (step ST216).

Then, as described before, the central position determining means (182b) determines the rotational center (N) of the blow-off duct (16) (steps ST206 through ST212). In the step ST214, the other side end at 30 degrees is determined. The above operation is repeated to rotate the blow-off duct (16) within the range of 30 degrees. In other words, while the central position determining means (182b) determines the rotational center (N) of the blow-off duct (16), the rotational angle is detected by the signal output from the photo-interrupter (174). Thus, the rotation control means (182c) swings the blow-off duct (16).

When the swing angle of the blow-off duct (16) is set at 50 degrees, the air-conditioning operation shifts from the step BT213 to the steps ST217 and ST218 where it is determined whether the counter (C) becomes "3" or not and the blow-off duct (16) is reversed by the "Low" signal of the intermediate recessed portion (173b) corresponding to 50 degrees. When the swing angle is set at 70 degrees, the air-conditioning operation shifts from the step ST217 to the steps ST219 and ST220 where it is determined whether the counter (C) becomes "5" or not to swing the blow-off duct (16). Further, when the swing angle is set at 100 degrees, the air-conditioning operation shifts from the step ST219 to the step ST221 where it is determined whether the counter (C) becomes "8" or not to swing the blow-off duct (16).

FIG. 32 shows the abnormality determination routine of the spot air-conditioner. Abnormality is determined when the central timer (TMd) and the side end timer (TMe) are actuated. First, in the step ST251, the abnormality timer (TMc) is actuated, and then, in the step ST252, it is determined whether the output signal of the photointerrupter (174) changed from "High" to "Low" or from "Low" to "High". Until the reverse of signals occurs, the air-conditioning operation shifts to the step ST253. The air-conditioning operation returns to the step ST251 until a set time (Tc) of the abnormality timer (TMc) which is set longer, for example 1.5 sec, than the set time (Td), (Te) of 200 msec respectively of the central timer (TMc) and the side end timer (TMe) passes. If the output signal of the photo-interrupter (174) is reversed before the set time (Tc) of the abnormality timer (TMc) is counted, the air-conditioning operation shifts from the step ST252 to the step ST254 where the abnormality timer (TMc) is reset and returned. On the other hand, if the abnormality timer (TMc) has counted the set time (Tc) while the output signal of the photo-interrupter (174) remains "Low" or "High", the conditioning operation shift from the step ST263 to the step ST255 where the abnormality timer (TMc) is reset. Then in the step ST256, the operational routine against the abnormal condition will be initiated. In detail, actuation of the central timer (TMd) and the side end timer (TMe) causes the abnormality timer (TMc) to start its counting. When the abnormality timer (TMc) complete counting, the abnormality detection means (182h) detects abnormality. For example. when the "High" signal indicating the central projected portion (172a) is continuously outputted exceeding 1.5 sec, or the "Low" signal indicating the side end recessed portion (173c) is continuously outputted exceeding 1.5 sec, it is determined that there is an abnormality in the duct motor (41) or in the photo-interrupter (174). Thus, the necessary measures against abnormal condition, for example, lighting the abnormality indicator lamp, will be taken.

In this way, the projected portions (172) and the recessed portions (173) of the angular position member (170) are detected in non-contacting manner and then the detection signal is outputted. Rotation angle of the blow-off duct (16) is determined by this detection signal. In this way unlike a limit switch, the detection means in this invention does not have a contacting portion or a mechanical drive portion. This has led to longer service life of the detection means. Further, since installation accuracy is not required in the detection means etc., reliability of angle detection can be improved. In contrast with a detection method of using rotation time of the blow-off duct (16), angle is detected by the detected quantity of the projected portions (172)

and the recessed portions (173) in this invention. Consequently, accurate angle detection can be possible without any compensation of characteristic of the duct drive means (2), i.e. compensation of motor frequency. As a result, accuracy of rotation control of the blow-off duct (16) can be improved.

Since the photo-interrupter (174) determines the rotational angle of the blow-off duct (16) in this invention, the blow-off duct (16) can be axially rotated by means of a rotary cylinder, and thus improving the sealability between the top plate of the air-conditioner (12) and the blow-off duct (16). In addition, since the duct drive means (2) can be located outside of the passage of conditioned air, air-conditioning efficiency can be enhanced.

At the initial phase of control, side end positions of the angular position member (170) are detected. This realizes accurate detection of the central position of the angular position member (170) at a later period even when the blow-off duct (16) stops in either direction. In this way, detection accuracy can be improved.

The central position and side end positions can be detected since width of the projected portions (172) and the recessed portions (173) is differentiated. This promises accurate detection of angle.

The abnormality detection means (182h) detects abnormality of the duct motor (41) etc. without fail, thus improving reliability of rotation control.

Figure 34:
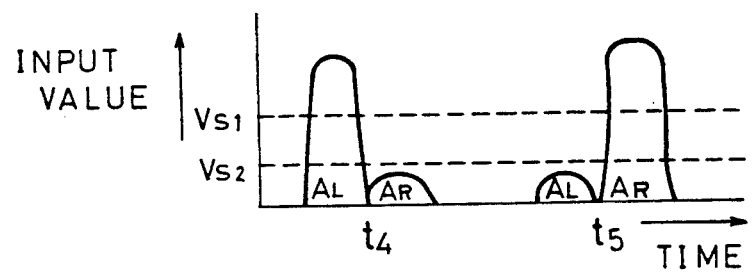

In the human body detection sensor (72), when the clothe (Cl) or the person to be air-conditioned moves, a infrared rays input value $A_L$ from the first radiation element ($H_1$), as indicated by a time $t_4$ in FIG. 34, remains to be exceeding the human body detection and determination level $V_{S1}$. However, an infrared rays input value $A_R$ from the second radiation element ($H_2$) is designed to be not exceeding the human movement determination level $V_{S2}$ of the second set value which is set lower than the human body detection and determination level $V_{S1}$ by a fixed amount. Likewise, when the person to be air-conditioned moves to the right, as indicated by a time $t_5$ in FIG. 34, it is designed that an infrared rays input value $A_R$ from the second radiation element ($H_2$) exceeds the human body detection level $V_{S1}$ and an infrared rays input value $A_L$ from the first radiation element ($H_1$) does not exceed the human body movement determination level $V_{S2}$.

Figure 33:
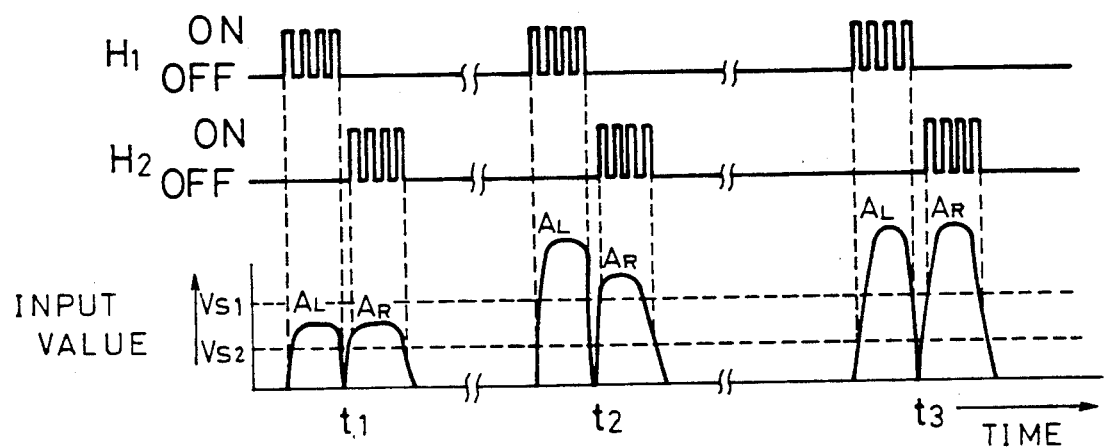

Referring now to the timing charts of FIGS. 33 and 34, the air-conditioning control of the human body tracking mode while using the human body detection sensor (72) set in the above-mentioned state will be described based on the flow chart of FIG. 35. In FIG. 33, the upper, middle and lower time charts show respectively, ON/OFF state of the first radiation element ($H_1$), ON/OFF state of the second radiation element ($H_2$), and time-varying state of infrared rays input values $A_L$, $A_R$ radiated from the radiation elements ($H_1$), ($H_2$).

As shown in the flow chart of FIG. 35, the determination is made as follows as to the presence of the human body to be air-conditioned and the movement thereof based on the input voltage V of the radiation receiving element (J) while each radiation element ($H_1$), ($H_2$) and the radiation receiving element (J) is in the ON state.

In the step $S_1$, it is determined whether the human body detected flag (HKF) indicates "1" or "0", namely whether the human body detection is being carried out or not. When the human body is not detected, infrared rays input values $A_L$, $A_R$ of each radiation element ($H_1$), ($H_2$) are compared with the human body detection and determination level $V_{S1}$ in the step $S_2$. When either input value $A_L$ or $A_R$ is lower than the human body detection and determination level $V_{S1}$ (for example, time $T_1$ in FIG. 33), the human body undetected signal is outputted in the step $S_3$. On the other hand, in the case of $A_L \geq V_{S1}$, $A_R \geq V_{S1}$, where $A_L = A_R$ (for example, time $T_3$ in FIG. 33), the human body detected signal is outputted in the step $S_4$ and the human body detected flag (HKF) is set to "1" in the step $S_5$. However, when the equations $A_L \geq V_{S1}$ and $A_R \geq V_{S2}$ are satisfied but $A_L = A_R$ is not satisfied (for example, time $t_2$ in FIG. 33), it is not determined that the human body is present.

If the human body detected flag HKF changes into "1" with the determination in the step $S_1$, infrared rays input values $A_L$, $A_R$ are compared with the human body movement determination level $V_{S2}$ in the step $S_6$. In the case of $A_L \geq V_{S2}$ and $A_R \geq V_{S2}$, it is determined that there is no human movement. And in the step $S_7$, in the case of $A_R < A_L$, it is determined that the human body is moving slightly to the right, and a right side flag (RF) is set to "1", while in the case of $A_R < A_L$, it is determined that the human body is moving to the left, and a left side flag (LF) is set to "1".

In the case of $A_L < V_{S2}$ or $A_R < V_{S2}$ (time $t_4$ or time $t_5$ in FIG. 34) in the determination of the step $S_6$, after setting the right side flag (RF) or the left side flag (LF) to "1" in the step $S_8$ as in the case of the step $S_7$, the human body movement signal is outputted in the step $S_9$. Then, in the step $S_{10}$, the human body detected flag (HKF) is set to "0".

In the above-mentioned control flow, the step $S_4$ constitutes human body detection means (101) for, in response to the output from the radiation receiving element (J), outputting the human body detected signal when infrared rays input values $A_L$, $A_R$ both exceed a fixed human body detection and determination level (the first set value $V_{S1}$). The step $S_6$ constitutes comparing means (102) for comparing the input values $A_L$, $A_R$ of infrared rays radiated from the pair of the radiation elements ($H_1$), ($H_2$) with the human body movement determination level $V_{S2}$ to determine whether the input values $A_L$, $A_R$ ia lower than the human body movement determination level $V_{S2}$ which is lower than the human body detection and determination level $V_{S1}$ by a fixed amount. In addition, the step $S_9$ constitutes human body movement detection means (103), responsive to the output from the comparing means (102), for determining, when only the input value $A_L$ of one radiation element (for example, $H_1$) becomes lower than the human body movement determination level $V_{S2}$, that the human body moved to the area of the other radiation element ($H_2$), and for outputting the human body movement signal.

When the human body is present in the forward direction, the reflection of the infrared rays radiated by the pair of the radiation elements ($H_1$), ($H_2$) is diffused by the human body's clothes (Cl). As a result, the input values $A_L$, $A_R$ to the radiation receiving element (J) both exceed the human body detection and determination level $V_{S1}$ and thus, the human body detection means (101) outputs the human body detected signal to indicate the presence of the human body.

In this case, if another human body goes across in of the human body who is now under tracking by the spot air-conditioner, imbalance will occur between the input values $A_L$, $A_R$ of each radiation elements ($H_1$), ($H_2$). This means that the human body detection sensor (72)

may keep track of the movement of the another human body, in other words, the blow-off duct (16) may follow the movement of the another person, not the person under tracking.

To avoid the above situation, the human body movement determination level $V_{S2}$ is set lower than the human body detection and determination level $V_{S1}$ by a fixed amount. And only when either one infrared rays input value to be compared by the comparing means (102) becomes lower than the human body movement determination level $V_{S2}$ (refer to the graph in the left or the right in FIG. 34), the human body movement detection means (103) determines that there was a movement of the human body under tracking and outputs the human body detected signal. Accordingly, even if the other human body moves across in front or behind the human body under tracking, as long as the human body under tracking is in the static state, there will be no such a case that either one infrared rays input value becomes not more than the human body movement determination level $V_{S2}$ due to the reflection on the other human body. In this way, incorrect determination as to the movement of the human body under tracking can be effectively prevented.

Although the movable-type spot air-conditioner (1) was discussed in the present embodiment, the present invention can applicable to a duct-type spot air-conditioner.

A single human body detection sensor (72) can detect the human body movement in addition to the human body detection in the present embodiment. In addition, a plurality of human body detection sensor can be provided in the air-conditioner (12) so that the air-conditioning area can be divided into plural number of subareas and the monitoring and the human body detection can be conducted respectively in each subarea. A person to be air-conditioned can be promptly detected by providing a plurality of sensors in the air-conditioner (12) in this way, thus leading to the prompt human body tracking by the blow-off duct (16).

The wind direction control means (75a) can be constituted in such a manner that the blow-off duct (16) is mounted movably in the three-dimentional directions to be rotated in the three-dimentional directions in accordance with the movement of the person to be air-conditioned. In this way, the extensive human body tracking can be realized, thereby further improving comfortableness in working environment.

The intermittent control means (83) can be constituted in such a manner that the fan motor (12d) is controlled to be driven in high revolution or in low revolution so as to vary the number of revolutions of the fsn (12f) intermittently into high or low revolutions, i.e. light or heavy operation. Thus, comfortableness in the case of light ventilation mode can be reliably obtained.

Two or more blow-off ducts (16) can be provided in the spot air-conditioner in the present invention. The blow-off duct (16) can be be supported on the housing (15) by means of pin and so on to be rotated thereon.

Furthermore, the human detection sensor (72) can be a ultrasonic type or pyroelectric type.

Industrial Applicability

The spot air-conditioner in the present invention is effective in providing comfortable localized air-conditioning since the blow-off duct keeps track of the movement of the person to be air-conditioned.

We claim:

1. A spot air-conditioner for drawing in room air and generating conditioned air;
   a blow-off duct rotatably mounted on said air-conditioner for blowing off said conditioned air;
   duct drive means for rotating said blow-off duct relative to said air-conditioner in order to change the wind direction of said duct;
   means for detecting a body of a person to be cooled in an area which is cooled by said conditioned air; and
   wind direction control means, responsive to a human body detected signal outputted from said human body detection means, for controlling said duct drive means to direct said blow-off duct toward the person to be cooled;
   said human body detection means including a human body detection device which detects the presence of a person to be air-conditioned in a plane detection region against a background, said human body detection means including
   a pair of radiation means for alternately radiating infrared rays, each having a fixed radiation directional angles in said detection region and disposed at a certain opening angle so that said radiation directional angles do not overlap each other;
   single radiation receiving means interposed between the radiation means in said detection region for receiving reflection of the infrared rays radiated from said radiation means, said radiation receiving means having a fixed radiation receiving directional angle which partially overlaps with the radiation directional angles of each radiation; and
   human body detection and determination means responsive to the output from said radiation receiving means for outputting a human body detected signal when the amounts of reflection of infrared rays radiated from each radiation means both exceed a set value.

2. A spot air-conditioned as defined in claim 1 wherein said human body detection means (72) is a single human body detection sensor which scans said air-conditioning area to detect the person to be air-conditioned.

3. A spot air-conditioner comprising:
   an air-conditioner (12) for sucking room air and generating conditioned air;
   air-conditioning control means (8) for controlling the air-conditioning operation of said air-conditioner (12);
   a blow-off duct (16) rotatably mounted on said air-conditioner (12) for blowing off said conditioned air;
   duct drive means (2) for rotating said blow-off duct (16) against said air-conditioner (12) in order to change the wind direction:
   human body detection means (72) for outputting a human body detected signal when detecting a person to be air-conditioned, and for outputting a human body undetected signal when the person to be air-conditioned cannot be found in an air-conditioning area which is air-conditioned by said conditioned air, as well as for outputting a movement signal when identifying any movement of the person to be air-conditioned; and
   wind direction control means (75a), responsive to said human body detected signal and said movement signal outputted from said human body detection means (72), for controlling said duct drive means (2) to direct said blow-off duct (16) toward the person to be air-conditioned in accordance with the movement thereof.

4. A spot air-condition as defined in claim 3 wherein said human body detection means (72) is a human body detection device which detects the presence of a person to be air-conditioned in a plane detection region against a background, said human body detection means (72) comprising: a pair of radiation means (H$_1$), (H$_2$) for alternately radiating infrared rays, each having a fixed radiation directional angles ($\pm\theta_H$), ($\pm\theta_H$) in said detection region and disposed at a certain opening angle so that said radiation directional angles ($\pm\theta_H$), ($\pm\theta_H$) do not overlap each other;

single radiation receiving means J interposed between the radiation means (H$_1$), (H$_2$) in said detection region for receiving reflection of the infrared rays radiated from said radiation means (H$_1$), (H$_2$), said radiation receiving means (J) having a fixed radiation receiving directional angle ($\pm\theta_J$) which partially overlaps with the radiation directional angles ($\pm\theta_H$), ($\pm\theta_H$) of each radiation means (H$_1$), (H$_2$);

human body detection and determination means (75$h$), responsive to the output from said radiation receiving means (J), for outputting a human body detected signal when the amounts of reflection of infrared rays radiated from each radiation means (H$_1$), (H$_2$) both exceed a set value, and for outputting a human body undetected signal when the amounts of reflection of infrared rays radiated from each radiation means (H$_1$), (H$_2$) are both not more than a set value or either one is not more than a set value; and human body movement determination means (75$i$) for outputting a movement signal upon determining that the person to be air-conditioned moves to a directional angle ($\pm\theta_H$) area of the other radiation means (H$_2$) or (H$_1$) when, after receiving the human body detected signal from said human body detection and determination means (75$h$), the amount of reflection of infrared rays radiated from either radiation means (H$_1$) or (H$_2$) becomes lower than a set value.

5. A spot air-conditioner as defined in claim 3 wherein said human body detection means (72) is provided at the head portion of said blow-off duct (16).

6. A spot air-conditioner as defined in claim 3 wherein said wind direction control means (75$a$) controls said duct drive means (2) so that said blow-off duct (16) follows the movements of the person to be air-conditioned in said air-conditioning area having a predetermined angle which is set with a mounting point thereof as a central axis.

7. A spot air-conditioner as defined in claim 3 further comprising drive delay means (75$m$), responsive to a movement signal from said human body detection means (72), for outputting said movement signal to said wind direction control means (76$a$) after a fixed time (t$_1$) corresponding to the time which is required for the slight movement of the person to be air-conditioned passes.

8. A spot air-conditioner as defined in claim 3 further comprising position detection means (7) for detecting a rotation limit position of said blow-off duct (16) corresponding to the end portions of said air-conditioning area, and duct stop means (75$n$), responsive to a position signal from said position detection means (7) and a movement signal from said human body detection means (72), for controlling said duct drive means (2) to stop said blow-off duct (16) at said rotation limit position when the person to be air-conditioned moves out of said air-conditioning area.

9. A spot air-conditioner as defined in claim 3 further comprising short standby means (75$j$), responsive to said human body undetected signal outputted by said human body detection means (72) after the output of the human body detected signal therefrom, for controlling said air-conditioning control means (8) to stand by for a fixed time (t$_2$) in such a state of the air-conditioning operation before said human body undetected signal is outputted.

10. A spot air-conditioner as defined in claim 9 further comprising long standby means (75$l$) for controlling said air-conditioning control means (8) and said duct drive means (2), when a fixed time (t$_2$) set by said short standby means (75$j$) passes without any detection signal from the human movement operation and to stand by for a fixed time (t$_3$) in such a state that said air-conditioning means (8) and said duct drive means (2) automatically resume operation in response to the human body detected signal from said human body detection means (72).

11. A spot air-conditioner as defined in claim 10 wherein said long standby means (75$l$) carries out the system-down of said air-conditioning control means (8) in such a state that the air-conditioning Operation cannot be resumed automatically when a predetermined standby time (t$_3$) passes without any detection signal from said human body detection means (72).

12. A spot air-conditioner as defined in claim 10 wherein said long standby means (75$l$) controls said duct drive means (2) to stop and stand by said blow-off duct (16) at the center of said air-conditioning area.

13. A spot air-conditioner as defined in claim 3 further comprising human body search means (75$k$), responsive to said human body undetected signal from said human body detection means (72), for searching a person to be air-conditioned by scanning said air-conditioning area with said human body detection means (72).

14. A spot air-conditioner as defined in claim 13 wherein said human body search means (75$k$) controls said duct drive means (2) so that said blow-off duct (16) automatically swings within said air-conditioning area, thereby scanning said air-conditioning area with said human body detection means (72) which is mounted at the head portion of said blow-off duct (16).

15. A spot air-conditioner as defined in claim 13 wherein said human body search means (75$k$) searches a person to be air-conditioned in the state Of air-conditioning operation before the output of said human body undetected signal from said human body detection means (72).

16. A spot air-conditioner as defined in claim 3 further comprising:

mode stitching means (76) for switching the control mode of said blow-off duct (16) by manually selecting a suitable mode from a stationary mode, an sutomatic swing mode, and a human body tracking mode;

position detection means (7) for detecting rotation limit positions of said blow-off duct (16) on both ends thereof and for outputting a position signal when said blow-off duct (16) is in the rotation limit position;

stationary control means (75b) for controlling said duct drive means (2) to hold said blow-off duct (16) in the stationary state when said blow-off duct (16) is set in the stationary mode by said mode switching means (76);

automatic swing means (75c), responsive to said position signal from said position detection means (7), for controlling said duct drive means (2) to reverse said blow-off duct (16), and thereby initiating the reciprocating pivotal movement of said blow-off duct (16), when said blow-off duct (16) is set in the automatic swing mode by said mode switching means (76); and said wind direction control means (75a) for controlling said duct drive means (2) to follow a movement of the person to be air-conditioned when said blow-off duct (16) is set in the human body tracking mode by said mode switching means (76).

17. A spot air-conditioner as defined in claim 16 further comprising air-conditioning stop means (75d) for controlling said air-conditioning control means (8), when a predetermined air-conditioning time (t5) passes without any human body detected signal from said human body detection means (72) during the output of the stationary mode signal or automatic swing mode signal of said mode switching means (76), to stop the air-conditioning operation in such a state that the air-conditioning operation can be resumed in response to the human body detected signal from said human body detection means (72).

18. A spot air-conditioner as defined in claim 17 further comprising system stop means (75e) for controlling said air-conditioning control means (8), when a predetermined air-conditioning stop time (t6) passes without any human body detected signal from said human body detection means (72) after said air-conditioning stop means (75d) outputs a stop signal, to carry out the system-down in such a state that the air-conditioning operation cannot be resumed automatically.

19. A spot air-conditioner as defined in claim 17 further comprising switching means for automatic stopping (84) for ON/OFF controlling said sir-conditioning stop means (75d).

20. A spot air-conditioner as defined in claim 3 further comprising: mode switching means (76) for manually selecting a suitable mode of said blow-off duct (16) between a stationary mode and a human body tracking mode; stationary control means (75b) for controlling said duct drive means (2) to hold said blow-off duct (16) in the stationary state when said blow-off duct (16) is set in the stationary mode by said mode switching means (76); and said wind direction control means (75a) for controlling said duct drive means (2) to follow a movement of a person to be air-conditioned when the human body tracking mode is selected by said mode switching means (76).

21. A spot air-conditioner as defined in claim 20 further comprising air-conditioning stop means (75d) for controlling said air-conditioning control means (8), when a predetermined air-conditioning time (t6) passes without any human body detected signal from said human body detection means (72) during the output of the stationary mode signal of said mode switching means (? 6, to stop the air-conditioning operation is such a state that the conditioning operation can be resumed in response to the human body detected signal from said human body detection means (72).

22. A spot air-conditioner as defined in claim 3 further comprising: mode switching means (76) for switching the control mode of said blow-off duct (16) by manually selecting a suitable mode from an automatic swing mode and a human body tracking mode; position detection means (7), for detecting rotation limit positions of said blow-off duct (16) on both ends thereof and for outputting a position signal when said blow-off duct (16) is in the rotation limit position; automatic swing means (75c), responsive to the position signal from said position detection means (7), for controlling said duct drive means (2) to reverse said blow-off duct (16), and thereby initiating the reciprocating pivotal movement of said blow-off duct (2), when said blow-off duct (16) is set in the automatic swing mode by said switching means (76): and said wind direction control means (75a) for controlling said duct drive means (2) to follow the movement of a person to be air-conditioned when the human body tracking mode is selected by said mode switching means (76).

23. A spot air-conditioner as defined in claim 22 further comprising air-conditioning stop means (75d) for controlling said air-conditioning control means (8), when a predetermined air-conditioning time (t6) passes without any human body detected signal from said human body detection means (72) during the output of the automatic swing mode signal of said mode switching means (76), to stop the air-conditioning operation is such a state that the air-conditioning operation can be resumed in response to the human body detected signal from said human body detection means (72).

24. A spot air-conditioner as defined in claim 3 further comprising: angular position member (170) wherein a plurality of projected portions (172) and recessed portions (173) of both having a fixed width are alternately formed in the outer periphery of said blow-off duct (16) corresponding to rotation angular positions of said blow-off duct (16); position detection means (174) for detecting said projected portions (172) and said recessed portions (173) of said angular position member (170) without making contact therewith; central position determining means (182b), responsive to the output signal from said position detection means (174), for determining a central position of said angular position member (170); and rotation control means (182c), responsive signals from said position detection means (174) and said central position determining means (182b), for determining a rotational angle of said blow-off duct (16), and for controlling said duct drive means (2) so that said blow-off duct (16) pivotally moves within a fixed rotation range.

25. A spot air-conditioner as defined in claim 24 further comprising: initial drive means (182e) for controlling said duct drive means (2) to rotate said blow-off duct (16) in either one direction at the initial stage of the rotation control of said blow-off duct (16); and side end position control means (182f), responsive to the output signal from said position detection means (174), for determining side end positions of said angular position member (170) with the rotation of said blow-off duct (16) by said initial drive means (182e), thereby controlling said duct drive means (2) to reverse said blow-off duct (16).

26. A spot air-conditioner as defined in claim 25 wherein side end recessed portions (173c) located on both side ends among said recessed portions (173) of said angular position member (170) are formed to have relatively large width, while other intermediate recessed portions (173b) and a central recessed portion (173a) are formed to have smaller width than said side end recessed portions (173c), and central projected portions (172a) located on both sides of said central recessed portion (173a) among said projected portions (172) are formed to have a relatively large width, while other side projected portions (172b) are formed to have smaller width than said central projected portions (172a),

- said central position determining means (182b) comprises: counting means (TMd) having a predetermined counting time which is set shorter than a detection output time of said central projected portions (172a) by said position detection means (174) and longer than a detection output time of said side projected portions (172b): and determining means (182d) for determining central position when said position detection means (174) outputs the recessed portion detection signal after continuously outputting the projected portion detection signal exceeding a set period counted by said counting means (TMd),
- said side end position control means (182f) comprises: counting means (TMe) having a predetermined counting time which is set longer than the detection output time of said intermediate recessed portions (173b) by said position detection means (174); and determining means (182g) for determining side end positions when said position detection means (174) continuously outputs the recessed portion detection signal exceeding a set period counted by said counting means (TMe).

27. A spot air-conditioner as defined in claim 26 further comprising abnormal counting means (TMc) having a predetermined abnormal time which is set longer than a set time counted by each counting means (TMd). (TMe) respectively of said central position determining means (182b) and said side end position control means (182f), and abnormality detection means (182h) for determining abnormality when said position detection means (174) continuously outputs a single recessed portion detected signal or projected portion detected signal exceeding the abnormal time counted by said abnormal counting means (TMc).

28. A spot air-conditioner as defined in claim 3 wherein said human body detection mean (72) is a human body detection device which detects the presence of a person to be air-conditioned in a plane detection region against a background having a fixed amount of infrared rays, said human body detection means (72) comprising:

- a pair of radiation means ($H_1$), ($H_2$) disposed at a fixed opening angle for alternately radiating infrared rays;
- radiation receiving means (J) interposed between said radiation means ($H_1$), ($H_2$) for detecting the infrared rays input value by receiving the reflection of infrared rays radiated from said radiation means ($H_1$), ($H_2$);
- human body detection means (101), responsive to the output from said radiation receiving means (J). for outputting a human body detected signal when an input value of infrared rays radiated from each radiation means ($H_1$), ($H_2$) both exceed a fixed first set value;
- comparing means (102) for comparing an input value of infrared rays radiated from the pair of said radiation means ($H_1$), ($H_2$) with a second set value after receiving the human body detected signal from the human body detection means (101), in order to determine whether it is lower than the second set value which is lower than a first set value by a fixed amount; and
- human body movement detection means (103), responsive to the output from said comparing means (102), for determining the movement of the person to be air-conditioned to a side of the other radiation means ($H_2$) or $H_2$) and for outputting a human body movement signal when an input value from either one radiation means ($H_1$) or $H_2$) becomes lower than the second set value.

* * * * *

UNITED STATES PATENT AND TRADEMARK OFFICE
CERTIFICATE OF CORRECTION

PATENT NO. : 5,097,672
DATED : March 24, 1992
INVENTOR(S) : Takenaka et al.

It is certified that error appears in the above-indentified patent and that said Letters Patent is hereby corrected as shown below:

On the Title Page, insert:
Foreign Application Priority Data:

| | | |
|---|---|---|
| November 18, 1988 | Japan | 63-293079 |
| April 26, 1989 | Japan | 1-108285 |
| May 17, 1989 | Japan | 1-127601 |

At Column 1, line 3, insert the following: --This application is a continuation of International Application PCT/JP89/01171 designating the United States and filed on November 17, 1989 and now abandoned.--

Signed and Sealed this

Seventh Day of February, 1995

Attest:

BRUCE LEHMAN

Attesting Officer     Commissioner of Patents and Trademarks